United States Patent
Heinrich et al.

(10) Patent No.: US 8,972,467 B2
(45) Date of Patent: Mar. 3, 2015

(54) METHOD FOR SELECTING A DATA SET FROM A PLURALITY OF DATA SETS BY MEANS OF AN INPUT DEVICE

(75) Inventors: Claus Heinrich, Heidelberg (DE); Michael Kern, Heidelberg (DE)

(73) Assignee: Sovanta AG, Heidelberg (DE)

( * ) Notice: Subject to any disclaimer, the term of this patent is extended or adjusted under 35 U.S.C. 154(b) by 0 days.

(21) Appl. No.: 13/202,455

(22) PCT Filed: Aug. 31, 2010

(86) PCT No.: PCT/EP2010/062696
§ 371 (c)(1),
(2), (4) Date: Aug. 9, 2012

(65) Prior Publication Data
US 2014/0157142 A1   Jun. 5, 2014

(51) Int. Cl.
*G06F 17/30* (2006.01)
*G06F 3/048* (2013.01)
(Continued)

(52) U.S. Cl.
CPC ............ *G06F 3/048* (2013.01); *H04L 67/1095* (2013.01); *G06F 3/0412* (2013.01)
USPC ........................... 707/826; 345/661; 705/7.41

(58) Field of Classification Search
CPC .................... G06F 17/30386; G06Q 10/06393
USPC .................. 707/770, 758, 7.41, 826; 715/744
See application file for complete search history.

(56) References Cited

U.S. PATENT DOCUMENTS 5,978,841 A   11/1999 Berger
6,347,290 B1   2/2002 Bartlett
(Continued)

FOREIGN PATENT DOCUMENTS

DE   202007014957 U1   2/2008
EP   1335303   8/2003
(Continued)

OTHER PUBLICATIONS

David Leip; http://web.archive.org/web/20060622173754/http://useelectionatlas.org/Results/national.php?year=2000; 2005.
(Continued)

*Primary Examiner* — Mariela Reyes
*Assistant Examiner* — Dawaune Conyers
(74) *Attorney, Agent, or Firm* — Abel Law Group, LLP

(57) ABSTRACT

The invention relates to a computer-implemented method for selecting a data set from a plurality of data sets by means of a multi-touch input device, the data sets being connected with each other according to a topology of a graph, the input device comprising:
 a multi-touch screen,
 a motion sensing unit, and
 an acceleration sensing unit,
the method comprising:
 displaying a view by the multi-touch screen, the view comprising a plurality of GUI elements, each GUI element representing one of the data sets, whereby one of the GUI elements is used as current GUI element;
 detecting, by the motion sensing unit, one or more first tilting motions;
 determining at least one candidate GUI element in dependence on the one or more first tilting motions;
 highlighting the at least one candidate GUI element;
 detecting a first shaking motion;
 automatically selecting, upon the detection of the first shaking motion, the data set represented by the highlighted GUI element.

23 Claims, 26 Drawing Sheets

(51) Int. Cl.
*H04L 29/08* (2006.01)
*G06F 3/041* (2006.01)

(56) References Cited

U.S. PATENT DOCUMENTS

| | | |
|---|---|---|
| 6,996,584 B2 | 2/2006 | White et al. |
| 7,170,500 B2 | 1/2007 | Canova, Jr. |
| 7,548,982 B2 | 6/2009 | Gu et al. |
| 7,667,686 B2 | 2/2010 | Suh |
| 7,844,586 B2 | 11/2010 | von Duhn et al. |
| 8,493,355 B2 | 7/2013 | Geaghan et al. |
| 2002/0021278 A1 | 2/2002 | Hinckley et al. |
| 2003/0182332 A1* | 9/2003 | McBrearty et al. .......... 707/206 |
| 2004/0064433 A1 | 4/2004 | Thier et al. |
| 2005/0216831 A1* | 9/2005 | Guzik et al. ................. 715/513 |
| 2006/0010164 A1 | 1/2006 | Netz et al. |
| 2006/0020509 A1 | 1/2006 | Strain et al. |
| 2006/0122976 A1 | 6/2006 | Baluja et al. |
| 2006/0173731 A1 | 8/2006 | Scarpelli |
| 2006/0235778 A1 | 10/2006 | Razvi et al. |
| 2007/0067738 A1 | 3/2007 | Flynt et al. |
| 2007/0176898 A1 | 8/2007 | Suh |
| 2007/0188450 A1 | 8/2007 | Hernandez et al. |
| 2007/0239660 A1* | 10/2007 | Tien et al. ........................ 707/2 |
| 2007/0252821 A1 | 11/2007 | Hollemans et al. |
| 2007/0262964 A1 | 11/2007 | Zotov et al. |
| 2008/0015912 A1 | 1/2008 | Rosenthal et al. |
| 2008/0065467 A1 | 3/2008 | Nyegaard |
| 2008/0077806 A1* | 3/2008 | Cui et al. ...................... 713/193 |
| 2009/0037439 A1* | 2/2009 | Effern ............................ 707/100 |
| 2009/0106640 A1* | 4/2009 | Handy et al. ................. 715/212 |
| 2009/0146968 A1 | 6/2009 | Narita et al. |
| 2009/0153492 A1 | 6/2009 | Popp |
| 2009/0157773 A1 | 6/2009 | Takano et al. |
| 2009/0177667 A1 | 7/2009 | Ramos et al. |
| 2009/0313279 A1* | 12/2009 | Tomaszewski ............... 707/102 |
| 2009/0327975 A1 | 12/2009 | Stedman |
| 2010/0023865 A1 | 1/2010 | Fulker et al. |
| 2010/0033422 A1 | 2/2010 | Mucignat et al. |
| 2010/0037184 A1 | 2/2010 | Sie |
| 2010/0042715 A1* | 2/2010 | Tham et al. ................... 709/224 |
| 2010/0042954 A1 | 2/2010 | Rosenblatt et al. |
| 2010/0058248 A1 | 3/2010 | Park |
| 2010/0070348 A1 | 3/2010 | Nag |
| 2010/0070896 A1 | 3/2010 | Attinger |
| 2010/0077468 A1 | 3/2010 | Pragides et al. |
| 2010/0083111 A1 | 4/2010 | De Los Reyes |
| 2010/0083179 A1 | 4/2010 | Decker et al. |
| 2010/0088641 A1 | 4/2010 | Choi |
| 2010/0100367 A1 | 4/2010 | Hopkins |
| 2010/0125816 A1 | 5/2010 | Bezos |
| 2010/0153996 A1 | 6/2010 | Migos et al. |
| 2010/0156818 A1 | 6/2010 | Burrough et al. |
| 2010/0175026 A1 | 7/2010 | Bortner et al. |
| 2010/0283750 A1 | 11/2010 | Kang et al. |
| 2010/0313125 A1 | 12/2010 | Fleizach et al. |
| 2011/0029420 A1 | 2/2011 | Bianco et al. |
| 2011/0029934 A1 | 2/2011 | Locker et al. |
| 2011/0061013 A1 | 3/2011 | Bilicki et al. |
| 2011/0181526 A1 | 7/2011 | Shaffer et al. |

FOREIGN PATENT DOCUMENTS

| | | |
|---|---|---|
| EP | 1840717 | 10/2007 |
| EP | 2031549 | 3/2009 |
| EP | 2037400 | 3/2009 |
| EP | 2109031 | 10/2009 |
| EP | 2144425 | 1/2010 |
| WO | 2001/078055 | 10/2001 |
| WO | 2005103863 | 11/2005 |
| WO | 2005093550 | 10/2006 |
| WO | 2007068279 | 6/2007 |
| WO | 2007083289 | 7/2007 |
| WO | 2008109281 | 9/2008 |
| WO | 2009015448 A1 | 2/2009 |
| WO | 2009045279 | 4/2009 |
| WO | 2010046147 | 4/2010 |
| WO | 2010141213 | 12/2010 |

OTHER PUBLICATIONS

U.S. Appl. No. 13/213,657, filed Aug. 19, 2011, Inventor: Claus Heinrich.

* cited by examiner

METHOD FOR SELECTING A DATA SET FROM A PLURALITY OF DATA SETS BY MEANS OF AN INPUT DEVICE

FIELD OF THE INVENTION

The present invention relates to the field of computer systems, and more particularly without limitation to the field of selecting a data set by means of one or more movements of an input device.

BACKGROUND AND RELATED ART

US2006/0173731A1 shows a system for facilitating employee evaluations having a graphical user interface for the user. The software application provides personalized desktop portaling for the reviewer as well as rubrics and templates for establishing evaluation criteria for various positions and job descriptions. Report assembly modules generate an evaluation report that includes declarative statements corresponding to checklist entries as well as inclusion of evaluator comments.

In US2008/0065467A1, US2006/0020509A1 US2008/0015912A1 and US2010/0070348A1, various methods are described relating to the evaluation of business-related entities such as supply/demand equities for jobs, historical production data, relating to workforce management, and business performances.

US 2006/0010164 describes a centralized key performance indicator framework consistent therein KPIs can be defined in centrally stored in a data store. A generic application program or users thereof can interact with and display KPI data without knowing anything a priory about the stored data or the structure thereof. W2009/154484A2 describes a method and system for data with utilization, wherein a learning algorithm is used. US 2006/0235778 A1 describes a method for selecting performance indicators for organizations.

US 20100125816 discloses a method for providing inputs to a mobile device by tilting the device to the right or left.

WO 2010/046147 A1 relates to a method for displaying information wherein a partial amount of a list is displayed on a display surface. That partial amount comprises a plurality of list entries. The display partial amount of the list is modified by a first operating action by a user, wherein the list entries of the list are successively run through by the first operating action. Multiple list entries are skipped by means of a second operating action in order to reach a list entry that is not contained in the partial amount of the list entries displayed. Such an operation may be, for example, a movement of a finger on a screen.

US 20100037184 A1 discloses a portable electronic device including a motion detection module and a storage system. The motion detection module is configured for determining a direction of movement of the portable electronic device when orientation of the portable electronic device has been changed. The motion detection module is configured for generating an input signal associated with the movement and providing the input signal to an application of the portable electronic device to initiate an operation performed by the application. The input signal includes menu position information of a menu item of the application.

US 20070067738 A1 discloses a method for providing an improved user interface for mobile devices. Access to data and services from multiple software applications can be provided through a group of list items. Each group or list can include multiple items, which can be associated with data or tasks from multiple applications.

US 20100175026 A1 describes a system and method which graphically displays similar or disparate forms of information for the purpose of sorting, searching, organizing, accessing, and using the information that contains a revolving carousal. US201058248 A1 describes a method for generating a graphical user interface for building a management system. The method includes rendering a graphical representation of a three-dimensional object in the graphic user interface, whereby one or more surfaces of the graphical representation of this three-dimensional object includes a plurality of windows respectively configured to host a widget.

WO 2005/093550 A2 describes a method and apparatus for operating a portable device based on an accelerator. And etc. meter attached to a portable device detects a movement of the portable device. In response, a machine executable code is executed with the portable device to perform one or more predetermined user configurable operations.

US 2010/0156818 discloses a method and system for processing touch inputs, the method comprising: reading data from a multitouch sensing device and identifying at least one multitouch gesture based on the data from the multitouch sensing device and providing a hectic response.

US 20090153492 A1 describes an interactive media display system being operable to display media associated with a selected geographic area based on a gesture input of a user. A geographic map is displayed and a gesture input generated by a user on the touch sensitive display surface is received, the gesture input defining a selected geographic area on the geographic map.

Typically, application programs designed for managing and/or evaluating KPIs and/or complex industrial manufacturing processes are designed for receiving input from a user by means of a mouse and a keyboard however, many employees using such applications spend a considerable fraction of their working time in a plane, a train, a taxi or other form of vehicle where there is not enough space for using a mouse or a keyboard. Further, a growing fraction of employees do not use conventional notebooks or netbooks but rather use processing devices having the form of a table, for example Apple's iPhone or iPad. Said kind of mobile devices come with a touch sensitive screen and device components being operable to detect tilting and/or shaking motions applied on the mobile device by the user.

Hence, there is a need in the art for application programs for key performance indicator processing and/or performance management and employee evaluation wherein said application programs do not rely on an input of a user provided via a mouse or a keyboard.

SUMMARY

It is an objective of embodiments of the invention to provide an improved computer-implemented method and system for selecting data portions, in particular data portions related to key performance indicator processing and display. This objective is solved by the features of the independent claims. Preferred embodiments of the invention are given in the dependent claims.

A 'key performance indicator' (KPI) as used herein are any kind of parameters used to present the status and/or trends of any kind of entity, in particular organizations, companies, departments, machines, persons, and the like. Each KPI may have assigned a KPI value relating to a particular entity. A KPI may also be used for storing context information of a particular entity, e.g. the temperature or humidity of the room in which a particular machine or manufacturing process is located. In order to evaluate the performance of a particular entity, different sets of KPIs may be used. For example, a department of a company may have assigned KPIs such as the annual turnaround, the annual profit, the total number of vacation days, and the like. It may also have assigned KPIs such as the size of the department measured in square meters, the country or region a department is located at, the name of the leader of the department, and the like. Each entity may have assigned a KPI for which an aggregated KPI value can be calculated based on the KPI values assigned to its "child entities" or "child nodes". For example, although a department may not be able to take holidays itself, the total number of holidays of a department may be calculated as the sum of all holidays taken in a year by the employees of that department. In other words, a KPI is any kind of parameter which can be used to describe and/or evaluate a particular entity of the real-world and how that entity may perform in the future.

In computing, a graphical user interface (GUI) is a type of user interface that allows users to interact with electronic devices with images rather than text commands. A GUI represents the information and actions available to a user through graphical icons and visual indicators, herein also referred to as 'GUI elements', as opposed to text-based command interfaces. Actions are usually performed by a user through direct manipulation of the graphical elements.

A 'view' as used herein comprises any arrangement of GUI elements on a graphical user interface displaying a user data related to a particular topic or problem. A view may comprise selectable GUI elements allowing a user to select or modify the displayed information and/or GUI elements and to dynamically interact with the displayed GUI elements for controlling functions of the application program providing for said view.

A 'web service' as used herein denotes any kind of communication technology for exchanging data between two processing devices via a network. The term 'web service' therefore includes web services in the strict sense, e.g. RESTful web services, but also includes technologies for exchanging data via SMSs, via Http requests, via remote procedure calls (RPC), CORBA, DCOM, RMI or any other communication technology. In particular, the term web service refers to web services in the strict sense, conforming to the specification of the world wide web consortium (W3C).

An 'O-aggregated KPI value' is a value having been calculated by aggregating KPI values assigned to one or more organization nodes of an organization graph according to the topology of said organization graph by applying an aggregate function. Said aggregate function may be, for example, a summarization, a maximization, a minimization operation or a complex mathematical algorithm.

Analogously, an 'R-aggregated KPI value' is a value having been calculated by aggregating KPI values directly or indirectly assigned to one or more region nodes of a region graph according to the topology of said region graph.

A 'T-aggregated KPI value' as used herein is an O-aggregated KPI value having been calculated by aggregating KPI values assigned to one or more organization nodes of an organization graph according to the topology of said organization graph, whereby said T-aggregated KPI value in addition has assigned a rank position within an ordered list of the highest O-aggregated KPI values having been calculated for said KPI and for a plurality of organization nodes.

A 'L-aggregated KPI value' as used herein is an O-aggregated KPI value having been calculated by aggregating KPI values assigned to one or more organization nodes of an organization graph according to the topology of said organization graph, whereby said L-aggregated KPI value in addition has assigned a rank position within an ordered list of the lowest O-aggregated KPI values having been calculated for said KPI and for a plurality of organization nodes.

A 'multi-touch input device' as used herein is any processing device, e.g. a personal computer, notebook, netbook, smartphone, IPAD or the like which is capable of recognizing two or more simultaneous touches as input. For example, a multi-touch input device can comprise a multi-touch screen being operable to dynamically determine the position of one or more objects on the screen and using said data as input of the user for controlling applications and entering data.

A 'pinch gesture', as used herein is a form of multitouch user input in which the user typically touches two points on the input device with two fingers, before moving them closer together or further apart from each other.

In one aspect, the invention relates to a method for providing a plurality of aggregated KPI-values of a plurality of different KPIs from a server to one or more views of a GUI of a client processing device. The method comprises:

providing the client processing device, the client processing device being a mobile, hand-held electronic appliance, the client processing device comprising a touchscreen for displaying the one or more views of the GUI, an application program, means for receiving log-in data of a user, and a first database;

providing for a server processing device, the server processing device being operatively coupled to a second database, wherein the first database and the second database respectively comprise an organization graph, each organization node of the organization graph having assigned one or more KPI values, the server processing device comprising a plurality of web-service interfaces being accessible by the application program. Each web-service interface is operable to receive a request for one or more KPIs being particular to said interface. In addition, each interface is operable to return an aggregated KPI value read from the second database; For example, each organization node of the organization graph may represent a user or a user group of a company or another organization. The first and the second database respectively comprise a first table for storing O-aggregated KPI-values, each O-aggregated KPI value being calculated for one of the organization nodes and one of the KPIs by aggregating KPI values of said one KPI being assigned to said one organization node and to any of its direct or indirect child nodes;

receiving the log-in data of the user by the application program;

identifying one organization node of the organization graph as the organization node representing the logged-in user and using said identified node as current organization node;

A) determining one or more first KPIs for the current organization node;

B) accessing, by the application program, the first table of the first database for retrieving O-aggregated KPI values for the one or more first KPIs;

C) in case the O-aggregated KPI values could not be retrieved from the first database, determining from the plurality of web service interfaces one or more first web-service interfaces being operable to receive and process a request for the one or more first KPIs;

D) querying, by the application program, the determined first web service interfaces via a network for receiving the O-aggregated KPI values of the first KPIs;

E) storing, by the application program, the O-aggregated KPI values received from the second database in the first table of the first database;

F) displaying, by the application program, the O-aggregated KPI values retrieved from the first database or received from the second database in an organization view of the GUI, the organization view displaying the current organization node and its direct child organization nodes, the organization view enabling the user to navigate within the organization graph, whereby a selection of one of the displayed organization nodes triggers the re-execution of the steps A-F, wherein the selected organization node is used as the current organization node.

Said features may be advantageous for a plurality of reasons: the client processing device doesn't have to calculate any aggregated KPI value by itself. Rather, the client processing device merely reads aggregated KPIs from the first database. Only in case the requested aggregated KPI values are not contained in the first database, the client device tries to receive the aggregated KPI values from the server processing device over the network. This reduces the network traffic and in addition guarantees that the client processing device is operable to work even in case no network connection is available, provided that the first database is filled with data. Said features may be particularly advantageous, because a network connection may not always be available, e.g. during a flight or in many hospitals. A client which would completely rely on the data provided by the server would not be operative without a network connection.

In a further advantageous aspect, the processing load of the client device is reduced, because the client device never calculates the aggregated KPI values but rather receives the aggregated KPI values from the second database running on the server processing device. A server processing device may be accessed by a plurality of client computing devices. A server processing device is typically equipped with sufficiently powerful hardware resources for processing a huge amount of data and for efficiently calculating the aggregated KPI values. Thereby, also client processing devices with limited hardware resources can be used for quickly providing the user with KPI values having been aggregated over a plurality of different entities.

In a further advantageous aspect, the aggregated KPI values requested by the application program are not requested and received via one single web service interface, but rather via a plurality of web service interfaces, whereby each web service interface represents a characteristic set of KPIs. Said features may be advantageous in particular if a huge amount of different KPIs is requested by the application program, and in particular when the application program needs to evaluate different sub-sets of KPIs in different application contexts. By using a plurality of web service interfaces respectively representing different sets of KPIs, it is not necessary to exchange aggregated data values of all KPIs via one single generic interface in one single, generic data structure but it is rather possible to individually query one or more interfaces representing the requested KPI sub-sets which are needed in a particular application context. Using highly generic interfaces may have the drawback that the server and also the client has to invest more processing effort in order to extract from a generic data format the information the client is actually interested in a given application context. Said effort can be reduced by using a plurality of different interfaces being particular to a sub-set of one or more KPIs being of interest in a particular application context.

In a further advantageous aspect, 'modularizing' the retrieval of aggregated KPIs by means of a plurality of web services respectively representing different sets of KPIs may be advantageous, because in case said interfaces are used for updating the first database, the sequence of KPIs whose aggregated values are retrieved from the second database during the update process can be dynamically changed by changing the sequence of web service interfaces queried during the update process. Thus, the data a user is most interested in can be downloaded first, whereby the data and the corresponding KPIs considered as most important may vary between different users and/or application contexts. For example, a user of the client processing device may use the application program in five different application context, e.g. for evaluating a first, a second and a third industrial manufacturing process and for evaluating the financial figures of a first and a second department of a company. The five application contexts respectively require receiving aggregated KPI values for the KPI subsets {KPI1-KP16}, {KPI4-KPI12}, {KPI1, KPI13}, {KPI5-KP126} and {KPI20-KP130}.

According to embodiments, the web services are web services in the strict sense of the word. They are software systems designed to support interoperable machine-to-machine interaction over a network having an interface described in a machine-processable format specified in a Web Services Description Language WSDL and using SOAP messages. Using said type of web services may be particularly advantageous as they allow the provision of a plurality of individually addressable (and therefore modular) interfaces for retrieving aggregated KPI values from the server, each web service being callable by the same set of client side class libraries and interfaces.

The client processing device, herein also referred to as 'client', 'frontend data processing means' or 'frontend' can be, for example and without limitation, a mobile phone, an iPad, an iPod, smart phones based on various operating systems such as android, and the like. The network can be, for example, the Internet, an intranet, a mobile communication network, and the like. The server computer system and the operatively connected second database may respectively be stand-alone systems or may be provided as part of a cloud if cloud computing technology is utilized.

The server computing system, herein also referred to as 'server', 'backend data processing means' or 'backend' may comprise or be operatively coupled to at least one data source, such as an enterprise resource planning (ERP) system or one or more databases. The at least one data source can be an integral part of the server computer system or of an external processing system. The server computer system may comprise a KPI aggregation module for retrieving non-aggregated KPI values from the ERP system, aggregating the retrieved KPI values and storing the aggregated KPI values into the second database. The aggregation may be executed according to a predefined schema, e.g. on a daily or weekly basis, whereby said aggregation may be based, for example, on the execution of cron jobs.

In a further advantageous aspect, specifying sets of KPIs being provided via one common web service and a corresponding web service interface allows each web service running on the server processing device to cache the aggregated KPI values having been retrieved from the second database. The cached aggregated KPI values are then immediately available in case another client device should request the same set of KPIs. Thus, a two-fold caching of requested aggregated KPI values can be provided, a first caching provided by the individual web services and a second caching provided by database-internal caching routines implemented by the second database. Thus, data retrieval is further accelerated as requested aggregated KPI values are read from the cache instead of the second database if available.

In a further advantageous aspect, providing multiple different web service interfaces and corresponding web services allows to create web services which are adapted for providing all aggregated KPI values which are necessary in order to display a particular view on the touch screen of the client device.

For example, a user may log into the application program running on the client. Upon having received the user's login data, an organization node representing said user is identified by the application program, and information on said user as well as on persons or other entities being subordinates of the logged-in user according to the topology of the organization graph are displayed in the organization view. For example, said organization view may display one GUI element for the logged-in user and one element for each direct subordinate of said user. Each of said GUI elements may comprise one or more aggregated KPI values, e.g. the number of vacation days, the turnaround, the profit achieved by the represented person. Other KPI values such as the temperature of a room wherein several manufacturing processes are performed may be completely irrelevant in this context and for a current view. The current view may be chosen by the application program automatically or may be displayed in response to a selection by the user. Accordingly, specifying a particular web service and corresponding interface which merely provides for the KPIs 'vacation days', 'turnaround', 'profit' but not for any other KPIs is advantageous, because for a particular view only some web services and only a fraction of the available aggregated KPI values need to be retrieved.

In a further advantageous aspect, a synergistic effect is reached by providing the aggregated KPI values via a plurality of different web service interfaces in combination with trying to receive the aggregated KPI values from the first database before accessing the second database: the access to the second database is avoided whenever possible, thereby avoiding unnecessary network traffic and increasing, at the same time, the speed of retrieving the aggregated KPI values for display. Said approach also increases the robustness against a network failure. By using multiple KPI-set specific web service interfaces instead of one generic interface, the amount of data transferred and the time until said data can be used by the client is reduced. Thus, both features help avoiding network traffic and to minimize the necessary traffic.

The first KPIs can be determined for the current organization node in various ways. For example, all KPIs stored in association with said organization node can be used. According to some embodiments, the set of KPIs stored in association with a particular organization node may vary or the application program may dynamically determine a sub-set of all KPIs stored in association with a particular organization node and use said determined sub-set as first KPIs. For example, said sub-set may be determined in dependence on the view currently displayed by the user or other parameters of the current application context. The determination of the first KPIs may likewise be based on a user selection provided dynamically via a GUI and/or provided upon program start, e.g. based on a configuration file. The KPIs of interest may also depend on the hierarchical level of the current organization node within the organization tree. For example, some KPIs may be defined only for company branches, not for individual departments and vice versa.

According to the embodiments, the plurality of different views is generated for display by the application program.

According to the embodiments, the first and the second database further respectively comprise a region graph, the region graph comprising region nodes, each region node representing a geographic region. Each region node is stored in association with one or more of the organization nodes, whereby the first and the second databases respectively comprise a second table for storing R-aggregated KPI-values.

Each R-aggregated KPI value is calculated for a unique combination of one of the region nodes and one of the KPIs by aggregating KPI values of said one KPI being assigned to any of a set of organization nodes, said set comprising said one organization node and its direct and indirect child organization nodes, wherein the organization nodes of said set being stored in association with said one region node. Thus, aggregated KPIs can be calculated e.g. for all subordinates of a particular employee whose corresponding organization nodes have assigned a region said employee, e.g. a CEO, is interested in.

According to the structure of the second table each table row represents a unique combination of a region node and an organization node, each of the KPIs being represented by one column of the second table, whereby each cell specified by a particular row and a particular KPI-representing column is used for storing an R-aggregated KPI-value calculated for the KPI of said cells' row and for the region node and the organization node of said cell's column.

The method further comprises the steps of: displaying a region view on the GUI, wherein at least some region GUI elements of the region view respectively represent one of the region nodes; receiving a signal being indicative of one of the region GUI elements selected by the user; identifying one region node of the region graph as being represented by the selected region GUI element and using the identified region node as current region node; G) determining one or more second KPIs for the current region node; H) accessing, by the application program, the second table of the first database for retrieving R-aggregated KPI values for one or more second KPIs for the current region node; I) in case the R-aggregated KPI values could not be retrieved, determining from the plurality of web service interfaces one or more second web-service interfaces being operable to receive and process a request for the second KPIs; J) querying, by the application program, the determined second web service interfaces via a network for receiving the R-aggregated KPI values of the second KPIs; K) storing, by the application program, the R-aggregated KPI values received from the second database in the second table of the first database; L) displaying, by the application program, the R-aggregated KPI values retrieved from the first database or received from the second database, in the region view of the GUI, the region view displaying at least one region GUI element representing the current region node, the region view enabling the user to navigate within the region graph, whereby a selection of one of the displayed region nodes triggers the re-execution of the steps G-K, whereby the selected region node is used as the current region node.

According to embodiments, a region view may comprise a graphical map, e.g. a global map, a continent-specific map or a regional map. The user may be enabled to zoom into or out of the map and to select one or more geographic sub-regions, e.g. a particular country, a particular city and the like. Each such sub-region may be represented by a region GUI element, e.g. a part of the geographic map. Upon selecting a particular country, the region node representing the selected country is selected as current region node.

The second KPIs can be determined for the current region node in various ways. For example, all KPIs stored in association with an organization node stored in association with the current region node can be used. According to some embodiments, the set of second KPIs may dynamically be determined by the application program as a sub-set of said theoretically available KPIs. For example, said sub-set may be determined in dependence on the view currently displayed by the user or other parameters of the current application context. The determination of the second KPIs may likewise be based on a user selection provided dynamically via a GUI and/or provided upon program start, e.g. based on a configuration file. The KPIs of interest may also depend on the hierarchical level of the current region node within the region graph. For example, some second KPIs may be defined only for countries, not for cities and vice versa.

According to embodiments, the first and the second database further respectively comprise a third table. According to the structure of the third table each row represents a unique combination of one particular organization node and one particular KPI. Each of a plurality of 'T-columns' respectively represents a top rank position, and each of a plurality of 'L-columns' respectively represents a low rank position. The 'T-aggregated KPI values' and the 'L-aggregated KPI values' are calculated for each unique combination of one of the KPIs and one of the organization nodes by:

- using all organization nodes being direct child nodes of said one organization node as current organization nodes,
- for each of said current organization nodes, and for said one KPI, calculating an O-aggregated KPI value,
- sorting said O-aggregated KPI values in descending order for generating a sorted list of the top O-aggregated KPI values,
- storing at least some of said sorted O-aggregated KPI values at the top positions of said sorted list as T-aggregated KPI values into a corresponding number of cells, whereby each T-aggregated KPI value is stored into a cell whose column represents a top rank position being identical to the position of said T-aggregated KPI value within said sorted list; and
- storing at least some of said sorted O-aggregated KPI values at the lowest positions of said sorted list as L-aggregated KPI values into a corresponding number of cells, whereby each L-aggregated KPI value is stored into a cell whose column represents a low rank position being identical to the position of said L-aggregated KPI value within said sorted list;

The method further comprises the steps of:
- Displaying a top/low view, wherein one or more T/L GUI elements of the top/low view respectively represent one of the KPIs,
- Receiving a signal being indicative of one of the T/L-GUI elements having been selected by the user;
- determining one or more third KPIs;
- accessing, by the application program, the third table of the first database for retrieving T- and/or L-aggregated KPI values for each of said third KPIs,
- in case the T- and/or L-aggregated KPI values could not be retrieved, determining from the plurality of web service interfaces one or more third web-service interfaces being operable to receive and process a request for the third KPIs,
- querying, by the application program, the determined third web service interfaces via the network for receiving the T- and/or L-aggregated KPI values of the third KPIs,
- storing, by the application program, the T- and/or L-aggregated KPI values received from the second database in the third table of the first database, and
- displaying, by the application program, the T- and/or L-aggregated KPI values retrieved from the first database or received from the second database in the top/low view of the GUI.

A T-column is a column of the third table of the first or second database representing a top rank position, a L-column is a column of said third table representing a low rank position, whereby the rank refers to an ordered list of aggregated KPI values.

As for the first and second KPIs, the third KPIs can be determined in various ways. For example, all KPIs stored in association with an organization node stored in association with the current organization node can be used. According to some embodiments, the third KPIs may dynamically be determined by the application program as a sub-set of said theoretically available KPIs. For example, said sub-set may be determined in dependence on the view currently displayed by the user or other parameters of the current application context. The determination of the second KPIs may likewise be based on a user selection provided dynamically via a GUI and/or provided upon program start, e.g. based on a configuration file. The KPIs of interest may also depend on the hierarchical level of the organization node within the organization graph.

According to embodiments, a top list of aggregated KPI values is calculated for a particular organization node, e.g. a department of a company, or a particular branch of said company. For said organization node, a set of direct or indirect child nodes is determined, e.g. all employees working for a department. In order to calculate the top list for the KPI 'profit', the 'profit' value reached by each single employee of said department is calculated, e.g. by summing up profit figures for a particular year. The aggregated KPI values of said child organization nodes are sorted in descending order. The employee at the top position of the sorted list of KPI 'profit' is the employee having reached the highest profit in the year considered when comparing his profit value with the profit values reached by the other employees of that department. A user wanting to know the 10 top performing employees in regard to profit for a particular department merely has to specify the KPI he's interested in, has to select the organization node representing the department as current node and request for display of the top 10 T-aggregated KPI values for the KPI 'profit'. The 10 employees performing worst can be determined analogously.

According to embodiments, the aggregated data values are calculated by a data aggregation module running on the server processing device, wherein the structure of the first, second and third table of the first database is respectively identical to or is a sub-structure of the structure of the first, second and third table of the second database. According to some of said embodiments, at least some organization nodes in the first and/or second database are stored in association with a compressed image of the user represented by said organization node, the image compression being executed by said data aggregation module. Said features may be advantageous because the structure of the first as well as of the second database can be optimized for efficiently retrieving data to be displayed in a particular view of the client device. Compressing images of users corresponding to organization nodes is advantageous as said images can be transferred efficiently from the server to the client and help the user in navigating within the organization graph displayed on the screen of the client device.

According to embodiments, the content of the first table of the first database is automatically filled by the application program with O-aggregated KPI values by submitting a plurality of requests to the first web service interfaces until for each KPI and for each organization node being the organization node representing the logged-in user or being one of the direct or indirect child nodes of said organization node the corresponding O-aggregated KPI value is received from the second database and is stored to the first table of the first database.

In addition or alternatively, the second table of the first database is automatically filled by the application program with R-aggregated KPI values by submitting a plurality of requests to the second web service interfaces until for each combination of a region node and an organization node, said organization node being the organization node representing the logged in user or any of its direct or indirect child nodes, all R-aggregated KPI values stored in the second database are received and are stored to the second table of the first database.

In addition or alternatively, the third table of the first database is automatically filled by the application program by submitting one or more requests to the third web service interfaces for receiving for all combinations of one of the KPIs and one organization nodes, said organization node being the organization node representing the logged in user or any of its direct or indirect child nodes, all T-aggregated KPI values and all L-aggregated values contained in the second database, the received L- and T-aggregated data values being stored to the third table of the first database.

According to embodiments, the first table of the first and second database is adapted to quickly provide O-aggregated KPI values for display in an organization view, while the second table of said databases is particularly adapted for quickly providing R-aggregated KPI values to a region view. Providing the aggregated KPI values via a plurality of interfaces is advantageous, because said modularity of data retrieval allows to specifically retrieve those aggregated KPI values first which are considered as particularly relevant for the logged-in user. Other aggregated KPI values may be retrieved at a later moment in time via a background process while the user works on the aggregated KPI values already retrieved and stored for the current organization and its direct child nodes in the first database.

According to embodiments, the first database is an in-memory database. The first database is automatically kept up-to-date by executing the following steps: M) determining, by the application program, whether the first database is empty or is outdated; N) in case the first database is outdated, the application program automatically deletes the aggregated KPI values stored in the first database, thereby creating an empty database; O) in case it was determined in M) that the first database is empty or in case the database was emptied in step N), operating the application program in update mode, wherein in the update mode the step of accessing the first database for retrieving O-, R-, L- and/or T-aggregated KPI values is skipped, and wherein only the second database is accessed via the plurality of web services for retrieving the O-, R-, L- and/or T-aggregated KPI values for display, wherein in the update mode the application program automatically, as a background process, submits one or more update requests to the plurality of web-services until the first database is updated, and wherein the update-mode is terminated as soon as the first database is updated.

Depending on the embodiment, the step of determining whether the first database is outdated may be executed by comparing a timestamp or a hash value of the first database with a timestamp or a hash value of the server database. The expression of determining that a database is 'empty' will in the following also subsume determining that a database is not existent. Whether the content of a database is deleted while its structure is left unchanged or whether the whole database including the table structure is deleted is considered herein as a mere design choice. In the latter case the application program may comprise routines to create the database structure including the tables de novo.

According to embodiments, the first database is an in-memory database and the client processing device comprises a computer-readable, non-volatile storage medium. A third database is persistently stored by the application program in said non-volatile storage medium, the third database being an encrypted copy of the first database, the encryption being executed by the application program. The first database is not encrypted. The application program, upon program start, creates the first database by reading the persistent first database from the non-volatile storage medium, decrypting the content of the third database, initializing the first database in the memory and filling the first database with the decrypted content of the third database.

Said features may be advantageous, because they may protect the data in case the client device should get stolen or lost. As the data of the in-memory database is destroyed when the application program is terminated, the data of the in-memory database does not need to be protected from unauthorized access. This is not the case, however, for the data stored in the persistent, third database. By encrypting and decrypting data stored in the third database, potentially sensitive data relating the organization structure and key performance indicators of companies are reliably protected against unauthorized access even in case the client device gets lost.

According to embodiments, the first database and, if present, also the third database, is emptied upon each termination of the application program. Emptying a database may be based on deleting the content of the database or deleting the whole database and its tables. Said features may provide for an even more secure, "zero footprint" application program wherein all aggregated KPIs are retrieved from the second database and are stored only temporarily to the first database during a single working session of the logged-in user.

According to embodiments, the application program is operable to automatically and dynamically switch between using the first and the second database for retrieving the O-, R-, L- and/or T-aggregated KPI values to be displayed. According to said embodiment, the first database is used by the application program by default. In case the first database is outdated, the application program switches to the second database and updates the first database in parallel. In case no network connection to the server is available when starting or executing the update of the first database, the application program does not start the updating process and automatically uses the first database or uses those parts of the first database having already been received during an update process before the network connection was terminated. Said features may be advantageous particularly if used on a client device currently in "flight mode". In flight mode, application programs are still in operation although the network connection is turned off or is not available. Said features ensure that a user can work based on the data currently stored in the first database in case not network connection to the second database is available.

According to embodiments, the O-, R-, T- and L-aggregated KPI values are pre-calculated by the server processing device for all organization nodes of the organization graph, the pre-calculated O- and R-aggregated KPI values being stored in the second database.

According to other embodiments, all O-, and R-aggregated KPI values are pre-calculated while the L- and/or T-aggregated KPI values are pre-calculated by the server processing device only for those organization nodes belonging to the n top hierarchical levels of the organization graph, n being an integer larger 0 and smaller than 5. All other L- and/or T-aggregated KPI values are calculated by the server processing device upon having received a request via one of its web service interfaces. All L- and/or T-aggregated KPI values having been pre-calculated or having been calculated in response to the receipt of a web service request are stored in the second database. The client processing device does not calculate any of the O-, R-, L- and/or T-aggregated KPI values but rather receives each of said values from the first or second database.

Said features may be advantageous, because incrementally filling the database allows using the first database even in case not all data stored in the second database have been transferred yet. Using multiple different web service interfaces corresponding to different sets of KPIs is advantageous, because the achieved modularity of data retrieval allows to flexibly modify the sequence of requests for aggregated KPI values to be transferred from the second to the first database. Said sequence may depend on various criteria, e.g. user-specific preferences, the current organization node, the current region node or the like.

According to embodiments, the requested O-, R-, L- and/or T-aggregated KPI values returned by the requested web service interfaces are returned in the form of BLOBS. Said features may be advantageous as they provide for a particularly secure way of transferring data from the second to the first database. A 'BLOB' is a 'binary large object' that can hold a variable amount of data in binary form. The binary form, contrary to plain text form, ensures that even in case the transferred data should be tracked by a third party, said party cannot decipher the content of the transferred data. In particular if said kind of data object is combined with an encrypted persistent third database or with a 'no footprint' embodiment, said feature provides for a particularly secure means of providing aggregated KPI values from a server to a client device.

According to embodiments, the application program comprises a learning module and the method further comprises the step of: logging, by the learning module, the identity of the one or more first, second and/or third web service interfaces used over a time period; calculating, by the learning module applying a learning algorithm on the logged web service interface identifiers, for each of the web service interfaces a score value, said score value being indicative of the probability that the logged-in user using the application program submits a web service request for an aggregated KPI value to any of said first, second and/or third web service interfaces; and automatically submitting, upon a log-in operation of the user, one or more prefetching web service requests in dependence of the calculated score value. Said features may be advantageous as they provide for an application program being operable to 'learn' which sets of KPIs a logged-in user is particularly interested in. Aggregated KPI values can be retrieved, for example, when executing an update step or when filling the first database de novo. Thus, the application program may be able to retrieve, e.g. in a background process, the aggregated KPIs the user is most interested in. All other KPIs the user is typically less interested in are retrieved by the application program in the background at a later moment in time. The learning module in combination with the modularized data retrieval based on a plurality of web service interfaces thus provides for an application program which can adapt to the individual interests and needs of different users. For example, an engineer of a company may always right upon log-in navigate to one or more organization nodes representing particular machines operated by said company to retrieve KPI values such as 'produced items per hour', 'time period in failure state', 'supply state of consumables' and so on. Another employee working in the financial department may typically select, upon log-in, KPIs assigned to employees. Such KPIs may be, for example, parameters like 'monthly salary', 'holidays taken', 'monthly turnaround' and the like.

The expression the application module 'comprises' a learning module or an encryption/decryption module as used in the following indicates that said modules may be integral part of the application program, may be a plug-in of the application program or may be an independent application or program component being which can be accessed and used by the application program.

The learning module may learn the KPIs typically selected by the user and use said information to preferentially retrieve aggregated values for said learned KPIs when updating or freshly filling the first database. According to some embodiments, the organization nodes and/or region nodes typically selected by a user may further be monitored by the learning module and used for learning the KPIs which are typically of interest for a user of the application program.

According to embodiments, a higher usage probability of a web service interface is indicated by a higher score value, wherein the order of the first, second and third web service interfaces used for updating the first database depends on the score value of each respective web service. The higher the score value, the earlier the web service interface is requested during the update process.

In a further aspect, the invention relates to a computer-readable storage medium, the storage medium comprising computer-interpretable instructions which, when executed by a processor, cause the processor to execute the steps of the method according to any of the embodiments of the invention described above.

In a further aspect, the invention relates to a computing system for providing a plurality of aggregated KPI-values of a plurality of different KPIs aggregated by a server processing device to one or more views of a GUI of at least one client processing device, the computer system comprising:

the client processing device, the client processing device being a mobile, hand-held electronic appliance, the client processing device comprising:
  a touch-screen for displaying the one or more views of the GUI,
  an application program,
  means for receiving log-in data of a user, and
  a first database, the first database comprising a first table for storing O-aggregated KPI-values, each O-aggregated KPI value being calculated for one of the organization nodes and one of the KPIs by aggregating KPI values of said one KPI being assigned to said one organization node and to any of its direct or indirect child nodes,
  means for receiving the log-in data of the user by the application program,
  means for identifying one organization node of the organization graph as the organization node representing the logged-in user and using said identified node as current organization node,
 the server processing device, the server processing device being operatively coupled to a second database, wherein the second database comprises a copy of said organization graph, each organization node of the organization graph having assigned one or more KPI values, the server processing device comprising:
  a plurality of web-service interfaces being accessible by the application program, each interface being operable to receive and process a request for one or more KPIs being particular to said interface, each interface being operable to return an aggregated KPI value read from the second database, wherein the second database comprises a further first table for storing O-aggregated KPI-values, each O-aggregated KPI value being calculated for one of the organization nodes and one of the KPIs by aggregating KPI values of said one KPI being assigned to said one organization node and to any of its direct or indirect child nodes, wherein the application program is operable to execute the steps of:

A) determining one or more first KPIs for the current organization node;

B) accessing the first table of the first database for retrieving O-aggregated KPI values for one or more first KPIs for the current organization node, C) in case the O-aggregated KPI values could not be retrieved from the first database, determining from the plurality of web service interfaces one or more first web-service interfaces being operable to receive and process a request for the first KPIs, D) querying the determined first web service interfaces via a network for receiving the O-aggregated KPI values of the first KPIs, E) storing the O-aggregated KPI values received from the second database in the first table of the first database, F) displaying the O-aggregated KPI values retrieved from the first database or received from the second database in an organization view of the GUI, the organization view displaying the current organization node and its direct child organization nodes, the organization view enabling the user to navigate within the organization graph, whereby a selection of one of the displayed organization nodes triggers the re-execution of the steps A-F, wherein the selected organization node is used as the current organization node.

In a further aspect, the invention relates to a computer system that comprises a key performance indicator database, also referred herein as 'second database'. Key performance indicator definitions are stored in the database. This facilitates use of uniform key performance indicator definitions for use within a company and/or for benchmarking various companies that use these key performance indicator definitions. This way expert knowledge related to key performance indicator definitions is made readily available to a group of commercial entities or a "community" of participants.

The computer system further comprises back end data processing means, also referred to as 'server processing device', comprising means for extracting data from at least one data source, the extracted data comprising structural data being descriptive of a structure and data values specifying values for elements of the structure. The computer system further comprises means, e.g. a data aggregation module, for aggregating the extracted data using the key performance indicator definitions, and front end data processing means, herein also referred to as "client device". The front end data processing means comprise means for receiving at least a portion of the structural data and the aggregated data, user interface means for a user's selection of at least one of the key performance indicators and/or at least one element of the structure. According to embodiments, the client further comprises means for calculating a value of at least one of the key performance indicators for at least one of the elements depending on the user's selection using the received structural data and the aggregated data, and display means for displaying the value of the key performance indicator selected via the user interface means and/or the at least one selected elements of the structure. The back end data processing means further comprises means for providing at least a portion of the extracted data and the aggregated data to the front end data processing means.

The computer system may comprise at least one data source or it is adapted to be coupled to at least one data source, such as an enterprise resource planning (ERP) system or one or more other databases. The at least one data source can be an integral part of the computer system or an external system. In particular, the at least one data source can be coupled to the computer system by a network, e.g. of an intranet, the Internet, or the at least one data source can be located in the cloud, if cloud computing technology is utilized. The computer system has backend data processing means that comprises means for extracting data from the at least one data source. The means for extracting is adapted to extract data comprising structural data and data values from the at least one data source. The structural data is descriptive of a structure, such as some kind of real world structure, and the data values specify values for elements of this structure. For example, the means for extracting data comprise one or more pre-defined database queries for querying one or more of the data sources to perform the data extraction.

Further, the backend data processing means comprises means for aggregating the extracted data using the key performance indicator definitions. For example, an online analytical processing (OLAP) cube is defined using the structural data and the data values of the cube are given by the extracted data values. The aggregation of the data can then be performed along various dimensions of the OLAP cube. In accordance with an embodiment of the invention the extracted data is put into an OLAP cube. The data stored in the OLAP cube is then aggregated to provide aggregated values that are stored in separate database lists outside the OLAP cube. The aggregation is performed in accordance with the KPI definitions. According to embodiments, the aggregated data is transmitted to the front end data processing means for further processing and/or for display of specific KPI values in response to a user's selection. This is particularly advantageous as this does not require transmission of the OLAP cube. As a consequence latency times experienced by the user can be minimized. However, the OLAP cube can also be transmitted to the front end in addition to the aggregated values such as for performing an in dept data analysis in accordance with user definable data analysis paths. The resultant structural data and aggregated extracted data, i.e. the OLAP cube and/or the separate database lists, is stored within the computer system or is outputted for storage by an external storage system, such as a storage system that is located in the cloud.

According to embodiments, the computer system further comprises frontend data processing means having means for receiving at least a portion of the structural data and the aggregated data, such as a wired or wireless communication interface, in particular a digital cellular telecommunication interface, such as a GSM or UMTS interface, a WLAN interface or another kind of far-field or near-field wireless telecommunication interface. The frontend data processing means comprises a user interface for a user's selection of at least one of the key performance indicators and/or at least one element of the structure. In accordance with embodiments of the invention the user interface is implemented as a graphical user interface.

The frontend data processing means has means for calculating a value of at least one of the key performance indicators for at least one of the elements of the structure depending on the user's selection using the received structural data and the aggregated data. The resultant value of the key performance indicator that has been selected via the user interface means and/or of the at least one selected element of the structure is displayed on a display of the frontend data processing means such that the user can read the value. The structural data and the aggregated data is received by the frontend data processing means from the backend data processing means of the computer system or from an external storage system, such as a storage system that is located in the cloud.

In accordance with embodiments of the invention the backend data processing means comprises means for anonymizing the structural data and/or the aggregated data such as by encrypting an identifier that is assigned to the structural data and/or the aggregated data. The system further comprises or is coupled to a benchmarking database for storing the anonymized structural data and/or aggregated data. This facilitates the performance of benchmark analysis involving multiple companies due to the usage of uniform definitions of the key performance indicators. For example, a number of companies is registered for using the benchmarking database establishing a community that uses the same key performance indicator definitions such that a database is established for automated and cost effective benchmarking that avoids or reduces a need for benchmarking consultancy services of a consultancy firm and drastically reduces the cost related to benchmarking. The benchmarking database may comprise a set of software tools for providing services for automated benchmark analysis using the anonymized structural and/or aggregated data that is stored in the benchmarking database. According to embodiments, the benchmarking database comprising a set of software tools (106) for providing services for benchmark analysis.

According to embodiments, the key performance indicators are human resources, customer, financial, logistics, technical, and/or product key performance indicators.

According to further embodiments, the at least one data source is an enterprise resource planning system and/or multiple databases storing human resources, customer, financial, logistics, technical and/or product data. For example, the structural data and the data values for calculating such key performance indicators can be extracted from one or more data sources, such as an enterprise resource planning (ERP) system and/or multiple databases storing human resources, customer, financial, logistics, technical and/or product data.

According to embodiments, the back end data processing means comprises a data processing component for checking a criterion using the aggregated data and for sending a message to the front end data processing means, if the criterion is fulfilled, wherein the criterion is checked preferably quasi continuously, after predefined time intervals and/or event driven. For example, a threshold value is set in the backend data processing means for a specific data item of the aggregated data. If this threshold value is reached or surpassed a message is generated automatically by the backend data processing means and sent to the frontend data processing means in order to notify or alert the user of the frontend data processing means.

According to embodiments, the structure is an organization of a company, also referred to as 'organization graph', and the elements of the structure being organizational entities, also referred to as 'organization nodes', such as employees or full time equivalents or company departments, accounts, cost centers, profit centers, warehouses, product lines, customer hierarchies or other organizational units, or a technical structure, the structural data preferably including territorial assignments of the elements to locations. For example, said structure may be a region graph.

In accordance with a further embodiment the message can be an automatic reminder regarding an upcoming or actual event, such as a birthday or anniversary of an employee. In this application the criterion may be that the actual date equals the birthday or anniversary date of one of the employees of the company and the respective message is sent to that employee's manager. The fulfillment of the criterion can be checked by the backend data processing means continuously, after pre-defined time intervals and/or event driven. In accordance with an embodiment of the invention the structure that is described by the structural data is a real-world structure, such as an organization of a company, a logistical structure, a financial structure, a customer hierarchy or a technical structure. The structural data preferably includes territorial assignments of the elements to locations, such as geographical locations.

According to embodiments, the front end data processing means is a portable battery powered electronic appliance, also referred to as 'client', having a wireless interface for receiving the structural data and the aggregated data and preferably the message from the data processing component of the back end data processing means and/or for receiving program code. For example, the electronic appliance is a smartphone or a portable computer that has a wired or wireless communication interface, such as for near-field or far-field telecommunication, in particular an interface to a cellular digital telecommunication network, a WLAN, LAN or the like. Preferably the electronic appliance can also receive the message via the telecommunication interface and/or program code. In accordance with an embodiment of the invention the electronic appliance can receive the program code over the air (OTA) from an OTA server that interacts with a subscriber identity model (SIM) card that is inserted into a chip card reader of the electronic appliance. The program code is executed by a processor of the SIM card and/or by a processor of the electronic appliance in order to realize the various functional features of the frontend data processing means.

According to embodiments, the structural data and the aggregated data are transmitted separately from the back end data processing means to the front end data processing means in encrypted form. This ensures data protection of the structural and the aggregated data for maintaining confidentiality of these data. This is particularly beneficial if the structural and/or the aggregated data contain data that is to be protected in accordance with company policies and/or legal requirements or as regards data that contains competitive and/or critical technical information. For example, the structural and/or the aggregated data is transformed into an unstructured and/or encrypted bit string by the backend data processing means before it is sent to the frontend processing means via a public network.

According to embodiments, the back end data processing means is adapted to interact with multiple of the electronic appliances concurrently. Hence, the backend data processing means can provide a central platform or hub for use by a large number of electronic appliances.

According to embodiments, the electronic appliance has a multi-point touch screen for entering the user's selection of one of the key performance indicators and/or an element of the structure and/or a location for which the key performance indicator is to be calculated using the aggregated data. Use of a multi-point touch screen is particularly advantageous for convenient selection of more than one key performance indicator or for a zoom-in or zoom-out operation, such as for selection of a location on a digital map displayed on the screen. This can be combined with gesture recognition for convenient entry of a user's selection or a user command.

According to embodiments, a user may apply various gestures via the touch screen of a client device to navigate within the organization graph, within the region graph, within top- or low-lists or to select KPIs whose O-, R-, T- or L-aggregated values should be presented on the screen.

According to embodiments, the front end data processing means comprises a motion sensing unit and an acceleration sensing unit, e.g., an accelerometer, for entering the user's selection of one of the key performance indicators and/or an element of the structure and/or a location for which the key performance indicator is to be calculated. The user can enter a user selection or a user command by moving the frontend data processing means such as by displacing the frontend data processing means or by tilting and/or shaking the frontend data processing means.

According to embodiments, the front end data processing means comprises means for predictive pre-fetching of the structural and/or O-, R-, T- or L aggregated KPI values from the back end data processing means, whereby a user's selection is anticipated and the data is pre-fetched in accordance with the anticipated user behavior. For example, this is done by predicting the user's selection which can be done by means of a user model that models typical user behavior. The user model can be static or it can be coupled to a learning component for adapting the user model to the actual behavior of a specific user. The learning component can be implemented by an inference engine, a neural network or another kind of suitable learning module.

According to embodiments, the computer system further comprises a user model being descriptive of typical user interactions and a learning component for adapting the user model to the actual behavior of a specific user, wherein the user model is used for anticipating the user interaction.

According to embodiments, the front end data processing means comprises means for automatically erasing the structural data, the aggregated data, the message and/or all data that has been derived from data received from the back end data processing means. This has the advantage that no critical data, such as confidential data, that is contained in the data received from the backend or that has been derived from such data is permanently stored in the frontend avoiding unauthorized access to such data. The automatic erasure of the data can be performed after a fixed period of time, such as when no user entry is performed for a given maximum time duration, or after termination of a user session.

According to embodiments, the front end data processing means is adapted for storing the structural data, the aggregated data, the message and/or data derived from data that has been received from the back end data processing means and further comprising user authentication means for enabling access to the storage data only after successful user authentication.

In accordance with embodiments of the invention data received from the backend and/or data that has been derived is stored for a longer duration in the frontend data processing means, such as in a non-volatile memory, even if the user has terminated the session. This has the advantage that the user can access these data stored locally on the frontend data processing means for later reference. For protection of the data stored locally on the frontend data processing means user authentication means enable access to the stored data only after successful user authentication. User authentication can be performed based on any suitable user authentication method, such as password based or based on other user credentials and/or by means of biometric authentication.

According to embodiments, the front end data processing means being further adapted to provide an information channel. The information channel can be sued e.g. for posting user or user group specific information. This provides an efficient tool for targeted communication with various users or user groups within an organization.

According to embodiments, the computer system is an interactive management and employee support system, such as for human resources informational and/or transactional purposes. For example, the computer system can be adapted for informational purposes, such as for providing efficient and convenient access to specific key performance indicators for various levels of hierarchy of the company's organization. The computer system can also be used for transactional purposes such as by an employee making a request to his manager, such as an application for leave, e.g. for going on vacation, and the manager's response to such a request.

According to embodiments, the appliance being an Apple iPad, iPhone, Microsoft, WindowsPhone, Symbian, MeeGo, or Android device.

According to embodiments, the computer system further comprises means for drill-down analysis, combining key performance indicators and/or locations using user selectable predefined data analysis paths. For example, the drill-down analysis can be implemented on the frontend and/or the backend. For example the drill-down analysis is performed using OLAP cubes.

In accordance with embodiments of the invention the drill-down analysis is preprocessed, for example by using the aggregated data that is stored in the separate lists. The results of the drill-down analysis are stored for later use. Hence, when the user enters a request for performing a drill-down analysis the preprocessed result can be outputted and displayed immediately.

According to embodiments, the extracted data comprising a time series of data values, the front end data processing means being adapted to perform a temporal analysis of the data received from the back end data processing means. The data values may be time stamped or otherwise contain time information regarding their acquisition and/or validity times. The temporal analysis may facilitate the analysis of temporal variations of one or more key performance indicators. This way an efficient, convenient and powerful analysis tool is provided, such as for strategic business development analysis.

According to embodiments, the structural data and the aggregated data is transmitted from the back end data processing means to the front end data processing means by a pull operation. Preferably the pull operations are performed for pre-fetching the data in accordance with the anticipated user behavior. This way latency times experienced by the user are reduced to a minimum.

According to embodiments, the message is sent from the data processing component to the front end data processing means by a push operation.

In accordance with embodiments of the invention the message that is generated and sent automatically from the backend data processing system to the frontend is transmitted by a push operation such that the information carried by the message is immediately notified to the user with minimal delay.

According to embodiments, the computer system further comprising lists (118), such as lists comprising elements that have low or high key performance indicators values. In accordance with embodiments of the invention one or more lists can be displayed on the frontend, such as lists comprising elements that have low or high key performance indicator values. Such lists can be pre-generated for immediate user access. This has the advantage that the user does not have to wait for the generation of a list in response to entry of a respective user command but that the list is immediately available.

According to embodiments, the user interface of the front end data processing means comprising a drag and relate component for selecting an element of the structure and for relating the selected element to at least one other element of the structure, wherein the calculation of the key performance indicator is performed using the relation of the selected element to the at least one other element. Selecting an element of the structure and relating the selected element to at least one other element of the structure can be done by selecting the element by a mouse click and then keeping the mouse button depressed while moving the selected element onto another element or group of elements with which the relation is to be made. Calculation of the key performance indicator is performed using the relation of the selected elements to the one or more other elements, such as in response to the user's release of the mouse button.

According to embodiments, the user interface of the front end data processing means comprising a workflow selector for selection of a workflow by the user. For example, an employee can select a workflow for filing a request, such as a request to go on vacation. A manager may select a workflow for initiating a business transaction. Access to the various workflow starters may be controlled depending on a given users' rights definitions.

According to embodiments, the user interface of the front end data processing means comprising gesture recognition means for entry of a user's selection. This is particularly advantageous for enabling convenient entry of complex user selections, such as concurrent selection of two key performance indicators, or selection of a geographic location.

In another aspect the present invention relates to a frontend data processing apparatus. The frontend data processing apparatus is adapted for use in conjunction with a computer system in accordance with any of the embodiments of the present invention. The frontend data processing apparatus may be a portable battery powered appliance, such as a smartphone or any kind of portable computer system, in particular an iPad.

In still another aspect the present invention relates to a computer program comprising executable instructions for implementation of a computer system, a backend data processing system and/or a frontend data processing system in accordance with any of the embodiments of the present invention. The computer program can be stored on a tangible non-transitory storage medium forming a computer program product.

Embodiments of the invention are particularly advantageous as an organization, such as a company, and their elements, such as their employees and managers, can be analyzed regarding their performance in a convenient and efficient manner. KPIs that are calculated for a manager can be significant regarding that manager's individual performance and/or regarding the performance of the company's structural element, such as a department, that is represented by that manager in the company's organization. Hence, embodiments of the present invention provide a powerful data processing tool for identification of strengths and weaknesses in an organization in an objective way.

Selecting a Data Set by Means of a Multi-touch Input Device

Multi-touch input devices comprise a graphical user interface such as a touch screen allowing a user to select GUI elements in order to trigger some routines of the application program displayed. Typically, a user uses no other input device than his finger in order to select GUI elements, input user data, or trigger the execution of commands. In the following, embodiments of a method will be presented which eases the selection of GUI elements and entering user data into a multi-touch mobile device, thereby making the interaction of a user with the input device more intuitive and efficient. Said methods may be used for selecting GUI elements representing organizational nodes, KPIs, and the like and may enable a user to navigate within graphs of various topologies, e.g., organization graphs of various topologies.

In a further aspect, the invention relates to a computer-implemented method for selecting a data set from a plurality of data sets by means of a multi-touch input device. The data sets are connected with each other according to a topology of a graph. The input device has three orthogonal axes x, y, z, the x axis defining a device-centred horizontal line from the left to the right side of the input device, the y axis defining a device-centred vertical line from the bottom of the input device to the top of the input device and the z-axis defining a device-centred vertical line from the back side to the front side of the input device. The input device comprises: a multi-touch screen; a motion sensing unit being operable to detect a tilt motion of the input device around one or more of its axes; and an acceleration sensing unit being operable to detect an acceleration of the whole input device along one or more of its axes. The method comprises: a) displaying a view by the multi-touch screen, the view comprising a plurality of GUI elements, each GUI element representing one of the data sets, whereby one of the GUI elements is used as current GUI element; b) detecting, by the motion sensing unit, one or more first tilting motions; c) determining at least one candidate GUI element in dependence on the axis and direction of the one or more first tilting motions, in dependence on the current GUI element and in dependence on the topology of the graph; e) highlighting the at least one candidate GUI element; f) detecting, by the acceleration sensing unit, a first shaking motion; g) automatically selecting, upon the detection of the first shaking motion, the data set represented by the highlighted GUI element.

Depending on the embodiment, the graph may be of different topology. For example, the graph may be a tree representing an organization graph of a company or a region graph. Said graphs may be used for calculating the O-, R- L- and/or T-aggregated KPI values.

Said features may be highly advantageous as it may render the use of a mouse or a keyboard as input device unnecessary. Using a separate input device is disadvantageous, because using a mouse and/or a keyboard requires considerable space and preferentially a desktop in order to place the mouse and the keyboard accordingly. Carrying a keyboard or a mouse in addition to the mobile device is often highly inconvenient or not possible at all in many situations. For example, in spontaneously arranged meetings wherein the participants have merely mobile phones and smartphones available, but not their notebooks, specially adapted input devices are not available. In trains and planes usually there's not enough space to place the additional input devices appropriately. Some of these problems are overcome by means of various finger gestures known in the art which enable a user to interact with the device without the assistance of any additional input device. However, said approach is hampered by the fact that a finger may cover a significant portion of the mobile device. In particular, the finger will always cover exactly that particular portion of the screen displaying the GUI elements a user is currently interested in. This is highly inconvenient and may lead to erroneous selections of GUI element and/or may slow down human/machine interaction. Said disadvantages are overcome by embodiments of the method as claimed: a user is only requested to apply one or more tilting motions on the whole input device in order to select a candidate GUI element which is highlighted. Then, when the GUI element the user is interested in is highlighted, the user may apply a shaking motion on the whole device, thereby selecting the currently highlighted GUI element and trigger some actions to be executed by an application program on the one or more data values represented by the selected GUI element. Thus, a user is not required to touch the screen of his mobile device at all in order to efficiently interact with the mobile device. In addition, the user is not required to move a finger over the screen and is thus able to see all GUI elements on the fullscreen of his device. This feature is particularly advantageous for smart phones, because the screen size of smart phones is often very small and a finger may cover a significant portion of its screen.

A further advantage may be that the mobile device can be used in a context where a finger gesture cannot be applied for various reasons, e.g. because the outside temperature requires the user to wear gloves. In addition, it is a particularly convenient way of interacting with the mobile device, because the user holding the device in his hands is not required to change the position of any of his hands in order to apply a finger gesture on the touch screen. Rather, he can keep his hands where they are and simply apply one or more tilting motions and a shaking motion on the whole device. According to embodiments, each shaking motion comprises one or more accelerations in opposite directions. According to embodiments, only acceleration motions along one particular axis, in particular the y-axis, are monitored and used for monitoring and determining if and when a shaking motion was applied on the input device. Depending on the embodiment, merely an acceleration along only one single axis, for example the z axis, is to be considered. According to other embodiments, and acceleration motion along any of the three axes, for example the z-, x-, and/or the y-axis, may be considered.

Considering one or more acceleration motions along only one axis as 'shaking motion' may be advantageous, because this allows encoding shaking motions along each of the axes separately and allows assigning different functions and commands to a shaking motion along each of said axes. On the other hand, considering a shaking motion along any of said three axes may be advantageous, because this empowers the user to shake the device in any direction and still yield the same effect. Thus, the latter embodiments may be perceived by the users as particularly intuitive.

According to embodiments, the acceleration unit detects the occurrence of a shaking motion only in case a minimum number of accelerations has been detected to have been applied on the device within a predefined time period. For example, according to some embodiments, at least three acceleration steps are executed intermittently in opposite directions within a time period of 2000 milliseconds, more preferentially within a time period of 1000 milliseconds.

According to embodiments, the shaking motion is detected by means of a class library provided by an application program or an operating system of the input device, said class library being operable to receive data from the acceleration detection unit. For example, Apple' operating system iOS 3.0 provides for a UIEventSubtypeMotionShake event class. According to said library, an event is an instance of said class and is thrown whenever a shaking motion in accordance with the specifications of said class library is thrown. Corresponding libraries for other hardware platforms and/or operating systems are known in the art allowing a user skilled in the art to make use of analogous classes, in particular event- and eventhandler classes, for detecting a shaking motion.

According to embodiments, the acceleration sensing unit is a configurable accelerometer which delivers at a particular frequency the occurrence of an acceleration event or is requested with said frequency for an occurrence of said acceleration event. Depending on the embodiment, said frequency is within a range of 50-250 milliseconds, more preferentially with a frequency of 50-150 and even more preferentially with a frequency of 80-120 milliseconds. According to one embodiment, the frequency is 100 milliseconds.

According to preferred embodiment, an acceleration event is determined if the acceleration sensing unit determines an acceleration a wherein a $<-0.5$ g or a $>0.5$ g, wherein g is the gravitational acceleration of the earth. According to more preferred embodiments, an acceleration event is determined in case a $<-0.3$ g or a $>0.3$ g. According to some embodiments, said parameters are configurable, e.g., by setting said parameters in the UIAccelerometer class of the iOS API. According to some embodiments, an acceleration event along any of the axes x,y,z is recognized as acceleration event. According to preferred embodiments, only an acceleration along the y axis can trigger the recognition of an acceleration event. This may be advantageous as said axis is considered my many user as the most ergnomical axis for applying a shaking motion.

According to embodiments, the method further comprises: displaying an additional GUI element, the additional GUI element comprising data being contained in or being stored in association with the selected data set. According to some embodiments, upon application of the first shaking motion on the input device a shaking motion event is thrown by the computer-implemented method, the event triggering the automated selection of the data set in step f).

Navigating within Graphs with Tree Topology

According to embodiments, the graph represents an organization graph having a tree topology. Each displayed GUI element represents an organization node of the organization graph; the current GUI element represents a current organization node and the candidate GUI element represents a candidate organization node. When the at least one candidate GUI element is highlighted in step d), in addition one or more edges connecting the current organization node with the at least one candidate node are displayed and highlighted while all other edges of the graph are not displayed at all or are displayed in a non-highlighted manner.

Highlighting the edges connecting a current GUI element with the candidate GUI element in addition to highlighting the candidate GUI element may be advantageous, because said information indicates the path from a current node to a particular candidate node. In particular in case the user has applied multiple testing operations and has therefore moved multiple steps between and within the different hierarchical levels of the organization graph, highlighting the one or more edges connecting the current GUI element with a current candidate GUI element supports a user in recognizing at which particular position within the topology of the graph the candidate GUI element is located. A further advantage may be that highlighting the edges in addition to the GUI elements representing the nodes allows displaying a plurality of GUI elements being part of large, complex graphs also in a comparatively small screen, because highlighting the path from the current node to the candidate node in addition to highlighting the candidate node provides more information and allows a more intuitive understanding of the topology of the graph and the hierarchical relationships between the current node and a candidate node. According to preferred embodiments, all edges of the graph are displayed, but only the edges connecting the current node with the candidate node are highlighted. For example, the highlighted edges may have a brighter color and/or a thicker line than all other edges. Thus, features of said embodiments may provide for a intuitive way for navigating within an existing tree data structure and may empower a user to select one of the organization nodes of an organization graph without applying any finger gesture on the device.

According to embodiments, the one or more first tilting motions enable the user to navigate in the organization graph, wherein the one or more first tilting motions are applied on the input device around its x-axis and/or around its y-axis. Each first tilting motion around said x-axis causes the highlighting of a new candidate GUI element. The node represented by said new candidate GUI element, the new candidate node, belongs to a different hierarchical level than the candidate node whose candidate GUI element was highlighted before the application of said tilting motion. Each first tilting motion around said y-axis causes the highlighting of a new candidate GUI element, the corresponding new candidate node belonging to the same hierarchical level as the candidate node whose candidate GUI element was highlighted before the application of said tilting motion. Upon each first tilting motion the steps b)-d) are repeated, thereby enabling a user to navigate in the organization graph.

According to preferred embodiments, the navigation is implemented such that a tilting motion around the x-axis lowering the top of the input device and raising the bottom of the input device results in navigating the hierarchy one level upwards. For example, in case the graph is a hierarchical tree, navigating the hierarchy one level upwards comprises using and highlighting the parent node of the current candidate node as the new candidate node. Further, according to said preferred implementation, a tilting motion around the x-axis lowering the bottom of the input device and raising the top of the input device results in navigating the hierarchy one level downwards. For example, in case the graph is a hierarchical tree, navigating the hierarchy one level downwards comprises using and highlighting one of the child nodes of the current candidate node as the new candidate node.

A tilting motion around the y-axis lowering the left side of the input device and raising the right side of the input device results in navigating within the current hierarchical level to the left sister node of the current organization node, and a tilting motion around the y-axis lowering the right side of the input device and raising the left side of the input device results in navigating within the current hierarchical level to the right sister node of the current organization node.

According to embodiments, each of the GUI elements may represent an organizational node of the organization graph. Each node may represent, for example, a department or an employee at that department of a company. Each node may be stored in Association with additional information on said department or employee, for example, characteristic KPI values such as turnaround rate, vacation days, a photograph of the employee, e-mail address, mailing address, and the like. By selecting one of the organization nodes by means of a shaking motion applied on the mobile device, a user can trigger the execution of processing steps which result in the display of the additional information of the selected organization node or the further processing of said additional information.

Navigating within Information Sources

According to further embodiments, the graph comprises a plurality of disjoint node sets, each node set being provided by one respective information source, each node of one of said information sources representing a data portion provided by said information source. Each of the information sources is represented by an info-source pane displayed in the view. Each of said panes is one of the GUI elements and comprises a display pane. Displaying the view comprises displaying the info-source pane of each of the disjunct node sets in the view, whereby the info-source pane of a current disjunct node set is highlighted. According to the graph topology the disjoint node sets are connected to each other via first edges forming a first linear navigation path. According to the graph topology the nodes of each disjoint node set are connected to each other via second edges forming, for each disjoint node set, a second linear navigation path. The display pane may be implemented, for example, in form of a scroll pane being operable to show text of a selected data portion. Likewise, the info-source pane may display a preview of a text document in the form of an image or in the form of a file type symbol.

Said features may be advantageous, because they may empower a user to navigate between a plurality of information sources being represented by nodes arranged along a first navigation path. This can be executed very intuitive the simply by tilting the application device, e.g. around the y-axis of the device clockwise or counterclockwise. Upon each tilting movement, a new node representing an information source may be highlighted as candidate node.

According to embodiments, the data portions are pdf documents and the info-source pane comprises a preview image of the first page of said pdf document or a symbol of the pdf document file type in combination with a file name of said currently displayed pdf document.

According to embodiments, the highlighted current info source pane is not highlighted any more as soon as another info source pane is highlighted as candidate GUI element. According to embodiments, for each information source the view further comprises a data portion GUI element representing all data portions of said information source. Said data portion GUI element can be, for example, an image representing a stack of documents.

According to embodiments, the one or more first tilting motions of step b) enable by the user to navigate within the first navigation path and to select one of the information sources, the one or more first tilting motions of step b) being applied on the input device around its y-axis. A candidate info-source pane representing a candidate disjoint node set of a candidate information source is determined as the at least one candidate GUI element in step c) whereby the topology of the first navigation path is used for determining the at least one candidate GUI element. The candidate info-source pane is highlighted as the candidate GUI element in step d) and the data set selected in step f) is the set of nodes of the disjunct node set represented by the candidate info-source pane.

According to embodiments, the navigation along the first navigation path is implemented such that a tilting motion around the y-axis lowering the left side of the input device and raising the right side of the input device results in navigating along the first navigation path to the left, thereby selecting the info-source pane to the left side of the current info-source pane as the candidate GUI element. A tilting motion around the y-axis lowering the right side of the input device and raising the left side of the input device results in navigating along the first navigation path to the right, thereby selecting the info-source pane to the right side of the current info-source pane as the candidate GUI element.

According to embodiments, the method further comprising the step of: for at least the candidate disjunct node set, automatically selecting one of its nodes as a default node; displaying first text data being contained in said default node in the display pane of the candidate info-source pane; and detecting, by the motion sensing unit, one or more second tilting motions, each second tilting motions being applied by the user and enabling the user to navigate within the plurality of data portions of the candidate disjunct node set. For each of the second tilting motions, a candidate node belonging to the candidate disjunct node set is determined in dependence on the current node, the axis and direction of said second tilting motion and in dependence on the topology of the second navigation path. Then, second text data being contained in said candidate node is automatically displayed in the display pane of the candidate info-source pane.

According to preferred embodiments, the first tilting movements applied for navigating along the first navigation path are applied on an axis being orthogonal to the axis around which the second tilting movements are applied.

According to embodiments, the data portions of each disjunct node set are sorted according to a sorting criterion. The sorting criterion of each node set determines the sequence of the nodes along each of the second paths. The navigation along the second navigation path is implemented such that a tilting motion around the x-axis lowering the top of the input device and raising the bottom of the input device results in navigating along the second navigation path, thereby selecting a data portion of a higher rank according to the sorting criterion. A tilting motion around the x-axis lowering the bottom of the input device and raising the top of the input device results in navigating along the second navigation path, thereby selecting a data portion of a lower rank according to the sorting criterion.

According to embodiments, said sorting criterion is a particular KPI, said KPI having been selected by applying a two-finger gesture for at least a first time period on one of a plurality of GUI elements respectively representing different KPI.

According to embodiments, the method further comprises: detecting, by the acceleration sensing unit, a second shaking motion; and automatically executing, upon the detection of the second shaking motion, a processing operation being selected from the group comprising: displaying the display pane of the current info-source pane in full-screen size; displaying a further GUI element in the view, the further GUI element comprising meta-data on the data portion of the candidate node; displaying the first text of the default node of the current disjunct node set in the display pane of the current info-source pane; and displaying, in each of the displayed info-source panes, a text of said pane's disjunct node set's default node.

For example, each information source may correspond to a particular newsletter provider, e.g. a particular company. Each information source is represented by a particular display pane on the first few. In addition, the totality of data portions available in the information source may be displayed in the form of a further GUI element, e.g. an image comprising a stock of documents or the like. A user may select a particular newsletter provider by navigating along the first navigation path, thereby highlighting and selecting one of the display panes and the corresponding newsletter source. Then, the user may apply one or more second tilting movements, thereby navigating along the second navigation path of the selected newsletter source. For example, by applying the one or more second tilting movements, a user may navigate in a plurality of newsletter items which may be sorted according to the time and date of having received the newsletter item.

According to some embodiments, the order of the nodes along each of the second navigation paths is based on a single sorting criterion shared by all disjunct node sets. For example, all newsletter items of each of the three information sources may be sorted according to the sorting criterion 'date of recipe'.

According to preferred embodiments, the default node of each disjunct node set is determined by sorting the nodes of said node set according to said sorting criterion and using the first node of said sorted node set as the default node. A default node may be, for example, the first newsletter item having ever been received from a particular information source or the latest newsletter item having been received from said source.

According to embodiments, the sorting criterion may be, for example: a key word, a data, a KPI value, a document-ID, the author of the data portion, the issue date, publication date or a validity date of the data portion, a page number of a multi-page document represented by the data portion, an identifier of the information source, e.g. the IP number of a mail-server having submitted an e-mail, or an identifier of a machine having submitted status information to the input device. The date used as sorting criteria may be, for example, the time and date of having received the data portion via the respective information source or the time and date of having created the data portion. In case the information source is a particular newsletter provider, the sorting criterion is preferentially the time and date of having received the newsletter item. In case the information source is an electronic book, the sorting criterion is preferentially a page number. In case the data source is a particular file directory, the sorting criterion is preferentially the time and date of last modification of any of the files, the file name, the author or owner of the file, or the like.

According to embodiments, the information source may be an issuer of a newsletter; a machine submitting status information and/or error codes; a machine or an organizational unit submitting KPI-values; a data repository, in particular a file directory or a database; or an electronic document.

An information source is any interface or data repository from which information can be received by the input device. The interface can be based on a particular communication technology, e.g. e-mail, SMS, radio waves or the like. A particular type of interface may also be characterized by a particular data format of the transferred data. Such a data format can be, for example, e-mail document format, an XML document, a BLOB corresponding to a custom data structure, an RSS feed or the like. An information source may also be characterized by a particular keyword, the e-mail address of the sender etc. a particular data repository comprising, for example, one or more text files is another example of an information source within the meaning of embodiments of the invention. According to some embodiments, a single, multipage electronic document, for example an e-book, can also act as information source.

According to some embodiments, each of the data portions may be an electronic document provided e.g. as a text document; a page of an electronic document, the electronic document being the information source; or an email, e.g. an e-mail of a newsletter archive.

According to a further embodiment, the user may at first, before having selected an information source of interest and before having selected a corresponding candidate info-source pane, navigate along all second navigation path in parallel by executing one or more tilting movements around the x-axis of the device. Thereby, the content of the documents shown in each of the info-source panes is changed synchronously, allowing the user to brows in parallel through a plurality of data portions provided by a plurality of different information sources. The user may then, for example, detect a data portion being of particular interest for him and may select the information source providing said data portion by executing one or more tilting movements around the y-axis of the input device, thereby also selecting an info-source pane representing the information source of interest as candidate info-source pane. Then, the user may apply a shaking motion on the input device, thereby triggering the display of the data portion of interest shown in the candidate info-source pane in greater detail.

Navigating a Perspectively Distorted, Rotatable Circle

According to embodiments, the graph comprises a set of nodes connected to each other via a plurality of edges, said nodes and said edges forming a circular path. The displayed GUI elements represent nodes of said circular path, the displayed GUI being spread across a perceptively distorted circle representing said circular path. The expression 'perspectively distorted circle' as used herein indicates that at least the GUI elements spread across the circle are perspectively distorted. In addition, the line of the circle may be displayed thicker at the front of the circle than at its back. The displayed circle is rotatable around a centre, wherein upon rotation of the circle the size of the GUI elements change perspectively. Upon detecting the one or more first tilting motions in step b), the circle executes a rotation motion, whereby the direction of the rotation motion depends on the direction of each of the detected one or more first tilting motions. The determination of the at least one candidate GUI elements in step c) and the highlighting of said candidate GUI element in step d) are repeatedly executed while rotating the circle, each element at the front position of the circle being thereby used and highlighted as the at least one candidate GUI element, wherein highlighting the at least on candidate GUI element comprises enlarging the size of said GUI element perspectively such that the candidate GUI element is displayed larger than all other GUI elements of the circle. Upon detecting the first shaking motion in step e) and selecting the candidate GUI element in step f), data of the node represented by the candidate GUI element is displayed in one additional GUI element, said data preferentially being meta-information and/or aggregated KPI values.

Said features may be advantageous, because they empower a user to navigate within a plurality of nodes which preferentially belong to the same hierarchical level of a graph. For example, on employees of a particular department may be graphically represented as GUI elements distributed unload said rotatable circle. The CEO of a company may thus be provided with an overview of all employees of the whole department and be provided with means to select any of said GUI elements in order to display additional information of the employee represented by the candidate GUI element at the front of the circle.

According to embodiments, the rotation of the circle is stopped when the motion sensing unit determines that the input device is held or positioned such that the plane defined by its x and y axis is parallel to the earth' surface. As long as the device is held in a particular angle relative to the earth surface after having applied a first tilting movement, the circle keeps rotating. For example, at the beginning a user may hold his mobile device parallel to the Earth's surface such that the x and y axes of the mobile device define a plane being in parallel to the Earth's surface (for the sake of simplicity considered herein also as a plane). As soon as the user applies a tilting movement around the y-axis of the device in a clockwise fashion (in other words, the user lowers the right side of the device and rises the left side of the device), the circle starts rotating and keeps rotating until the user tilts the input device counterclockwise, thereby repositioning the mobile device and holding the xy-plane of the mobile device in parallel to the Earth's surface again. As a result of repositioning the mobile device, the rotating movement is stopped. According to preferred embodiments, in case the user applies a clockwise tilting movement around the y-axis, the circle also rotates in a clockwise fashion. In case the user applies a counterclockwise tilting movement around the y-axis, the circle rotates counterclockwise.

According to embodiments, the motion sensing unit is a device or component operable to detect the direction of a motion of the device thermally, optically, mechanically, electromagnetically or electrically or based on geomagnetism.

In a further aspect, the invention relates to a computer-readable storage medium, the storage medium comprising computer-interpretable instructions which, when executed by a processor, cause the processor to execute the steps of any of the embodiments described previously.

In a further aspect, the invention relates to a multi-touch input having three orthogonal axes x, y, z. The input device comprises: a multi-touch screen; a motion sensing unit being operable to detect a tilt motion of the input device around one or more of its axes; and an acceleration sensing unit being operable to detect an acceleration of the whole input device along one or more of its axes. The input device further comprises a processor and a non-transitory, computer-readable storage medium comprising instructions which, when executed by the processor, cause the processor to execute method steps for selecting a data set from a plurality of data sets according to any of the embodiments described previously.

In a further aspect, the invention relates to a computer-readable storage medium, the storage medium comprising computer-interpretable instructions which, when executed by a processor, cause the processor to execute for selecting a data set from a plurality of data sets, the storage medium being part of a multi-touch input device, the data sets being connected with each other according to a topology of a graph, the input device having three orthogonal axes x, y, z, the x axis defining a device-centred horizontal line from the left to the right side of the input device, the y axis defining a device-centred vertical line from the bottom of the input device to the top of the input device and the z-axis defining a device-centred vertical line from the back side to the front side of the input device, the method comprising:

a) displaying a view by a multi-touch screen of the input device, the view comprising a plurality of GUI elements, each GUI element representing one of the data sets, whereby one of the GUI elements is used as current GUI element;

b) receiving, from a motion sensing unit of the input device, an indication of one or more first tilting motions;

c) determining at least one candidate GUI element in dependence on the axis and direction of the one or more first tilting motions, in dependence on the current GUI element and in dependence on the topology of the graph;

d) highlighting the at least one candidate GUI element;

e) detecting, by the acceleration sensing unit, a first shaking motion;

f) automatically selecting, upon the receipt of the indication of the first shaking motion, the data set represented by the highlighted GUI element.

In a further aspect, the invention relates to a multi-touch input device having three orthogonal axes x, y, z, the x axis defining a device-centred horizontal line from the left to the right side of the input device, the y axis defining a device-centred vertical line from the bottom of the input device to the top of the input device and the z-axis defining a device-centred vertical line from the back side to the front side of the input device, the input device comprising:
- a multi-touch screen,
- a motion sensing unit being operable to detect a tilt motion of the input device around one or more of its axes, and
- an acceleration sensing unit being operable to detect an acceleration of the whole input device along one or more of its axes,
- a processor,
- a computer-readable storage medium comprising instructions which, when executed by the processor, cause the processor to execute a method for selecting a data set from a plurality of data sets, the data sets being connected with each other according to a topology of a graph, the method comprising:
  - a) displaying a view by the multi-touch screen, the view comprising a plurality of GUI elements, each GUI element representing one of the data sets, whereby one of the GUI elements is used as current GUI element;
  - b) detecting, by the motion sensing unit, one or more first tilting motions;
  - c) determining at least one candidate GUI element in dependence on the axis and direction of the one or more first tilting motions, in dependence on the current GUI element and in dependence on the topology of the graph;
  - d) highlighting the at least one candidate GUI element;
  - e) detecting, by the acceleration sensing unit, a first shaking motion;
  - f) automatically selecting, upon the detection of the first shaking motion, the data set represented by the highlighted GUI element.

Specifying a Processing Operation by Means of a Gesture

In a further aspect the invention relates to a computer-implemented method for specifying a processing operation by means of a multi-touch input device. The input device has an x-axis and an y-axis orthogonal to said x-axis, the x axis defining a device-centred horizontal line from the left to the right side of the input device, the y axis defining a device-centred vertical line from the bottom of the input device to the top of the input device and the z axis defining a device-centred vertical line from the back side to the front side of the input device. The input device comprises a multi-touch screen. The method comprises: displaying a first view on the multi-touch screen, the first view comprising a plurality of first GUI elements; receiving signal data being indicative of a gesture applied by a user on one of the first GUI elements via the multi-touch screen, the gesture being a one-finger or a two-finger gesture wherein a two-finger gesture is a gesture in which two fingers both keep in contact with the multi-touch screen while the two-finger gesture is executed; executing the processing operation in dependence on the signal data. The processing operation can be, for example, one of: sorting a plurality of data objects, each data object having assigned at least one KPI value; aggregating a set of KPI values; disaggregating an aggregated KPI value; determining one or more second views accessible by executing a further gesture on said one first GUI element; or updating the first view in dependence on a result of the processing operation. The signal comprises positional data being indicative of the x and y coordinates of each of the two fingers on the screen. The gestures described in the following may be advantageous as they may provide for a particular intuitive and ergonomic means of selecting and triggering the execution of processing operations by means of a multi-touch input device.

Using gestures instead of input devices such as a mouse or a keyboard may be advantageous as this kind of input means require no additional space and can therefore be easily applied by travelers. Selecting a data set from a plurality of data sets by means of a gesture applied on the screen of the device may be particularly advantageous in the context of managing and evaluating the performance of employees, machines, or production facilities by managers and executive employees which typically spend a considerable fraction of their working time travelling. Often, said employees need to quickly get an overview of a department but also be able to quickly get additional information of a particular employee and his or her performance. Embodiments of the invention therefore provide for an application being particularly adapted for allowing travelling CEOs to manage and evaluate the performance of their employees.

According to embodiments wherein the input device is based on a client device architecture being operable to retrieve O-, R-, T- and L-aggregated data values from a local database and, if not available from there, from a backend database, may be particularly advantageous as said architecture guarantees that the user may access the server database in case a network connection is available and may access the local database of his input device if no network connection is available—as is often the case when travelling. Thus, a combination of the client-server system architecture as described above with the selection of data portions related to employees or other business related items provides for a performance management application being particularly suited for frequent travelers.

KPI Sorting

According to embodiments, the processing operation is the sorting of the plurality of data objects. Each of the first GUI elements represents one of a plurality of different KPIs. The gesture is a two-finger gesture. A two-finger gesture is a gesture of two fingers placed on one of said first GUI elements, whereby the position of each of the fingers on said GUI element is not changed while applying the gesture. The computer-implemented method further comprises: in case said two-finger gesture is applied for at least a first time period, selecting the KPI being represented by said one first GUI element; Upon having selected the KPI, a plurality of data objects is sorted. Each of said data objects has assigned a value for each of one or more different KPs. Said data objects are sorted according to their respectively assigned value of the selected KPI. A list of second GUI elements is displayed, each second GUI element representing one of said data objects. The list is sorted in accordance with the sorting of the data object.

Said feature may be advantageous for the following reasons: requiring a two finger gesture instead of a finger gesture for triggering a sorting operation may be advantageous, because a user is provided with additional means for triggering different actions. For example, a one finger gesture applied on a GUI element may trigger a process being completely unrelated with any sorting operation. In addition, the two finger gesture is applied on a first set of GUI elements resulting in the sorting of data values being represented by second GUI elements. Thus, the effect of triggering the sorting operation by means of a two finger gesture is not negatively affected by the fingers covering at least one of the first GUI elements.

According to embodiments, the first time period is between 0 and 3000 milliseconds, and more preferentially between 0 and 2000 milliseconds and more preferentially between 0 and 1500 milliseconds.

According to embodiments, the list of second GUI elements is displayed in an order being in accordance with the sorting of the data objects. The sorting is implemented such that the first GUI elements and the second GUI elements are simultaneously displayed in the first view before the two-finger gesture is applied. Before the sorting is executed, the second GUI elements are not sorted or sorted in accordance with another sorting order. As a consequence of the selection of the KPI, the second GUI elements are sorted according to the value of the selected KPI and the first view is updated such that the sorted list of second GUI elements is shown.

According to embodiments, the sorted data objects are organisation nodes of an organization graph and the sorting criterion is one out of a plurality of KPI values having been selected by a user via the two finger gesture applied.

Line Chart

According to embodiments, the processing operation is rescaling the line chart. The first GUI element the gesture is applied on is a diagram. The x-axis of the diagram is a time axis, the y-axis of the diagram represents a second scale for indicating the height of at least one of the KPI values. The diagram comprises a plurality of vertical guide lines, the guidelines being separated from each other by a first distance representing a first time period. The diagram comprises a curve being indicative of a development of the at least one KPI value over time. The gesture is a two-finger gesture, wherein the two-finger gesture is a pinch gesture. Said pinch gesture may, for example, be executed by a user changing a distance of two of his fingers on the screen relative to each other. The distance of the two fingers along the x-axis may increase or decrease during the execution of said two-finger gesture. For example, the pinch gesture may be based on a sliding motion of said two fingers relative to each other in opposite directions.

The signal data comprises a plurality of signal data packages received at a plurality of moments while executing the two-finger gesture. According to said embodiments, the method further comprises: for each of the signal data packages, updating the displayed diagram, wherein the first distance increases proportionally to an increasing distance of the two fingers along the x-axis and wherein the first distance decreases proportionally to a decreasing distance of the two fingers along the x-axis.

According to embodiments, the pinch gesture is recognized by means of a class library being operable to recognize and handle pinch-gesture. According to embodiments, the multi-touch input device is an iPhone or an iPad having the operating system iOS. The iOS developers library provides for a UIPinchGestureRecognizer class which is operable to indicate to an application program that a pinch gesture was applied on particular sections of the screen of the multi-touch input device.

Depending on the orientation of the path of said pinch gesture on the screen, the movement of the fingers along the screen may comprise increasing the distance of the x-coordinates of the two fingers and/or increasing the distance of the y-coordinates of the two fingers. If the movement is executed in the opposite directions, the distance of the x- and/or the y-coordinates decrease.

According to some embodiments, the change in the distance in the x-coordinates of the two fingers is selectively used for rescaling the x-axis of the line-chart accordingly. Said x-axis of the line-chart represents the time. The change in the distance in the y-coordinates of the two fingers is ignored in embodiments wherein the y-axis of the line chart is not rescalable. According to further embodiments, the y-axis of the line chart is rescalable in addition to the x-axis and the rescaling of the y-axis of the line-chart is executed in accordance with the change in distance of the y-coordinates of the two fingers. This approach may be advantageous as the user can intuitively, by means of one single gesture, determine the degree of rescaling the x-axis and/or the y-axis of a line chart.

According to embodiments, the line-chart comprises first guidelines separated from each other by a first distance, the first guidelines lying parallel to the y-axis of the line chart, whereby said first distance is rescaled in accordance with the change of the distance of the x-coordinates of the two fingers. According to some embodiments, the line-chart further comprises second guidelines separated from each other by a second distance, the second guidelines lying parallel to the x-axis of the line chart, whereby said second distance is rescaled in accordance with the change of the distance of the y-coordinates of the two fingers when executing a pinch gesture.

According to embodiments, executing a pinch gesture on a line chart triggers the retrieval of O-aggregated KPI values assigned to one or more organization nodes wherein said O-aggregated KPI values have assigned a time stamp information allowing to plot a line chart curve for said O-aggregated KPI value along a time axis. Thus, a user zooming in or out a line-chart by means of the pinch gesture triggers a request for retrieving O-aggregated KPI values. The O-aggregated KPI values may be retrieved as described beforehand from the first (client side) and/or the second (server side) database as described beforehand.

Map-based Disaggregation of Data

According to embodiments, the processing operation is disaggregating the set of KPI values. The one first GUI element the two-finger gesture is applied on is a geographic map, wherein a screen distance between any two objects displayed on the screen showing the geographic map is proportional to a physical distance of two corresponding physical objects, the proportionality being based on a geographic scale. The geographic map comprises, for each of one or more first geographic sub-regions, at least one first aggregated KPI value having been aggregated on a first plurality of data objects stored in association with said first geographic sub-region. The gesture is a two-finger gesture, the two-finger gesture being a pinch gesture of two fingers placed on said one first GUI element, whereby the distance of the two fingers increases during the execution of said two-finger gesture. The signal data comprises a plurality of signal data packages received at a plurality of moments while executing the pinch gesture. The method further comprises: for each of the signal data packages, updating the geographic scale and the displayed geographic map. Thereby, each update of the geographic map is executed in accordance with the updated geographic scale, wherein the geographic scale is modified proportionally to an increasing distance of the two fingers relative to each other such that the user zooms into the displayed geographic map, thereby displaying one or more second geographic sub-regions, each second sub-region being a sub-region of one of the first geographic sub-regions. Then, for each of the second geographic sub-regions, calculating and displaying a second aggregated KPI value, each second aggregated KPI value being calculated by aggregating KPI values of a second plurality of data objects stored in association with said second sub-region. Thus, a disaggregation operation is triggered by applying a pinch gesture with increasing finger distance on a map whose map elements correspond to nodes within a hierarchical region graph.

According to embodiments, each of the first and second geographic sub-regions is a geographic nodes of a hierarchical region graph. The second geographic sub-region nodes are child-node of the first geographic sub-region nodes and the region graph is used as a drill-down graph for executing a drill-down analysis. Thereby, zooming into the map by means of the two-finger gesture triggers the execution of a disaggregation of aggregated KPI-values in accordance with the topology of the region graph and in accordance with the updated geographic scale.

According to embodiments, each zooming factor of 10% specified by the pinch gesture and resulting in zooming-into a current view of the map may correspond to moving in the hierarchical drill-down graph one level downwards, calculating an aggregated score vale for a node of said lower hierarchical level (which is less aggregated than the previously displayed aggregated value and may therefore be regarded as 'disaggregated value') and displaying said disaggregated value on the zoomed-in map.

Map-based Aggregation of Data

According to embodiments, the processing operation is aggregating the set of KPI values. The one of the first GUI element the two-finger gesture is applied on is a geographic map. A screen distance between any two objects displayed on the screen showing the geographic map is proportional to a physical distance of two corresponding physical objects, the proportionality being based on a geographic scale. The geographic map comprises, for each of one or more first geographic sub-regions, at least one first aggregated KPI value having been aggregated on a first plurality of data objects stored in association with said first geographic sub-regions. The two-finger gesture is a pinch gesture, whereby the distance of the two fingers decreases during the execution of said gesture.

The signal data comprises a plurality of signal data packages received at a plurality of moments while executing the two-finger gesture. The method further comprises the following steps: for each of the signal data packages, updating the geographic scale and the displayed geographic map, wherein each update of the geographic map is executed in accordance with the updated geographic scale. During the update, the geographic scale is modified proportionally to a decreasing distance of the two fingers relative to each other such that the user zooms out of the displayed geographic map, thereby displaying one or more third geographic sub-regions, each third geographic sub-region being a super-region of one or more of the first geographic sub-regions. For each of the third geographic sub-regions, calculating and displaying a third aggregated KPI value, each third aggregated KPI value being calculated by aggregating KPI values of a third plurality of data objects stored in association with any of the first sub-region being a sub-region of said third sub-region.

According to embodiments, each of the first and third geographic sub-regions is a geographic node of a hierarchical region graph. The first geographic sub-region nodes are childnodes of the third geographic sub-region nodes and the region graph is used as a drill-down graph for executing a drill-down analysis. Thereby, zooming out of the map by means of the two-finger gesture triggers the execution of an aggregation of KPI-values in accordance with the topology of the region graph and in accordance with the updated geographic scale. According to embodiments, each zooming factor of 10% specified by the pinch gesture and resulting in zooming-out from a current view of the map may correspond to moving in the hierarchical drill-down graph one level higher, calculating an aggregated score vale for a node of said higher hierarchical level and displaying said aggregated value on the zoomed-out map.

According to some embodiments, only the change in the relative distance of both fingers is considered irrespective of the component of said distance in the x- and/or y-axis when the pinch gesture is applied on the geographic map. Thus, embodiments may allow a particular intuitive way of rescaling the geographic map and triggering the execution of the aggregation or disaggregation task. This approach is intuitive, as a map is typically based on a single scale and the aggregation or disaggregation is based on a single drill-down graph topology.

According to embodiments, executing a pinch gesture on a geographic map triggers the aggregation and/or disaggregation of KPI values assigned to one or more organization nodes being stored in association with a region node represented by a section of the displayed geographic map. Thus, a user zooming in or out a geographic map by means of the pinch gesture triggers a request for retrieving R-aggregated KPI values corresponding to the hierarchical level of the region graph displayed. The R-aggregated KPI values may be retrieved as described beforehand from the first (client side) and/or the second (server side) database as described beforehand.

Application Context Preview

According to embodiments, the one or more second views are accessible by executing the further gesture on said one first GUI element. Each of the second views comprises one or more second GUI elements for processing one or more KPI values. The gesture consists of touching said one first GUI element by one finger for at least a first time period for selecting said first GUI element. The further gesture consists of dragging said one first GUI element to a target GUI element, the target GUI element being one of the first GUI elements, by moving the finger along a path from said one first GUI element to the target GUI element, thereby keeping in touch with the surface of the screen. After having reached the target GUI element, upon receiving a signal that the finger is removed from the screen surface, said one dragged first GUI element is dropped on the second GUI element.

Each of the target GUI elements represents one of the second views. Upon executing said dropping action, the display of the second view represented by the target GUI element is triggered. According to embodiments, the method further comprises: selecting the one first GUI element on which the gesture was applied; upon receiving the signal data, determining one or more target GUI elements to which the selected first GUI element can be dragged, said dragging to be executed by means of the further gesture; displaying, for each of the target GUI elements, a pointer GUI element being indicative of the path from the selected GUI element to said target GUI element; and upon receiving further signal data indicating a dragging movement of the selected GUI element to one of the target GUI elements, displaying parts of the second view represented by said one target GUI element.

According to embodiments, the portion of the displayed parts of the second view correlates with the portion of the path already covered while executing the further gesture. The portion of the second view displayed is 0% at the moment when selecting the one first GUI element and is 100% at the moment when the selected first GUI element is dropped on the target GUI element.

According to embodiments, the portion of the displayed parts of the second view and the portion of the first view together cover 100% of the screen. The portion of the first view is 100% at the moment when selecting the one first GUI element and is 0% at the moment when the selected first GUI element is dropped on the target GUI element.

According to embodiments, the portion of the displayed parts of the second view increases as a result of executing a sliding motion on the second view along the selected path. The sliding motion of the second view is executed in the same speed and direction as the dragging movement of the finger.

While executing the dragging movement, the second view thereby covers and hides a growing portion of the first view.

According to some embodiments, the second view moves into the screen in the form of an overlay on the first view.

According to embodiments, the second view is transparent as long as the second view covers only parts of the first view, and wherein the second view turns opaque at the moment of dropping the selected first GUI element onto the target GUI element. This may be advantageous, as the user is empowered to perceive a preview of the application context provided by the second view while still being aware of all functionalities provided by the first view. In case the user removes the finger from the screen before the target GUI is reached, the second view disappears and the data of the selected first GUI element is not manipulated.

According to further embodiments, the second view moves into the screen by executing the following steps: sliding the first view in accordance with the speed and direction of the dragging finger, whereby the area not covered any more by the first view is covered by the second view. Thus, the first and the second view are moved synchronously along the path until the finger reaches the original xy coordinates of the target GUI element. At this moment, the first view is slid completely out of the screen and the second view covers the full screen. According to said embodiment, the original path connecting the selected first GUI element and the target GUI element are determined based on the x and y coordinates of said respective GUI element at the moment when the user selects the first GUI element. As the first view moves slides together with the finger along the path to the xy coordinates of the target GUI element, the user may have to remember the position of said target GUI element as the sliding first view may not provide him with visual feedback on the portion of the path he has already passed with his finger.

According to embodiments, the selected first GUI element represents a KPI and the second view represented by the target GUI element comprises at least one GUI element for aggregating, disaggregating and/or displaying one or more values of said KPI. In other words, upon selection of the target GUI element a process aggregating, disaggregating and/or displaying one or more values of said KPI is triggered. The selected first GUI element represents an organization node of an organization graph having assigned a value of said KPI and wherein the second view represented by the target GUI element comprises at least one GUI element for displaying additional information stored in association with the organization node of represented by the selected GUI element.

According to embodiments, the selected first GUI element represents an organization node of an organization graph and the second view represented by the target GUI element comprises at least one GUI element for performance management tasks to be executed on the departments and/or employees represented by the selected first node.

In a further aspect, the invention relates to a computer-readable non-transitory storage medium being contained in a multi-touch input-device, the storage medium comprising computer-interpretable instructions which, when executed by a processor, cause the processor to execute a method for specifying a processing operation, the method comprising:
   displaying a first view on a multi-touch screen of the input device, the first view comprising a plurality of first GUI elements;
   receiving signal data being indicative of a gesture applied by a user on one of the first GUI elements via the multi-touch screen, the gesture being a one-finger or a two-finger gesture, wherein a two-finger gesture is a gesture in which two fingers both keep in contact with the multi-touch screen while the two-finger gesture is executed;
   executing the processing operation in dependence on the signal data, wherein the processing operation is selected from the group consisting of:
      sorting a plurality of data objects, each data object having assigned at least one KPI value;
      rescaling a line-chart being indicative of a KPI-value time series;
      aggregating a set of KPI values;
      dis-aggregating an aggregated KPI value;
      determining one or more second views accessible by executing a further gesture on said one first GUI element;
   updating the first view in dependence on a result of the processing operation.

In a further aspect, the invention relates to a multi-touch input device, the input device having an x-axis and an y-axis orthogonal to said x-axis, the x axis defining a device-centred horizontal line from the left to the right side of the input device, the y axis defining a device-centred vertical line from the bottom of the input device to the top of the input device and the z axis defining a device-centred vertical line from the back side to the front side of the input device, the input device comprising:
   a multi-touch screen,
   a processor,
   a computer-readable storage medium comprising instructions which, when executed by the processor, cause the processor to execute a method for specifying a processing operation, the method comprising:
   displaying a first view on the multi-touch screen, the first view comprising a plurality of first GUI elements;
   receiving signal data being indicative of a gesture applied by a user on one of the first GUI elements via the multi-touch screen, the gesture being a one-finger or a two-finger gesture, wherein a two-finger gesture is a gesture in which two fingers both keep in contact with the multi-touch screen while the two-finger gesture is executed;
   executing the processing operation in dependence on the signal data, wherein the processing operation is selected from the group consisting of:
      sorting a plurality of data objects, each data object having assigned at least one KPI value;
      rescaling a line-chart being indicative of a KPI-value time series;
      aggregating a set of KPI values;
      dis-aggregating an aggregated KPI value;
      determining one or more second views accessible by executing a further gesture on said one first GUI element;
   updating the first view in dependence on a result of the processing operation.

BRIEF DESCRIPTION OF THE DRAWINGS

In the following embodiments of the invention are explained in more detail, by way of example only, making reference to the drawings in which.

DETAILED DESCRIPTION

Figure 1:
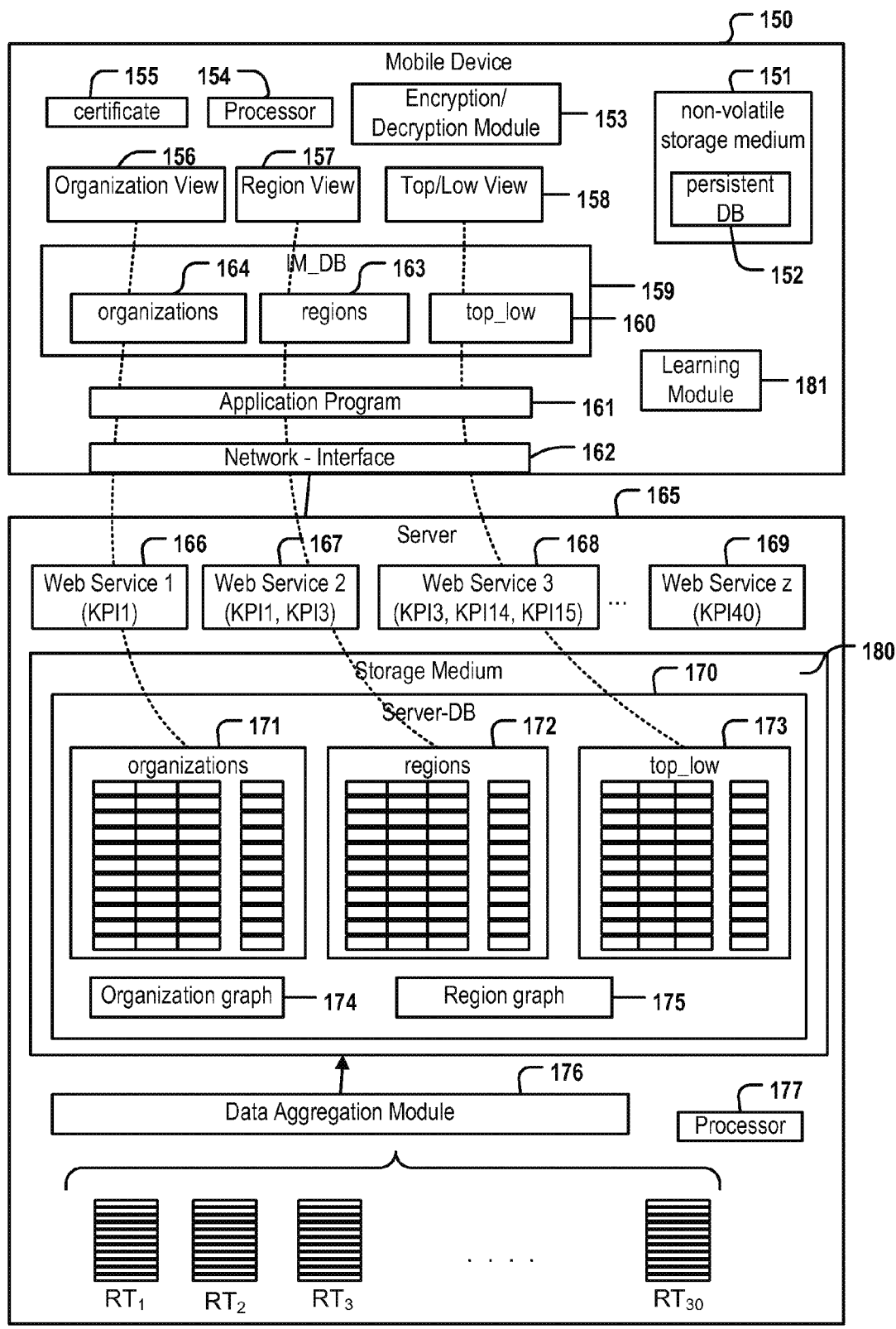
FIG. 1 is a block diagram of an embodiment of the computer system comprising a client and a server.

In the following like elements of the various embodiments are designated by identical reference numerals.

FIG. 1 is a block diagram of an embodiment of the computer system comprising a client 150 and a server 165. The client comprises a processor 154 and a first database 156 being an in-memory database. In addition, the depicted embodiment comprises a non-volatile storage medium 151 comprising computer implemented instructions specifying the application program 161. The storage medium 151 further comprises a third, persistent database 152. The mobile client device 150 comprises a user interface for displaying one of a plurality of different views, e.g. an organization view 156, a region view 157, or a top/low view 158. The region view according to some embodiments is depicted in greater detail in FIG. 13, the organization view of some embodiments is depicted in greater detail in FIG. 12 and the top/low view of embodiments of the invention is depicted in greater detail in FIG. 14. Some embodiments provide for an event view as depicted in greater detail in FIG. 15. All said views allow a user to navigate in various data structures, e.g. an organization graph or a region graph, for displaying aggregated KPI a values having been aggregated based on said structure. Such KPI values may be of technical and/or business-related nature. Examples of said KPIs are given in FIG. 17.

The application program 161 is operable to access the tables of the first database 159 for retrieving aggregated KPI values stored to the first database and for displaying said data values in one of the views 156-158. The application program is operable to send one or more web service requests to the web service interfaces 166-169 of the server 165 via network interface 162. Said network interface may be, for example, an Ethernet card or a SIM card supporting data exchange via a network, in particular a mobile network.

For example, a user may start the application program by providing log-in information. The log-in information, e.g. a user ID, is used by the application program 161 for identifying an organization node within an organization graph 300 stored to the first database. The determined organization node representing the logged-in user is considered as "current organization node". Upon having identified the current organization node, additional information may be gathered by the application program, e.g. configuration settings, the view currently displayed and/or score values provided by a learning module.

In order to immediately provide the logged-in user with a first view, e.g. an organization view 114,1508, the application program determines which kind of KPIs should be displayed to the user in the current view. The set of KPIs to be displayed to the user may depend on the position of the user and its corresponding organization node within an organization graph, on the currently selected region-or organization node, on user preferences and/or on GUI elements 1871-1875 selected by the user via the graphical user interface.

An organization view displays to the user aggregated KPI values of all of all of an editorial notes being child nodes to the node of the logged-in user. In order to populate the organization view with data, the application program determines at least the direct child nodes of the current organization node as well as the KPIs stored in association with said current organization node and its direct child nodes and determines one or more first KPIs currently of interest for the user. For the determined first KPIs, the application program then tries to retrieve aggregated data values by accessing the first database 159. The requested aggregated data values may be, depending on the current view, O-aggregated data values, R-aggregated data values, T- and/or L-aggregated data values of one or more determined KPIs. In case the first database comprises the requested aggregated KPI values, said aggregated KPI values are displayed to the user on the current view.

In case the requested aggregated KPI values could not be retrieved from the first database, the application program determines one or more web service interfaces which can be used for retrieving said aggregated KPI values. After having determined the appropriate web service interfaces, the application program 161 submits one or more web service requests to the determined web service interfaces. Upon receiving one of said web service requests, each of the requested web services 166-169 accesses the second database for retrieving the requested aggregated KPI values for the user. Each web service request may comprise information on the current organization node, region node and/or the rank of the T- or L-aggregated KPI values which have to be retrieved for a particular current view.

According to embodiments, the data structure of the second database 170 is identical to the structure of the first database 159 of the client. This facilitates the update process and tremendously increases the speed of data retrieval because both the tables of the first and the second database can be optimized for quickly returning ordered aggregated KPI values typically displayed on a particular view.

The server comprises one or more processors 177 and a data aggregation module 176. The data aggregation module processes one or more data sources $RT_1, \ldots, RT_{30}$ in order to calculate aggregated KPI values which are stored to the tables 171-173 of the second database 170. Thus, the data aggregation module provides for pre-calculated data which can be quickly requested and displayed by client devices. The data aggregation module may execute the data aggregation task on a regular basis, e.g. by means of a cron-job, once per day, per week or any other time series.

According to the depicted embodiment, the client device 150 further operates an encryption/decryption module 153 which may be an integral part of the application program or may be an independently installed software module being interoperable with the application program. Said encryption/decryption module can be used for encrypting the data of the first database when persisted to the third database 152 and for decrypting the data when starting the application and filling an empty first database with the content of the third database. The encryption/decryption module may make use of a certificate 155 of a trusted certification authority comprising the public key used during decryption for increasing the security level.

Figure 2:
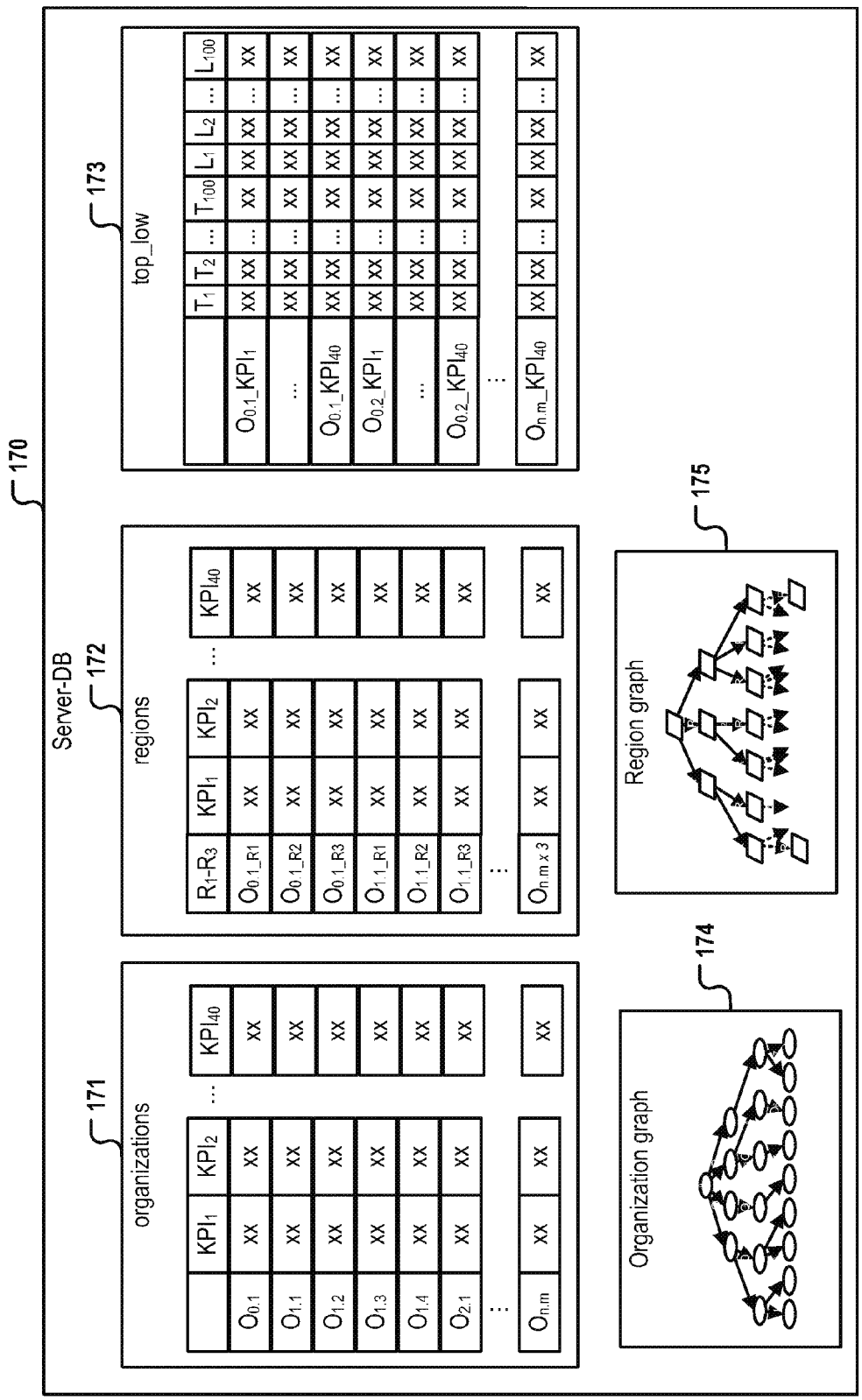
FIG. 2 depicts the structure of the second database in greater detail.

FIG. 2 depicts the structure of the second database in greater detail. As the structure of the first and the second database are identical, the description given for the second database likewise applies to the structure of the first database.

The first table 171 comprises O-aggregated KPI values having been aggregated for 40 different KPIs $KPI_1, \ldots, KPI_{40}$ and for each organization node within the organization graph 174. The structure of the first table is optimized for efficiently retrieving O-aggregated values to be displayed on an organization view. Each organization node $O_{n.m}$ corresponds to one row within the first table, whereby n indicates the hierarchical level of the respective node and m indicates the index of the organization node within all nodes of a particular hierarchical level. Each column corresponds to one KPI. Each cell within the first table comprises an O-aggregated data value having been calculated for said particular one KPI and for all direct and indirect child nodes of said one particular organization node.

Depending on the embodiment, the organization graph may be stored in the second database for example by means of an additional table comprising topological information of the organization graph, e.g. edge information whereby an edge connects two nodes of the organization graph in a directed or undirected way. According to some embodiments, topological information on the region graph may be stored in a further table of the second database (not shown).

The second table 172 comprises R-aggregated KPI values. The structure of the second table is optimized for efficiently retrieving R-aggregated KPI values to be displayed on a region view. Each unique combination of an organization node $O_{n.m}$ and a region node $R_1, \ldots, R_f$ corresponds to one row within the second table, whereby n indicates the hierarchical level of the respective node, m indicates the index of the organization node within all nodes of a particular hierarchical level and f indicates the number of region nodes of the region graph 175. In FIG. 2, f equals '3' and three different regions R1, R2 and R3 are indicated accordingly. Each column corresponds to one KPI. Each cell within the second table comprises an R-aggregated KPI value having been calculated for one particular KPI and for all direct and indirect child nodes of a particular organization node stored in association with the region node of the cell's row.

The third table 173 comprises T-aggregated KPI values and L-aggregated KPI values having been aggregated for each unique combination of one of the 40 different KPIs $KPI_1, \ldots, KPI_{40}$ with one of the organization nodes. The structure of the third table is optimized for efficiently retrieving T- or L-aggregated KPI values to be displayed in a top-view 158 or low-view. Each unique combination of one organization node $O_{n.m}$ and one KPI corresponds to one row within the third table. Each column corresponds to one out of k top ranks or one out of k low ranks. In the embodiment depicted in FIG. 2, k equals 100 and the 100 highest ("top") and 100 lowest aggregated KPI values are calculated for each KPI and each organization node. Each cell within the third table comprises a T-aggregated data value or an L-aggregated KPI value.

A T-aggregated KPI-value of a cell of the third table is calculated for the one KPI and for the one organization node represented by the row of said cell and for a top rank as indicated by the column of said cell. A L-aggregated KPI-value of a cell of the third table is calculated for the one KPI and for the one organization node represented by the row of said cell and for a low rank as indicated by the column of said cell.

Figure 3:
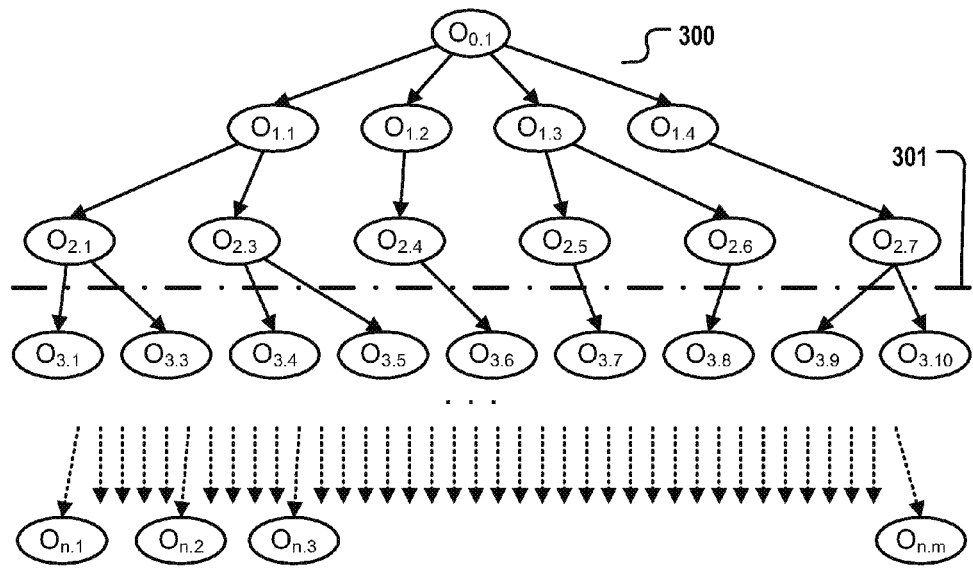
FIG. 3 depicts an organization graph comprising multiple hierarchical levels.

FIG. 3 depicts an organization graph comprising multiple hierarchical levels. The organization nodes $O_{n.1}, \ldots, O_{n.m}$ represent "leave nodes" of the graph. The line 301 separates the top three hierarchical levels of the organization graph from all other organization nodes. According to some embodiments, L-aggregated KPI values and T-aggregated KPI values are pre-calculated by the data aggregation module 176 only for organization nodes of the upper three hierarchical levels. For all organization nodes below said level, the T- or L-aggregated KPI values are calculated by the data aggregation module only in case a web service receives a corresponding request from a client. In this case, the data aggregation module triggers the calculation of a requested T- or L-aggregated KPI value and stores the calculated aggregated KPI value to the second database. Depending on the embodiment, the hierarchical level up to which the O- or R-aggregated KPI values are pre-calculated can be, preferentially, 3 (as depicted), 4 or 5. This is advantageous, because the data aggregation executed by the data aggregation module 176 is a highly demanding task and many of the aggregated KPI values may never be requested by any of the clients. It may therefore be advantageous to calculate merely T- or L-aggregated KPI values for organization nodes of the top hierarchical levels which correspond to the longest drill down path and to the largest number of organization nodes to be considered. The T- or L-aggregated KPI values may be calculated later on dynamically in response to a clients' request, thereby continuously filling the second database with aggregated KPI values.

Figure 4A:
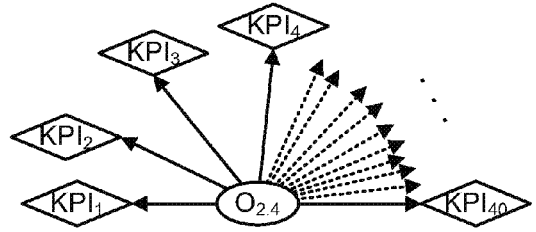
FIGS. 4-6 are illustrations of an entity-relationship model of organization nodes, region nodes, KPIs and T-/L-ranks.
Figure 4B:
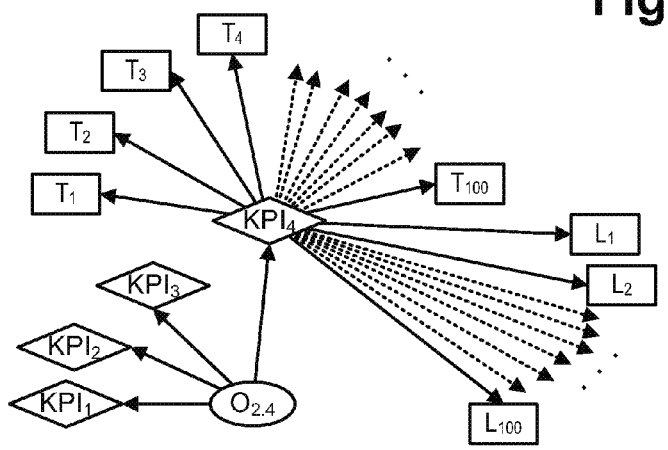
Figure 5:
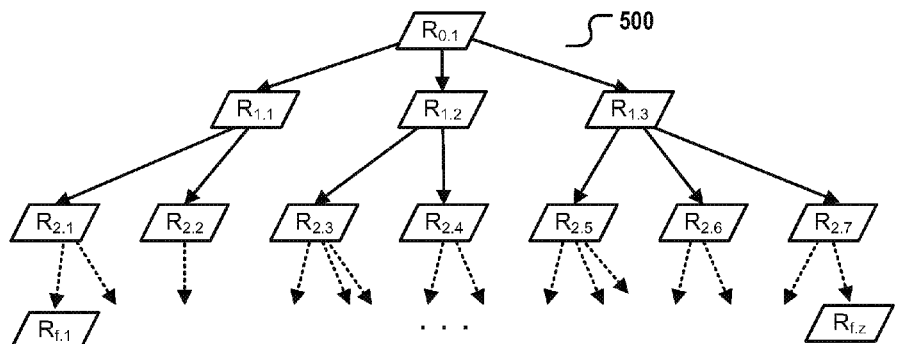
Figure 6:
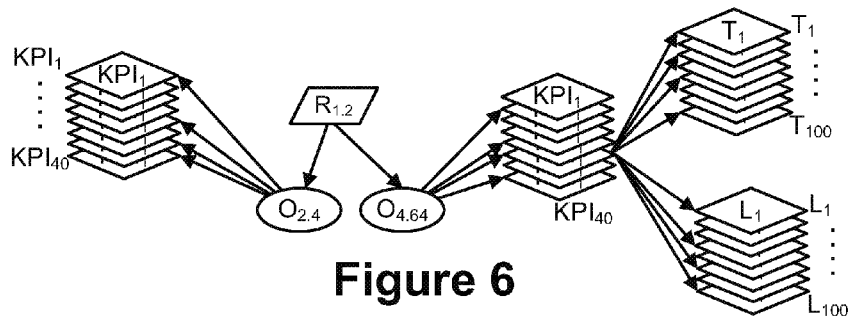

FIGS. 4-6 are illustrations of an entity-relationship model of organization nodes, region nodes, KPIs and T-/L-ranks. A 'T-rank' is the rank of an aggregated KPI value within an ordered list of the k highest aggregated KPI values calculated for the child nodes of a particular organization node. A 'L-rank' is the rank of an aggregated KPI value within an ordered list of the k lowest aggregated KPI values calculated for the child nodes of a particular organization node. The logical connections between the region nodes, organization nodes, KPIs and the T-/L ranks may be implemented e.g. by means of an association table and/or primary and secondary keys.

According to FIG. 4a, the organization node $O_{2.4}$ is stored in association with all defined KPIs $KPI_1, \ldots, KPI_{40}$. Other organization nodes (not depicted), may be stored in association with only a sub-set of all KPIs defined. For example, an organization graph may comprise organization nodes representing human beings or machines. Some KPIs may be definable only for human beings while others may be defined only for machines. Said property of the organization nodes can be modeled by assigning only a first subset of the defined KPIs to organization nodes representing human beings and assigning a second subset of KPIs to organization nodes representing machines. FIG. 4b depicts the entity relationship model describing organization node $O_{2.4}$ in greater detail. Each of the KPIs stored in association with said organization node is stored in association with k different top ranks $T_1, \ldots, T_{100}$ and k different low ranks $L_1, \ldots, L_{100}$. FIG. 5 depicts a region graph 500 comprising a plurality of region nodes. Each region may be stored in association with one or more organization nodes as described in the entity relationship model depicted in FIG. 6. FIG. 6 gives an impression of the dimensions of the data aggregation problem which has to be solved for calculating an O-aggregated KPI value, and even more so for calculating an R-aggregated KPI value or even a T- or L-aggregated KPI value. Leaving said task completely at the server side guarantees that also clients with limited hardware resources can use the aggregated KPI values quickly.

Figure 7:
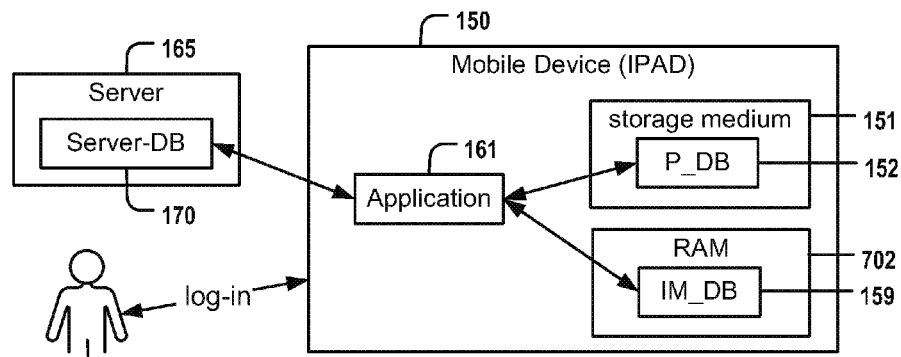
FIG. 7 is a block diagram of a client computer system accessing the second database on a server.

FIG. 7 is a block diagram of a client computer system 150 accessing the second database 170 being operatively coupled to a server processing device 165. The client computer system, in this case an iPad, comprises an application program 161 which is operable to access an in-memory database 159 stored to the volatile memory 702 of the client device. The application program is also operable to access a persistent database 152 stored in a non-volatile storage medium 151. The application program is operable to access the server database 170 via a network. The mobile device 150 provides a user 701 with graphical interface means for logging into the application program and for accessing and viewing aggregated KPI values stored in the first database 159 or any of the other databases.

Figure 8:
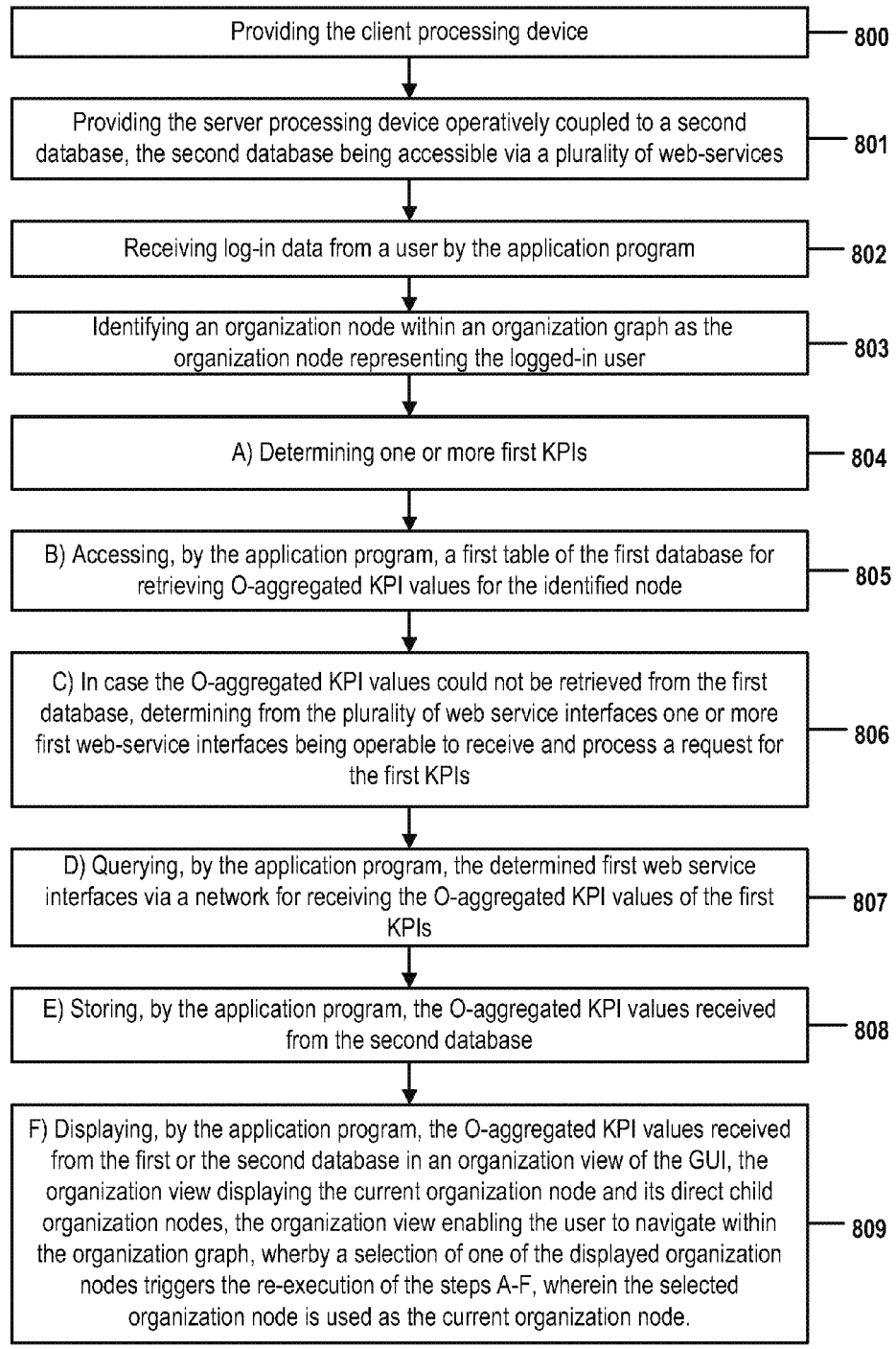
FIG. 8 is a flowchart of a method according to an embodiment of the invention.

FIG. 8 is a flowchart of a method according to an embodiment of the invention. A client processing device 150 is provided in step 800, the client processing device comprising a first database 159 and an application program 161. In step 801, a server processing device 165 being operatively coupled to a second database 170 is provided, the second database being accessible by the client via a plurality of web service interfaces 166-169. Upon having received log-in data from a user 701 in step 802, the application program in step 804 identifies an organization node within an organization graph 174 as the organization node representing the logged-in user. In step 803, one or more first KPIs are identified for the current organization node. In step 805, the application program accesses a first table 164 of the first database in order to retrieve O-aggregated KPI values for one or more first KPIs stored in association with the current organization node representing the logged-in user. In case the requested oh-aggregated KPI values could not be retrieved from the first database, the application program determines in step 806 from the plurality of web service interfaces 166-169 one or more first web service interfaces which are operable to receive and process a web service request for the determined first KPIs. In step 807, the application program queries the determined first web service interfaces via a network for receiving the O-aggregated KPI values of the first KPIs. In step 808, the application program stores the O-aggregated KPI values received from the second database into the first database. Finally, in step 809, the application program displays the O-aggregated KPI values retrieved from the first database or received from the second database in an organization view of the graphical user interface of the client device. The organization view displays the current organization nodes and its direct child organization nodes, thereby enabling the user to navigate within the organization graph. A selection of any of the displayed organization nodes by the user triggers the re-execution of the steps 803-809, whereby the selected organization node is used as the current organization node.

Figure 9:
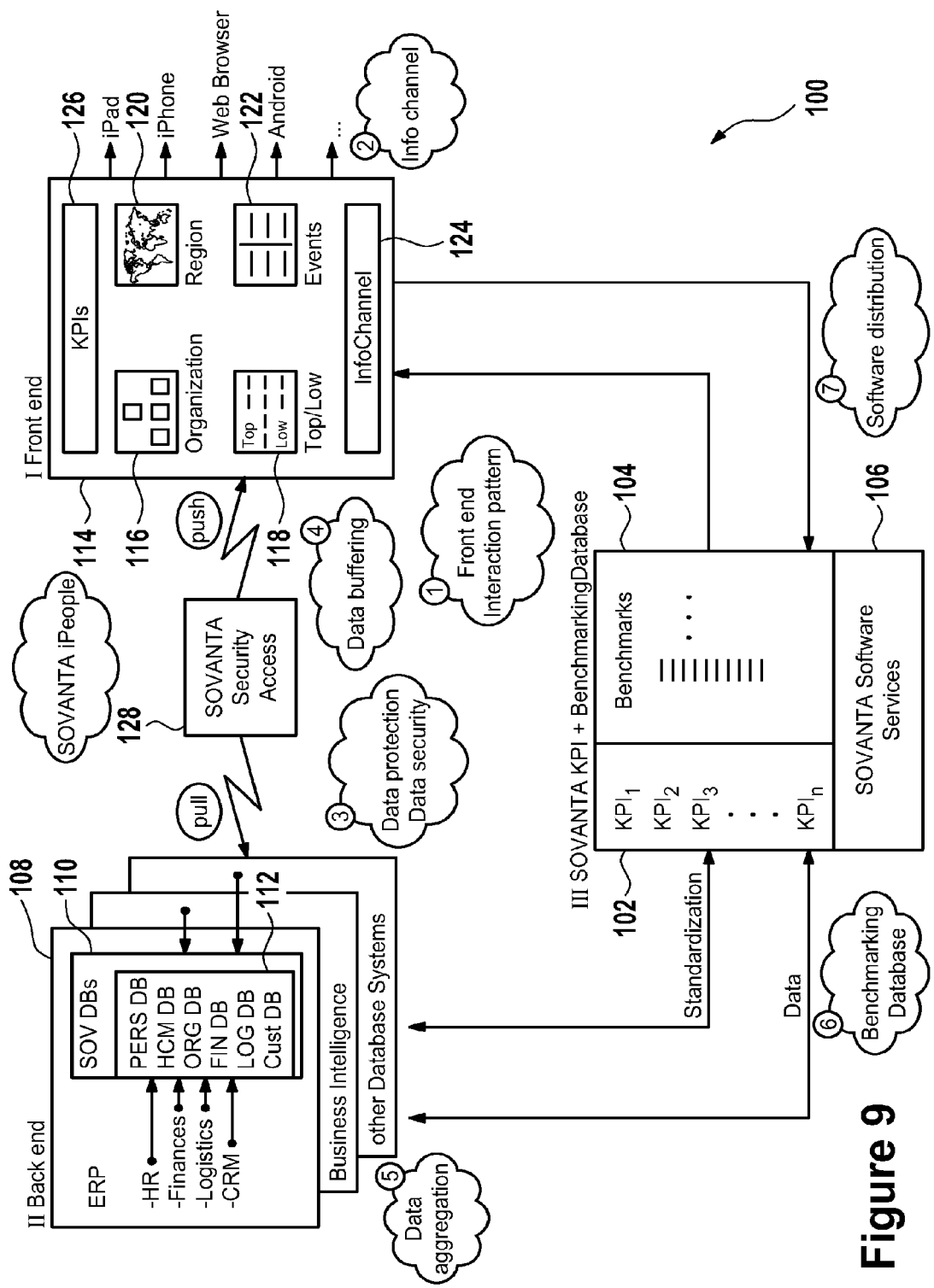
FIG. 9 is a block diagram of an embodiment of the computer system of the invention.

FIG. 9 shows a computer system 100 that comprises a key performance indicator database 102, a benchmarking database 104 and a set of software tools 106, such as for performing a benchmark analysis using the benchmarking database 104.

A number n of key performance indicator (KPI) definitions, i.e. $KPI_1$, $KPI_2$, $KPI_3$, . . . $KPI_n$ are stored in the key performance indicator database 102 whereas data on the basis of which a benchmark analysis can be performed using software tools 106 is stored in the benchmarking database 104.

The computer system 100 further comprises backend data processing means 108 that may comprise one or more server computers. The backend data processing means 108 comprises or is coupled to data sources, such as an enterprise resource planning system including data sources for human resources data, finance data, logistics data and customer relationship management (CRM) data. The backend data processing means further comprises an extractor component 110 for extracting data from the various data sources. The extractor component 110 is configured such that the extracted data comprises structural data being descriptive of a structure and data values specifying values for elements of the structure. The extracted data is stored in a separate database 112 of the extractor component 110.

In addition the extractor component 110 can be configured to extract data from additional data sources, such as business intelligence data and data from other database systems. Preferably the structural data and the data values are stored separately or in one or more OLTP cubes.

The backend data processing means 108 further comprises means for aggregating the extracted data using the key performance indicator definitions stored in the KPI database 102. The aggregated data can be stored locally such as in the database 112 or in an external system, such as in the cloud when cloud computing is utilized.

The means for aggregating the extracted data can access the KPI database 102 for reading the KPI definitions that are used for calculating the aggregations of the extracted data. The resultant aggregated data can be exported from the backend data processing means 108 for storage in the benchmarking database 104.

As an alternative or in addition the aggregated data can also be stored in an external system, such as a storage system located in the cloud.

The computer system further comprises frontend data processing means 114, which can be implemented by a battery powered portable electronic appliance, such as a smartphone or a mobile computer. The frontend data processing means 114 has a display for displaying a chart 116, a list 118, a digital map 120, events 122, an information channel 124 and key performance indicators 126. The information channel is also referred herein as 'information source'.

For example, the chart illustrates an organization of a company or another real world structure or a portion thereof. For example, two or more levels of hierarchy of an organization are illustrated in the chart 116. The user interface provided by the frontend data processing means 114 may enable a user's navigation within the chart 116 such as by drag and relate operations.

The list 118 may serve for displaying elements of the organization that have low or high key performance indicators values, such as high performing and low performing employees or managers.

The digital map 120 may comprise marks that indicate relevant locations, such as company or warehouse locations. The digital map 120 is part of a region view 157 and is interactive such that a user can select specific locations. In order to facilitate the selection of locations on the digital map 120 the user interface may have zoom-in and zoom-out functionalities and/or a navigation or route planning function.

Events 122 can also be displayed on the user interface as well as an information channel 124 for posting information, such as employee or management information. The information posted on the information channel 124 can be targeted towards individual employees or managers or groups of employees or managers depending on their specific roles. The user interface further comprises a display box 126 for displaying user selected key performance indicators.

The frontend data processing means 114 and the backend data processing means 108 can communicate such as via a network, for example a private or public network, such as the Internet. The structural and the aggregated data is pulled by the frontend data processing means 114 from the backend data processing means 108 whereby a security access module 128 is utilized for protection of the data transmission. For example, the security access module 128 provides for encryption. The security access module 128 may transform the structural data and the aggregated data into unstructured and/or encrypted bit sequences, such as bit streams, for transmission from the backend data processing means 108 to the frontend data processing means 114.

A message that is generated by the backend data processing means 108, such as when a pre-defined threshold is surpassed, can also be sent using the security access module 128. Preferably the message is sent by a push operation for immediate notification of the user.

The frontend data processing means 114 can also be coupled to the KPI database 102 and/or the benchmarking database 104, such as via a private or public network, such as the Internet. For example, the frontend data processing means 114 can access the KPI database 102 for reading key performance indicators definitions for calculating key performance indicators using the aggregated data received from the backend data processing means 108. The frontend data processing means 114 can also return data, such as for initiating or executing a workflow, such as for processing a request.

Figure 10:
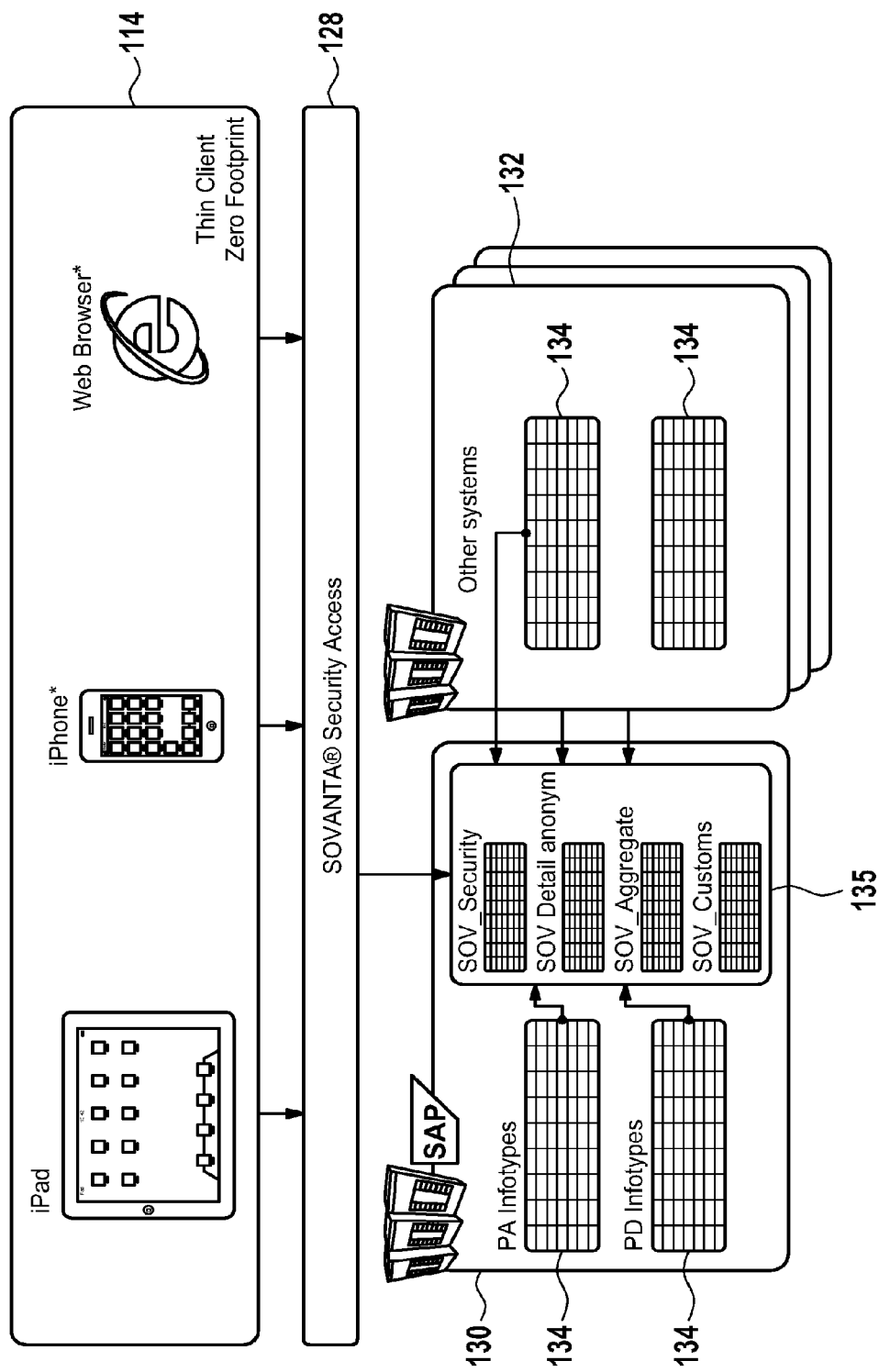
FIG. 10 is a block diagram of a further embodiment of a computer system of the invention.

FIG. 10 shows a block diagram of a further embodiment of the invention. In the embodiment considered here the frontend data processing means 114 may be implemented as an iPad, iPhone or by another electronic appliance or personal computer that runs a web browser. The security access module 128 is coupled to an enterprise resource planning system 130, such as an SAP system that may be coupled to other computer systems 132.

The ERP system 130 and the other computer systems 132 comprise various database tables 134 from which the structural data and the data values are extracted. Aggregated and anonymized data is stored in the tables 135 as well as customizing data and security data, such as settings for encryption or other data protection operations. For example, the extracted data is anonymized and stored in the table SOV_Detail_anonym as shown in FIG. 10. The table SOV_Detail_anonym can be implemented as an OLAP cube. The data is then aggregated in accordance with the KPI definitions and the resultant aggregated data is stored in the table SOV_Aggregate outside that OLAP cube.

Figure 11:
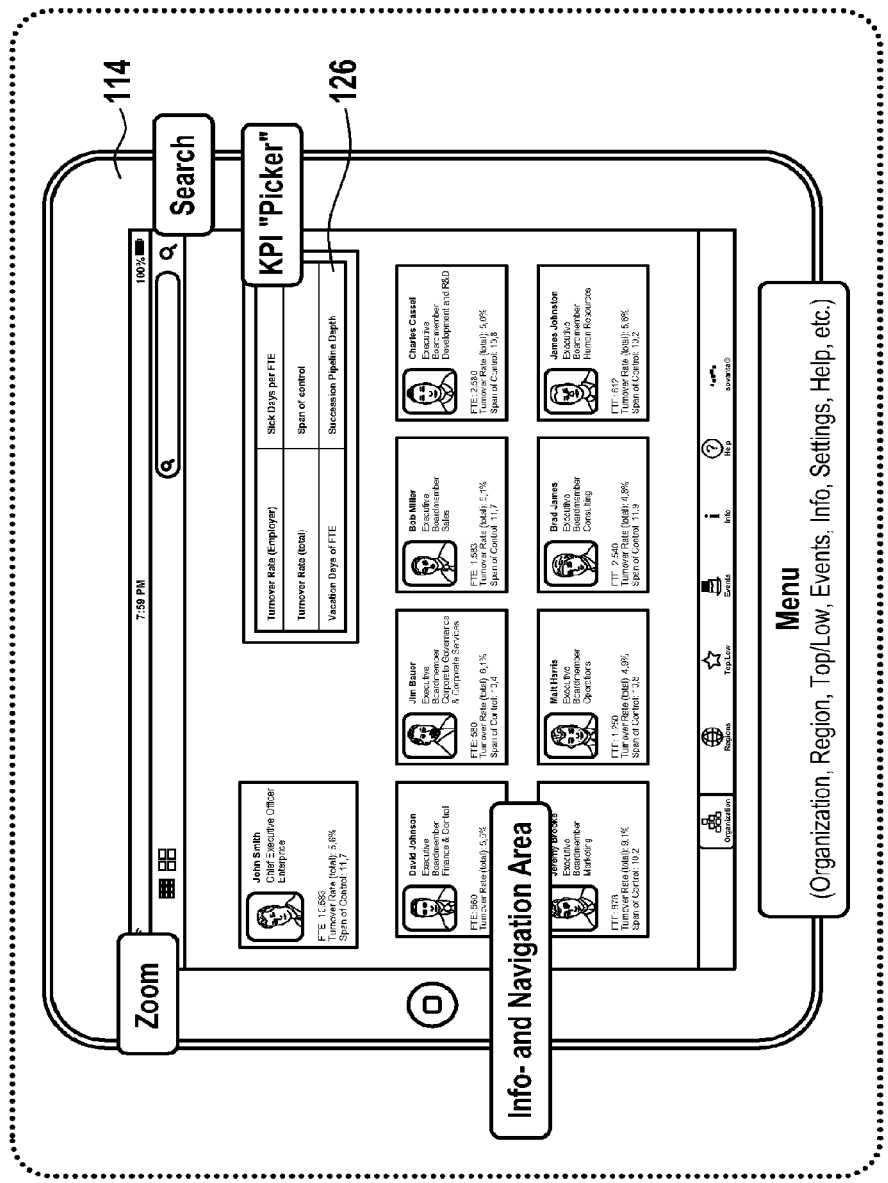
FIG. 11 is illustrative of a user interface of an electronic appliance in accordance with an embodiment of the invention.

FIG. 11 shows an embodiment of the frontend data processing means 114 based on an iPad. An organizational chart 116 is displayed encompassing multiple levels of management. Each manager is shown in a box which includes the manager's function and key performance indicator values of that manager. The key performance indicators are selected from the box 126 that shows two lists of key performance indicators. The user may select one key performance indicator from each one of the lists. The respective values of the selected two key performance indicators are calculated for each manager contained in the chart 116 and are displayed in the chart 116.

Figure 12:
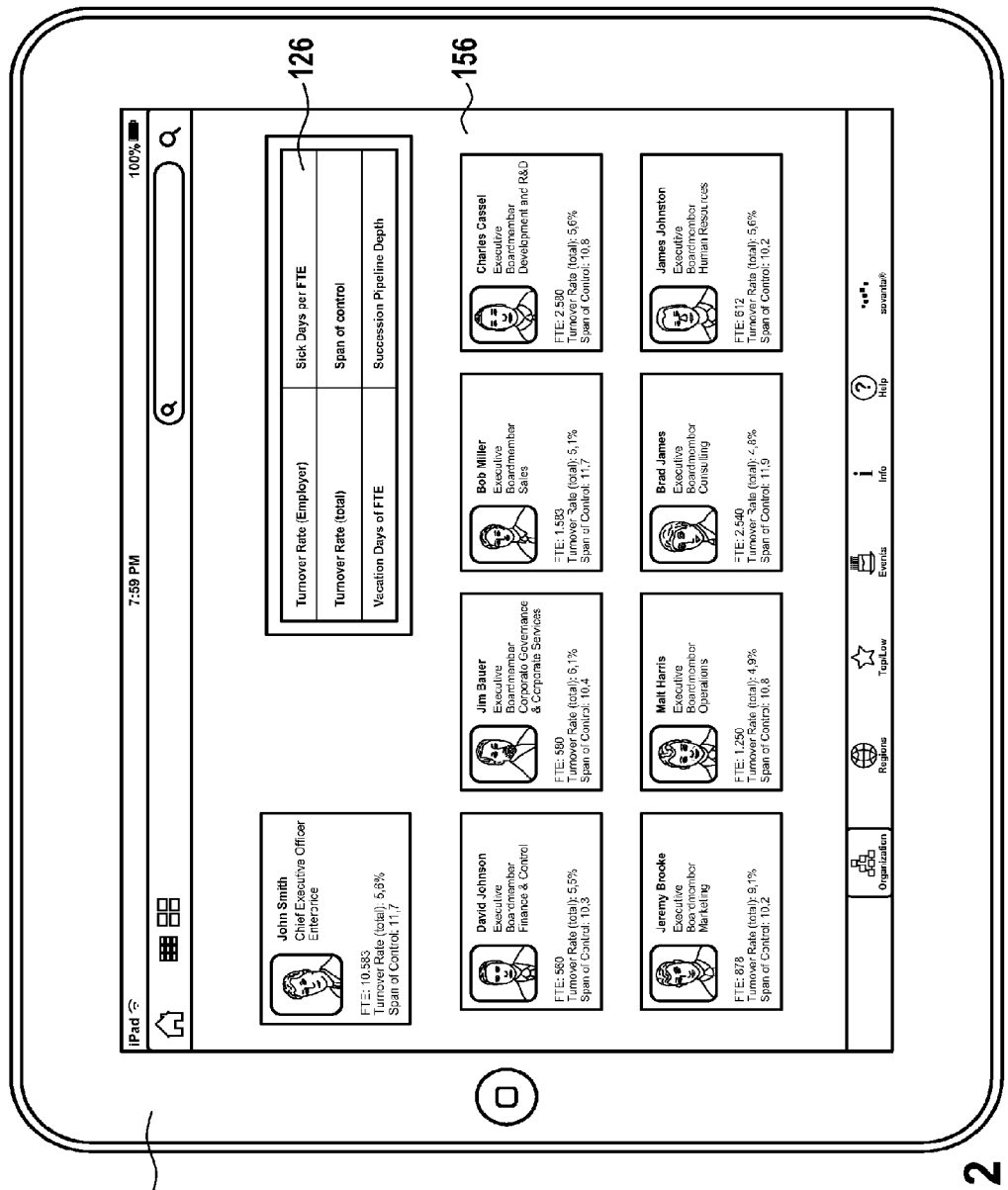
FIG. 12 is an enlarged view of the display of the embodiment of FIG. 11.

FIG. 12 shows an enlarged view of FIG. 11. As illustrated in FIG. 12 the key performance indicators "turnover rate (total)" and "span of control" have been selected. In accordance with an embodiment of the invention the user initially selects only one key performance indicator, such as from the left list of key performance indicators shown in the box 126. In response the right list of key performance indicators shown in the box 126 is reduced to a sub-set of the available key performance indicators from which the user may then perform his or her selection. This facilitates the user's selection of two key performance indicators for performing a meaningful analysis.

Figure 13:
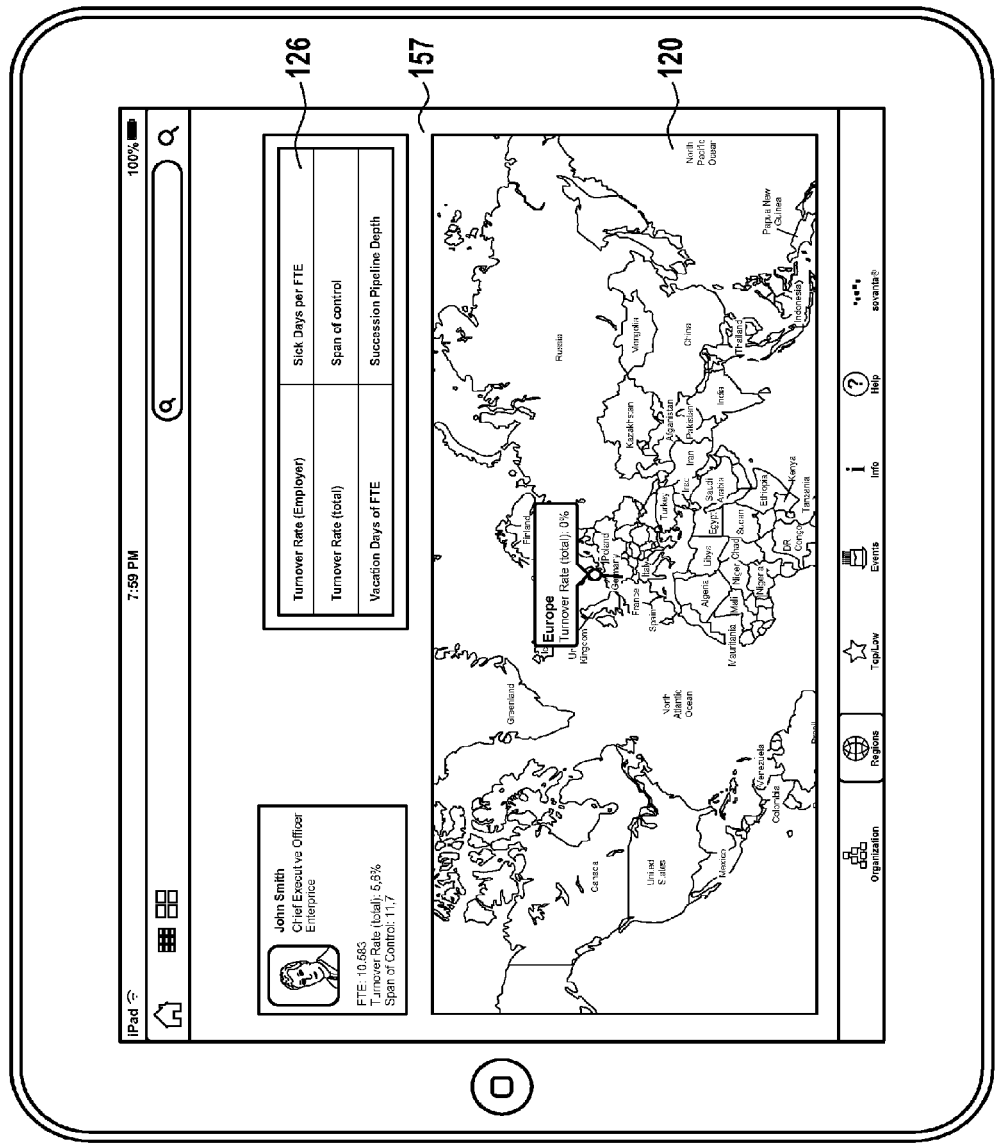
FIG. 13 is illustrative of the user interface of FIGS. 11 and 12 after user selection has been entered.

FIG. 13 shows a digital map 120 that shows the region for which the manager selected within chart 116 is responsible. In the example considered here the chief executive officer has been selected whose regional responsibility is the entire world.

Figure 14:
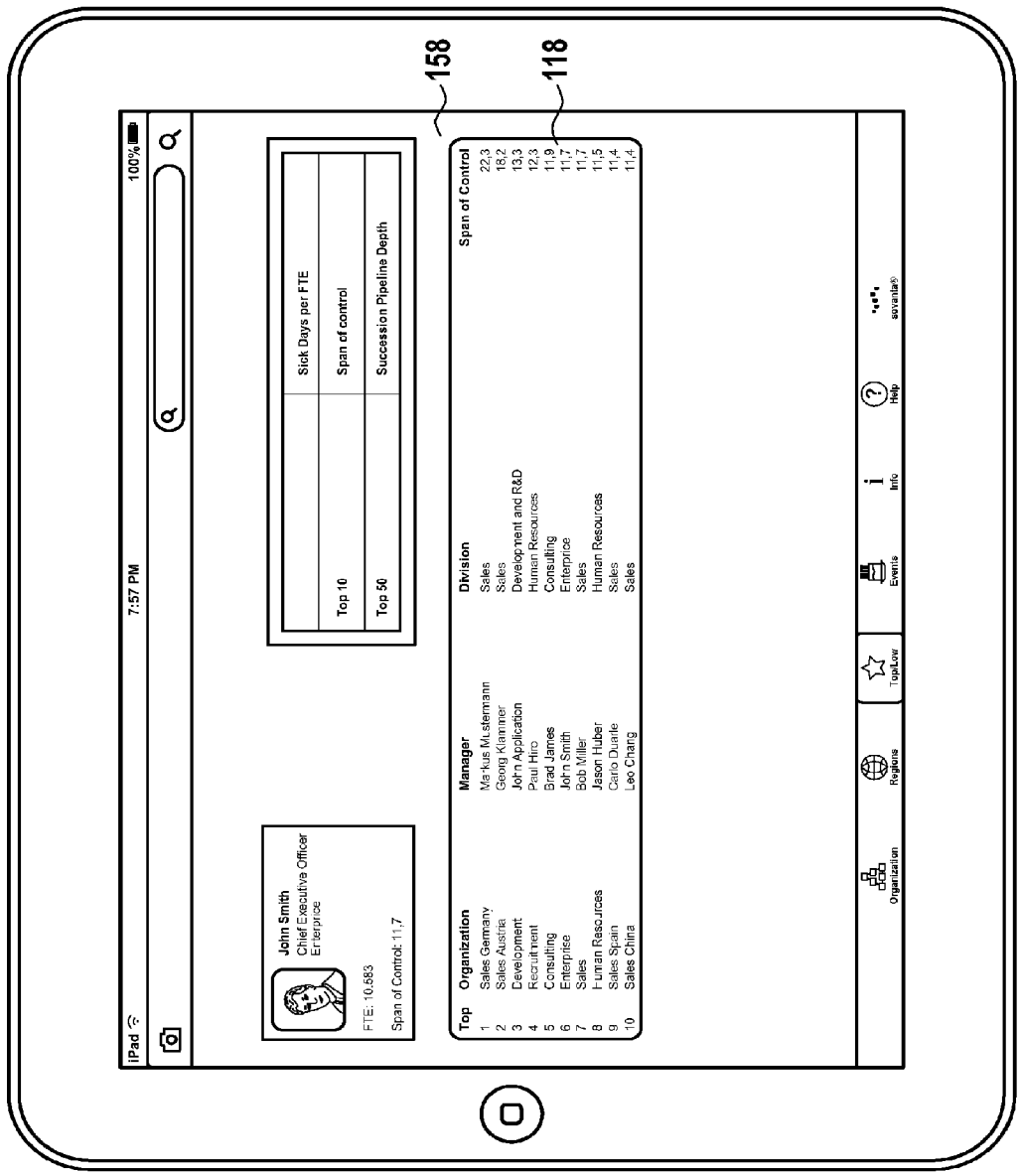
FIG. 14 is illustrative of the user interface of FIGS. 11 to 13 after another user selection has been entered.

In the embodiment of FIG. 14 the 'top ten' of managers is selected in the box 126. Regarding the key performance indicator 'span of control' of those managers that report to the selected manager, i.e. the chief executive officer, the respective list 118 is displayed. List 118 is a top/low list of selected KPIs. The list 118 is part of a top/low view 158.

Figure 15:
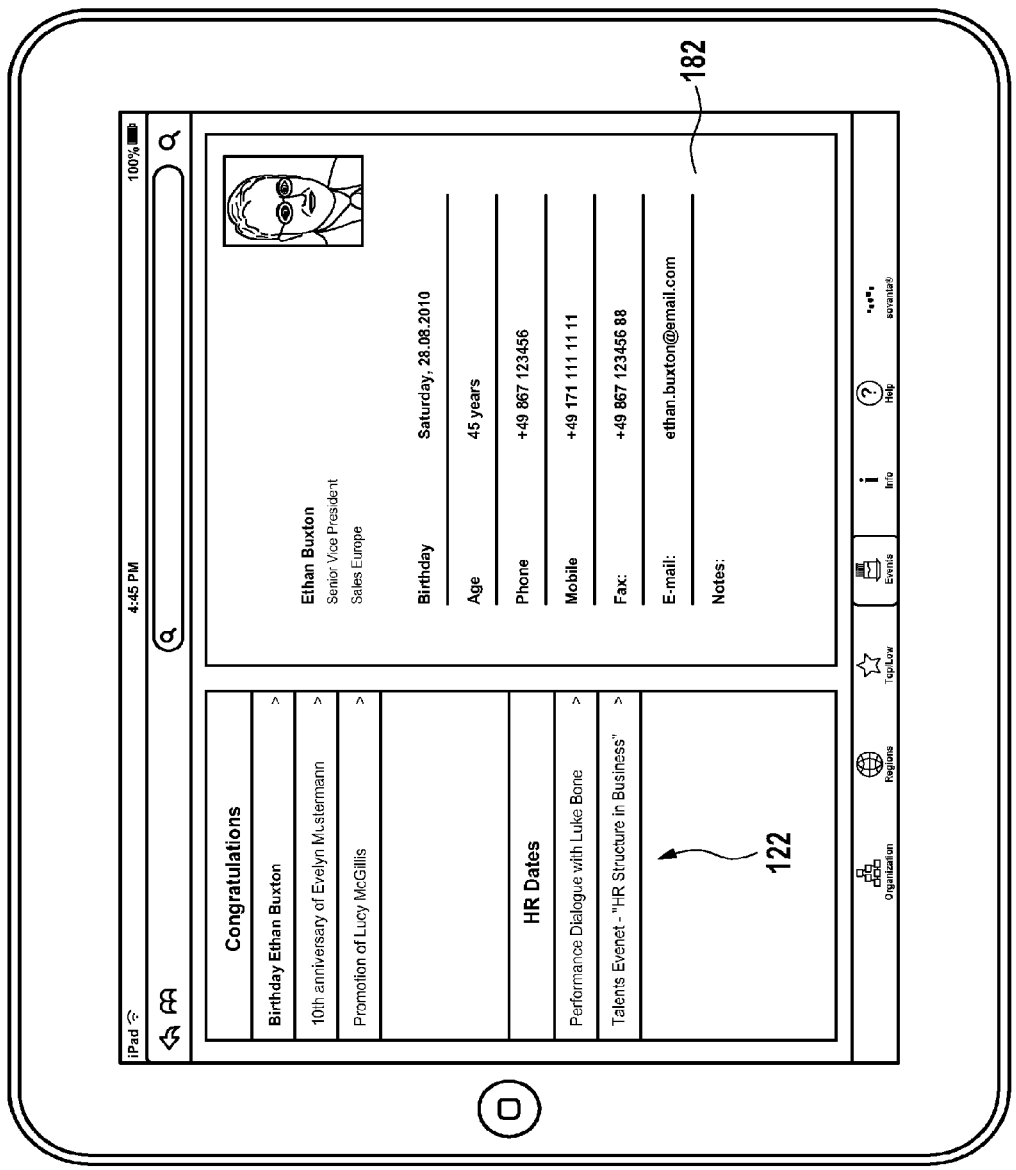
FIG. 15 is illustrative of the user interface of FIGS. 11 to 14 after another user selection has been entered.

In the embodiment of FIG. 15 events 122 are displayed with respect to a given manager, here the senior vice president corporate governance, compliance and corporate services.

Figure 16:
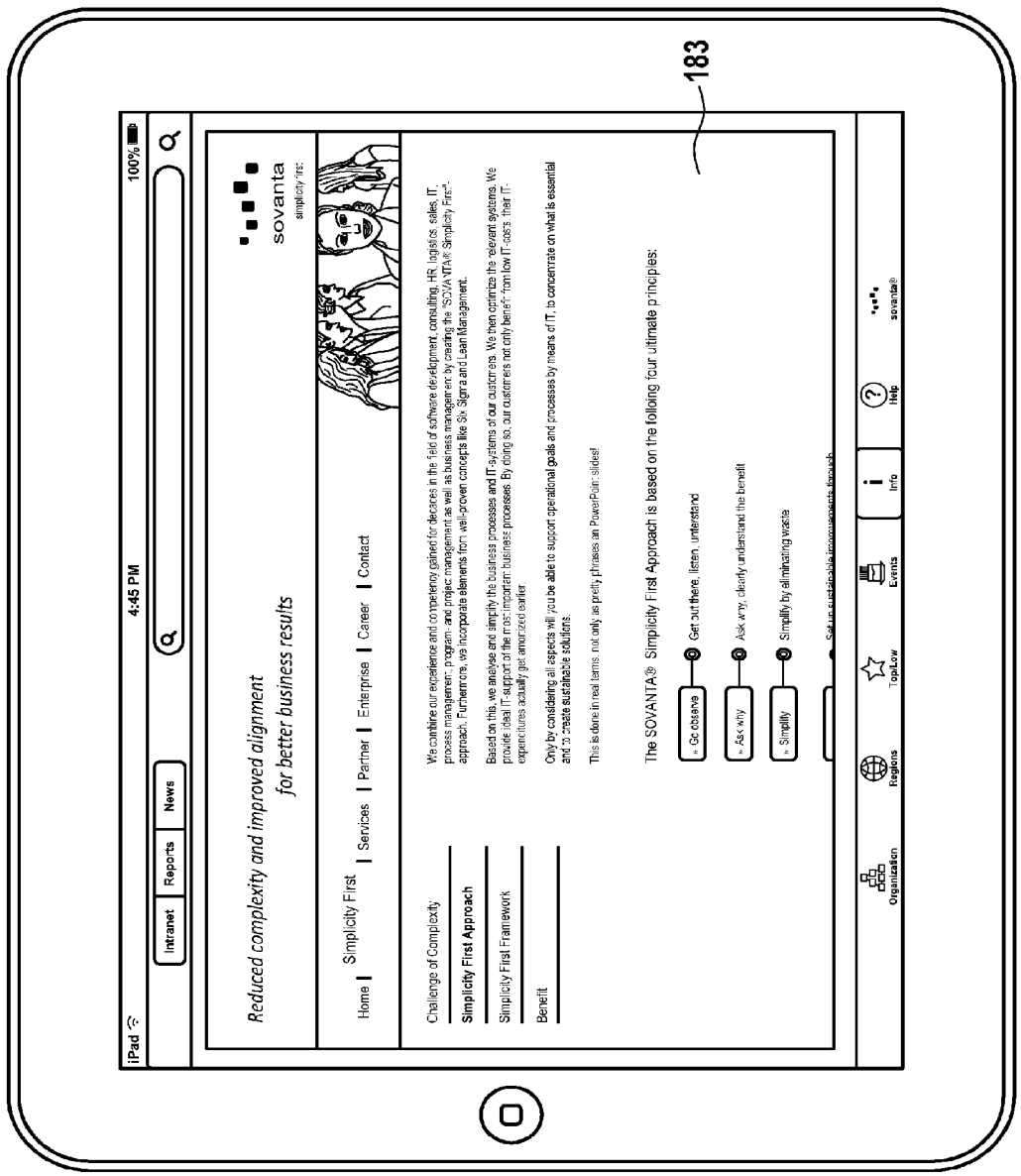
FIG. 16 is illustrative of the user interface of FIGS. 11 to 15 after another user selection has been entered.

FIG. 16 shows an embodiment where the info channel 124 has been selected by the user for display in an 'info channel view' 183. The user can select the buttons 'intranet', 'reports' and 'news' in the information channel 124. In response to a user's selection of the button 'Intranet' an intranet web page is loaded and displayed. In response to a user's selection of the button 'reports' a detailed data analysis can be performed. In response to selecting the button 'news' company news are displayed.

Figure 17:
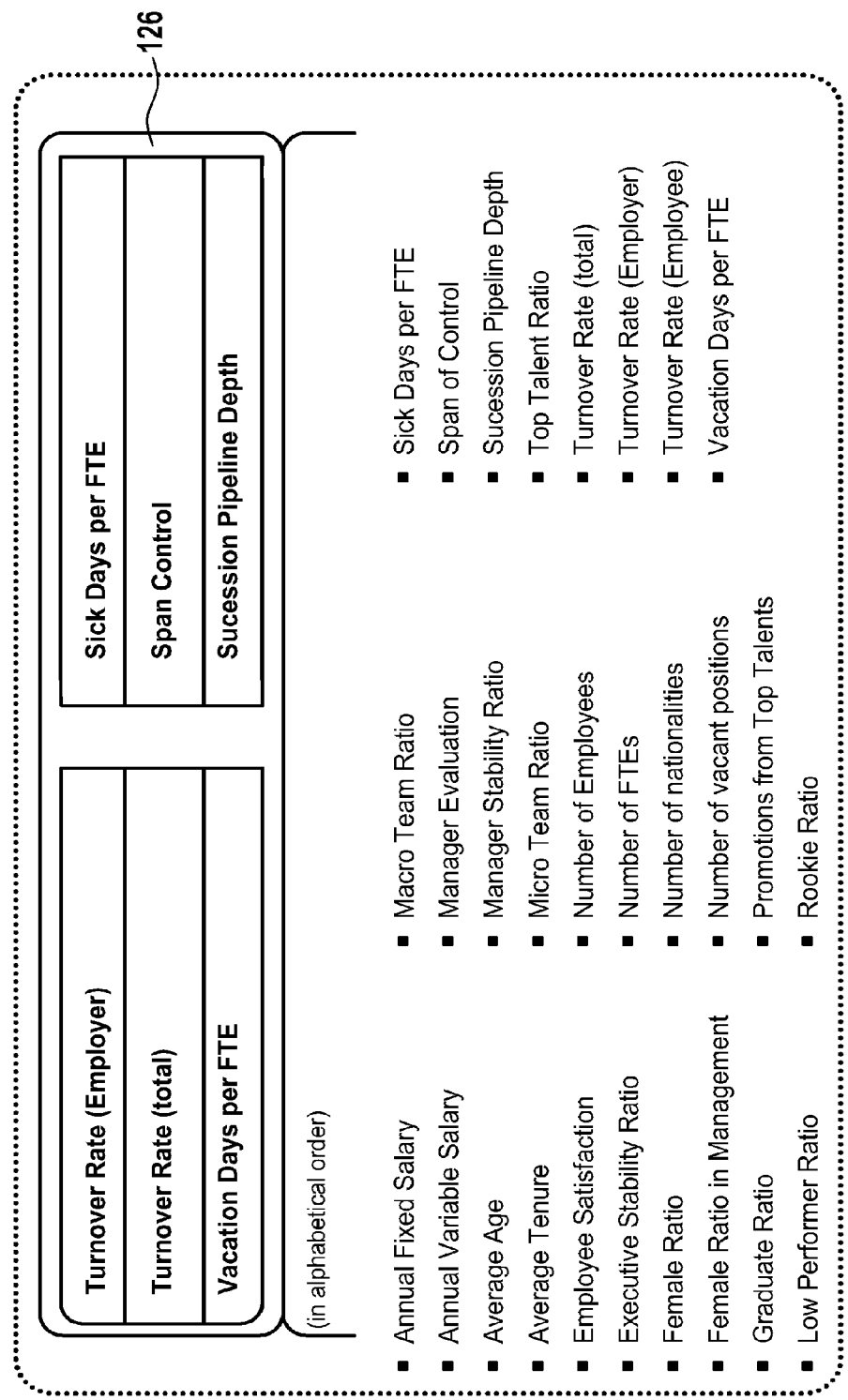
FIG. 17 is illustrative of various key performance indicators that can be selected via the user interface of the embodiments of FIGS. 11 to 16.

FIG. 17 shows box 126 and a list of human resources key performance indicators that can be selected from the box 126.

Figure 29:
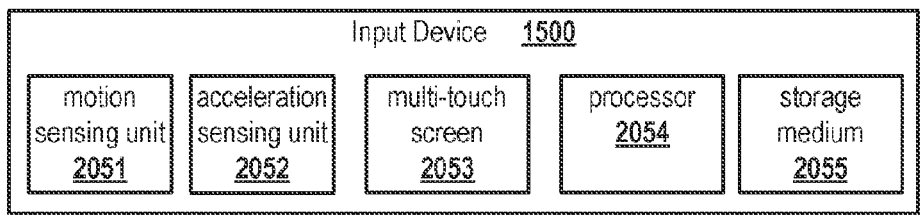

FIG. 29 illustrates a block diagram of a multi-touch input device 1500 comprising a processor 2054, a computer readable, non-transitory storage medium 2055, a multi-touch screen 2053, a motion sensing unit 2051 and an acceleration sensing unit 2052. According to embodiments, the input device 1500 corresponds to the mobile client device 150 depicted in FIG. 1. According to embodiments, the mobile device 150 can be a multi-touch input device, for example, an iPhone or iPad.

Figure 18A:
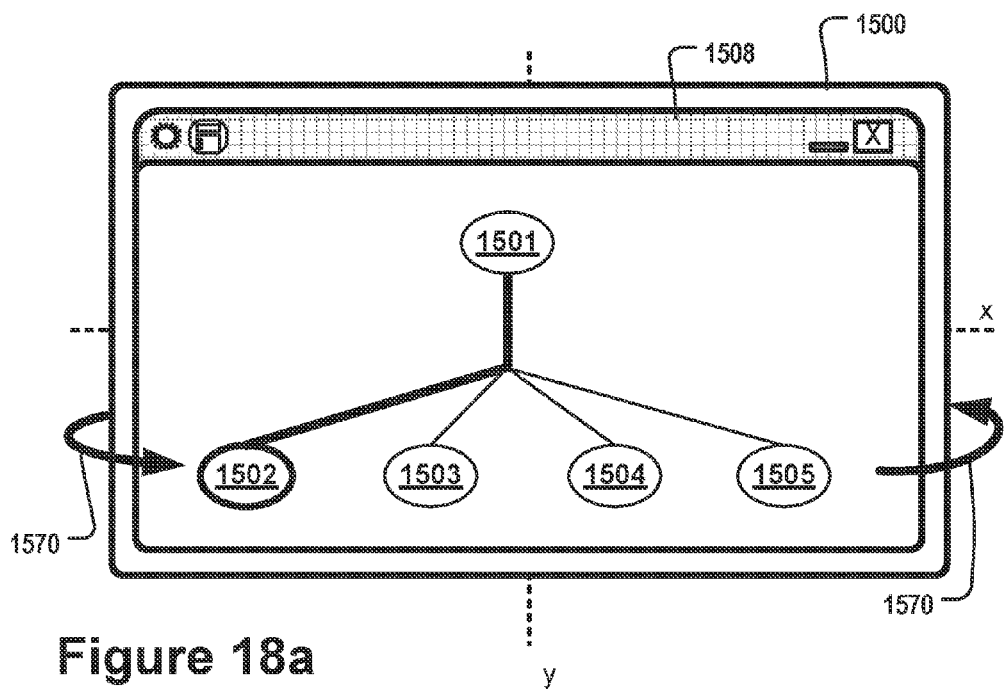
FIG. 18 illustrates the navigation within an organization graph by means of one or more tilting motions.

FIG. 18 illustrates the navigation within an organization graph 174 by means of one or more tilting motions. FIG. 18*a* depicts a multi-touch input device 1500 from a bird's eye perspective as well as the x- and the y-axis of the input device. The multi-touch input device displays in step 1902 via its graphic user interface a view 1508 which displays to the user a graph having multiple nodes 1501-1505. The graph may comprise more nodes than actually displayed in the view. For example, the depicted graph can be an organization graph 174 and the nodes can be organizational nodes representing departments or employees of a company. Node 1501 is the current node and the left most node 1502 is highlighted as the candidate node. The highlighting is indicated in FIG. 18 by means of a particularly thick border line. In addition, the edge connecting the current node 1501 with the candidate node 1502 is highlighted (shown herein also as a particularly thick line). The user may then apply a first tilting motion by lowering the right side of the device and rising the left side of the device as indicated by the arrows 1570, thereby tilting the device around its y-axis in a clockwise manner from the users perspective.

Figure 18B:
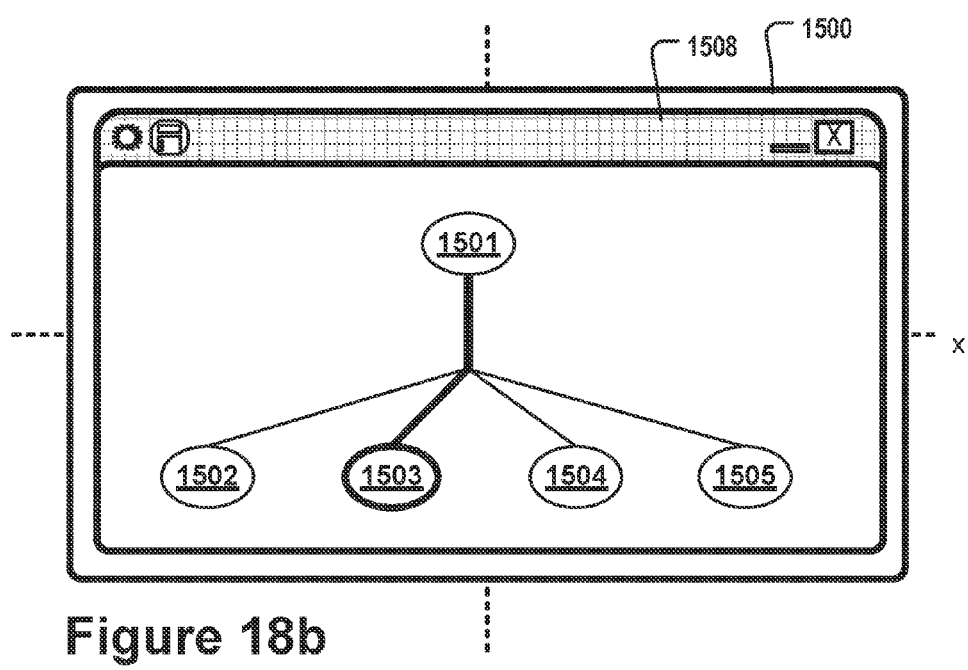

The motion sensing unit 2051 automatically detects in step 1904 the first motion and determines, in dependence on said first tilting motion and in dependence on the current GUI element 1501 a new candidate GUI element 1503. The determined new candidate GUI element is highlighted as depicted in FIG. 18b. In addition, when updating the view 1508, the edge connecting the current node 1501 with the new candidate node 1503 is highlighted. The candidate GUI element determined in step 1906 depends on the current node and on the topology of the graph, because the current node acts as a kind of starting point from which the candidate GUI element is automatically determined in dependence on the one or more tilting motions and in dependence on the pathways available within a particular graph. The user may repeat the step of applying a first tilting movement around the y-axis, thereby navigating between a plurality of nodes 1502-1505 being at the same hierarchical level within the graph. In addition, the user may apply a tilting movement around the x-axis, thereby navigating the hierarchy of the graph upwards or downwards. According to embodiments, only a limited number of hierarchical levels and nodes contained therein are depicted in the view 1508. When selecting a node of a different hierarchical level by means of a tilting movement around the X-axis, a different set of nodes and hierarchical level surrounding the selected node may be displayed when updating the view. This feature may be advantageous as it guarantees that a user is not overloaded with too much visual noise which can be a problem in particular for mobile devices having smaller sized screens.

Figure 18C:
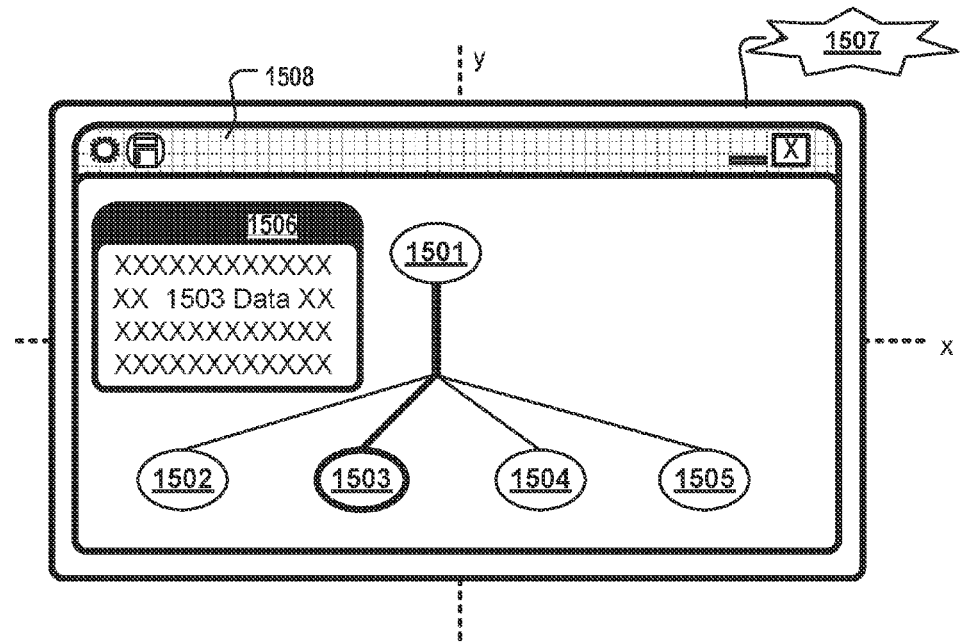

The acceleration sensing unit 2052 may then determine a first acceleration motion having been applied on the device while having highlighted the candidate GUI element 1503. As a consequence, upon having detected the first acceleration motion 1507, a data set being represented by the highlighted candidate GUI element 1503 is automatically selected in step 1911. FIG. 18c depicts a first GUI element 1506, e.g. a dialog box, a pop-up window, or the like which shows the data set being represented by the selected highlighted GUI element 1503 in greater detail. For example, said data set may comprise name and address of an employee, a picture of the employee, and one or more aggregated or non-aggregated KPI values.

According to embodiments, selecting one of the nodes of the organization graph by means of an acceleration event 1507, one or more O- or R-, L-aggregated KPI values are requested from the first database 159 of the mobile device 1500 or from a second database 170 of a server computer system 165.

FIG. 19 illustrates the navigation within one or more elements of the same hierarchical level of a graph by means of one or more tilting motions 1571. The input device 1500 comprises a multi-touch screen displaying in step 1902 a view 1550 which comprises a plurality of GUI elements 1551-1556. Said GUI elements are connected to each other via a circular path. The circular path is displayed by a perspectively distorted circle 1558 which is operable to rotate around a center 1557. Upon rotation of the circle, the size of the GUI elements change perspectively. The rotation options are indicated in FIG. 1980 by means of a dotted double-sided arrow 1560. The current node 1555 is highlighted (by means of a particularly thick border line).

Figure 19A:
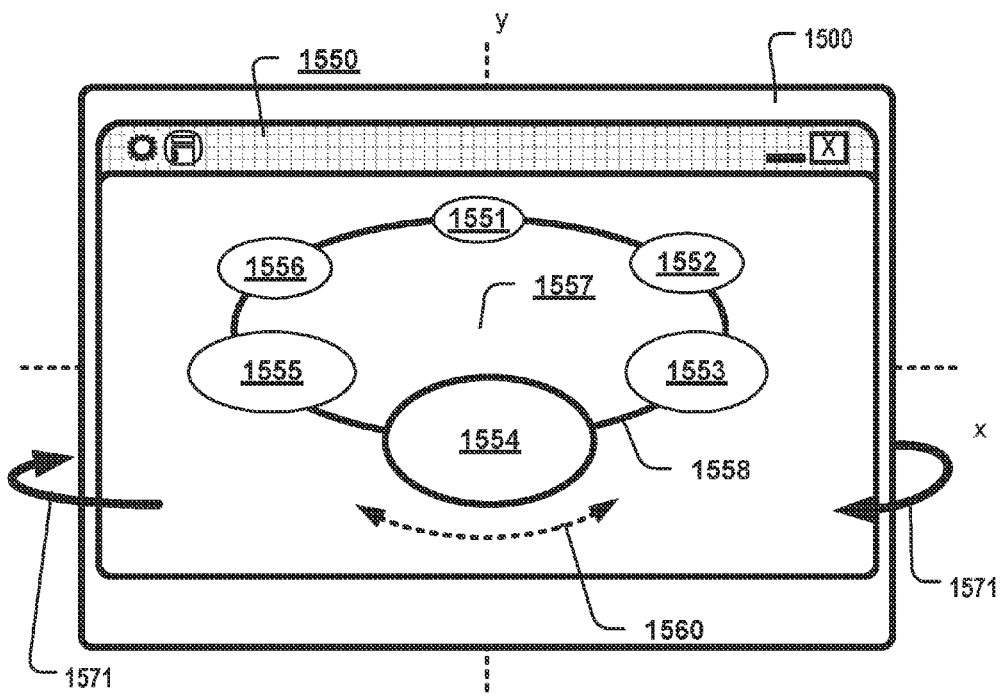
FIG. 19 illustrates the navigation within one or more elements of the same hierarchical level by means of one or more tilting motions.
Figure 19B:
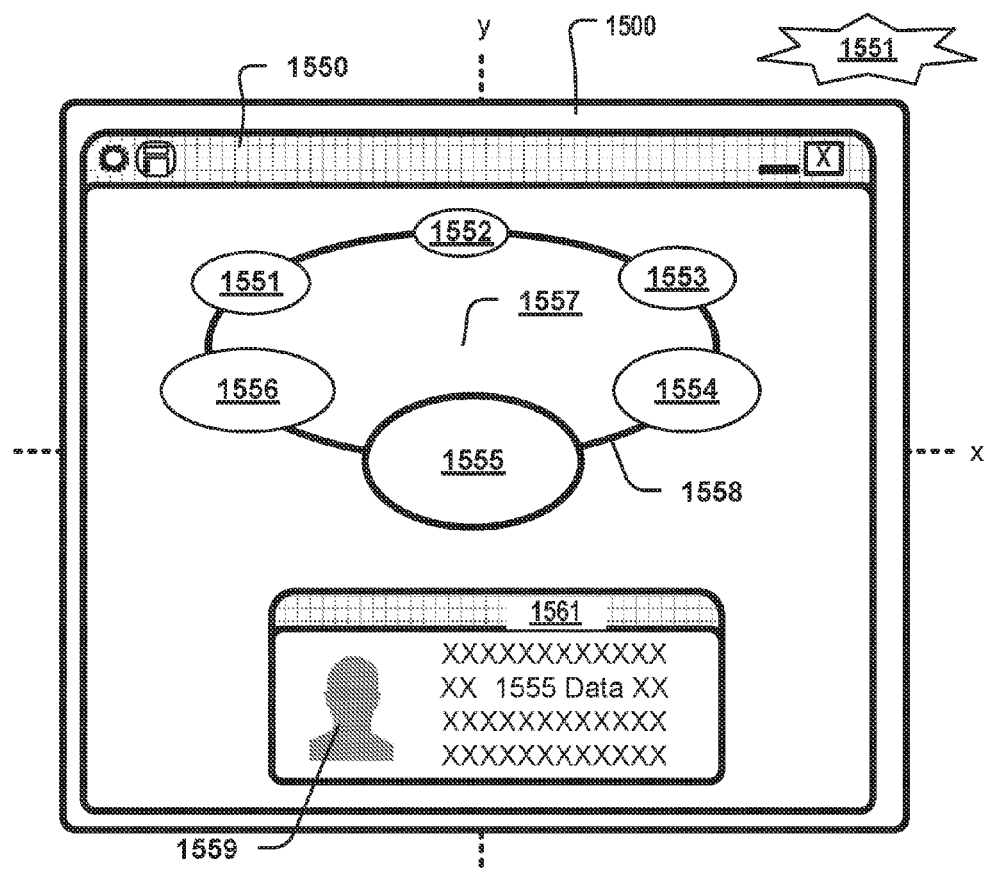

In step 1904 of figure is 27, the motion sensing unit 2051 detects that a tilting movement-indicated by the arrows 1571- is applied on the input device around the y-axis, thereby raising the right side of the input device and lowering the left side of the input device. In other words, the input device is tilted around its y-axis in a counterclockwise manner from the user's perspective. As a result, the circle 1558 starts to rotate, preferentially in the same direction as the tilting movement. Thus, in case of a counterclockwise tilting movement of the device around its y-axis, the circle 1558 starts to rotate counterclockwise and the next GUI element 1555 moves to the front of the circle 1558 and is highlighted in step 1908 as the candidate GUI element. This is shown by means of a particularly thick border line of GUI element 1555 in FIG. 19b. According to the depicted embodiment, the current GUI element 1554 depicted in FIG. 19a is not highlighted anymore as soon as said node is not anymore at the front side of the circle. Depending on the embodiment, the circle 1558 may keep rotating in the initial direction as long as the user does not execute a first tilting movement around the same access in the opposite direction. During the rotation of the circle, the GUI element at the front side of the circle is dynamically highlighted as a new candidate GUI element. A user may stop the rotation of said circle by applying a tilting movement in the opposite direction. A further tilting movement in said opposite direction may cause the circle to start rotating in the opposite-in this case clockwise-direction.

Figure 27:
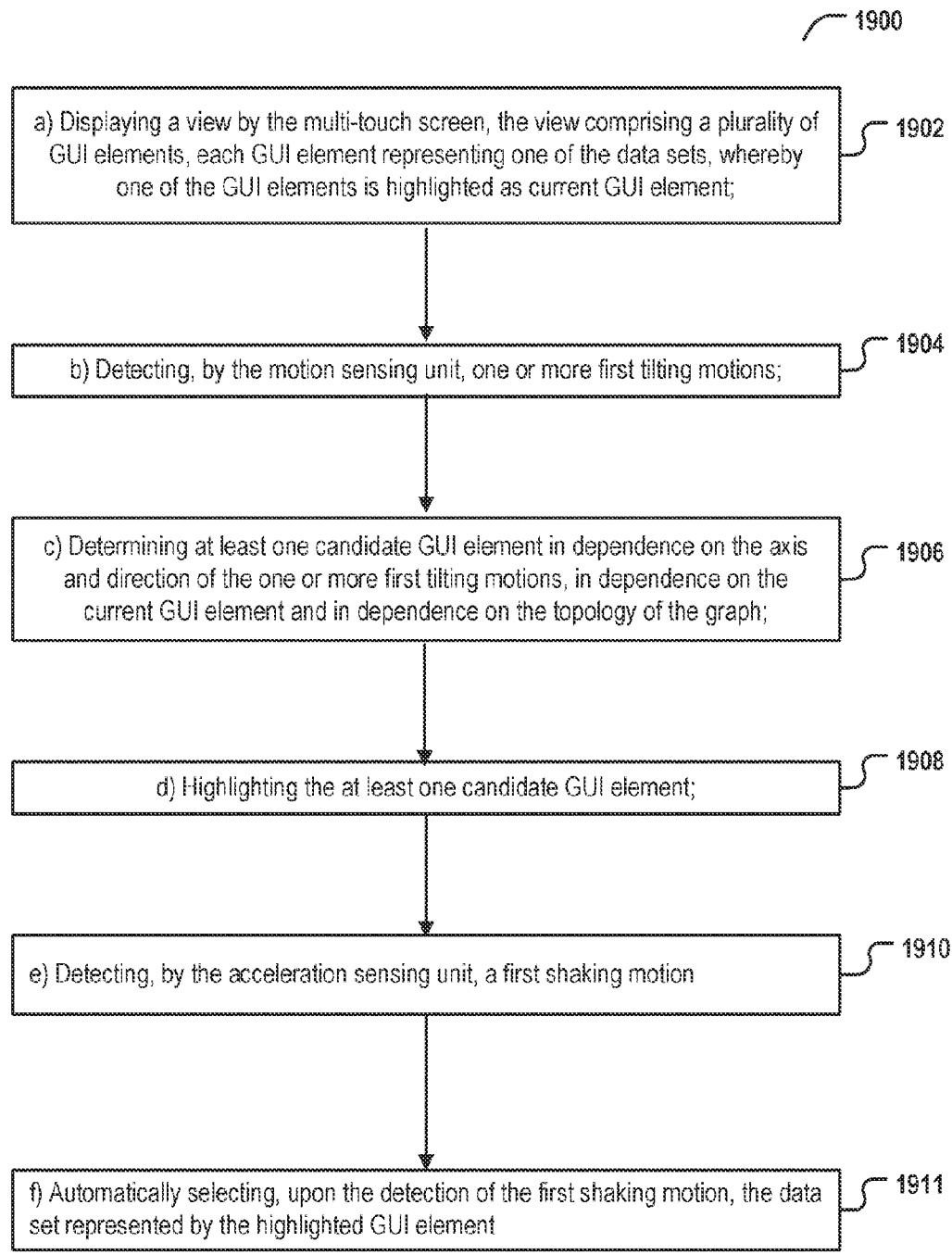
FIG. 27 is a flowchart of a method for selecting a data set from a plurality of data sets by means of a multi-touch input device.

In step 1910 of FIG. 27, the acceleration sensing unit 2052 determines that a first shaking motion 1551 was applied on the input device. Upon detection of the first shaking motion, a data set represented by the highlighted candidate GUI element 1555 is automatically selected and displayed, for example by means of a further GUI element 1561, to the user. Said data set may comprise, an image 1559 of an employee represented by an organization node being represented by the selected candidate GUI element.

Figure 20:
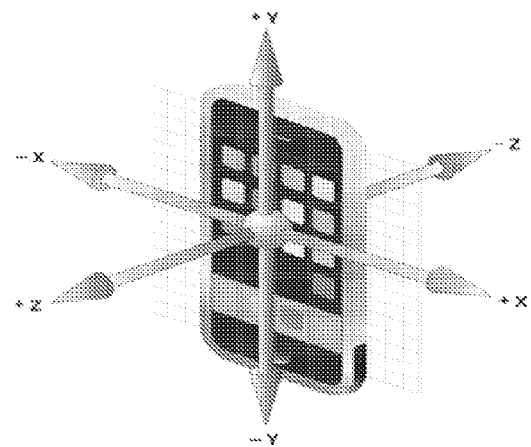
FIG. 20 depicts three device-centered axes x, y, z of a mobile device.

FIG. 20 depicts three device-centered axes x, y, z of a mobile device.

Figure 21:
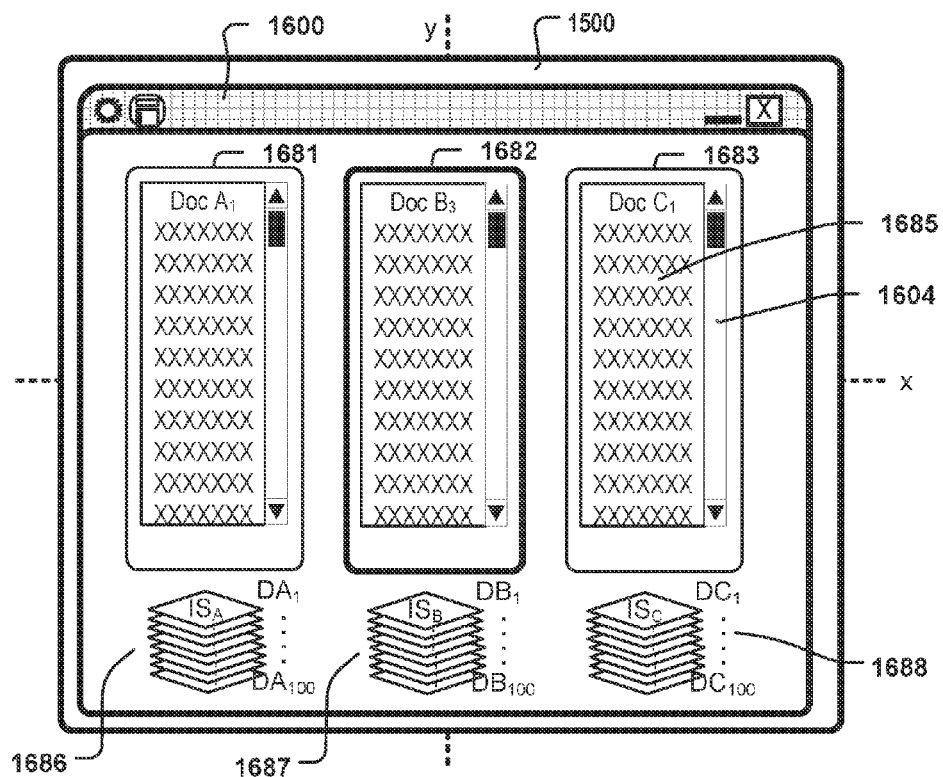
FIG. 21 illustrates a means of navigation within different information sources and data portions by means of one or more tilting motions.

FIG. 21 illustrates a means of navigation within different information sources and data portions by means of one or more tilting motions. Input device 1500 comprises a multi-touch view displaying in step 1902 a view 1600 comprising a plurality of GUI elements 1681-1683, each of said GUI elements representing an information source. The info-source pane 1681 corresponds to information source A, info-source pane 1682 corresponds to information source B and info-source pane 1683 corresponds to information source C. Each information source comprises a collection of data portions. Said collection is represented, for each of said information sources, by a further GUI element 1686-1688. Said further GUI elements can be, for example, an image of a document stack. According to embodiments, the picture of the document stack is not based on an image file but rather comprises a plurality of GUI elements respectively representing a data portion of the corresponding information source. For example, information source A, as well as the other information sources, may have stored exactly 100 newsletter items $DA_1, \ldots, DA_{100}$. Each of the info-source panes may comprise a scroll pane 1685 having a scroll bar 1684. The info-source pane 1682 is highlighted as the current GUI element.

Figure 22:
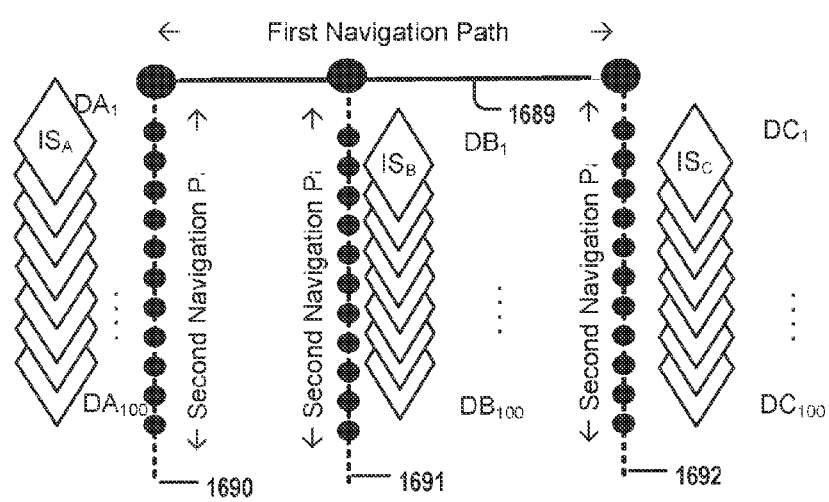
FIG. 22 depicts a first and 3 second navigation paths.

In step 1904, the motion sensing unit 2051 detects a first tilting motion around the y-axis in a clockwise fashion from the users perspective. As a result, the info-source pane 1683 may be determined as candidate GUI element in step 1906 (not shown). In case said tilting movement would have been applied in counterclockwise direction, info-source pane 1681 would be highlighted as new candidate GUI element (not shown). Thus, by applying one or more tilting motions around the y-axis in a counterclockwise or clockwise fashion, a user is enabled to select an information source of interest. For example, each information source A, B and C may correspond to a newsletter respectively provided by companies A, B and C or may correspond to status information submitted on a regular basis from a manufacturing machine A, B or C. A user, by applying one or more tilting motions on the device, is empowered to choose an information source of interest. FIG. 22 illustrates this feature graphically by representing each of the information sources as a black node arranged along a first navigation path 1689.

In the info panes 1681-1683 respectively display human readable text being provided by a current data portion of the respective information source. At the beginning, when starting the application program, a default data portion may be displayed, for example, the most recent newsletter item, the first page of an electronic document, the content of a file having a file name being first according to an alphabetic order, or the like.

The user may, after having selected an information source of interest, apply said tilting motion around the x-axis of the device, thereby navigating between different data portions of the selected information source. Preferentially, each tilting motion around in the x-axis lowering the top side of the device and rising the bottom side of the device will result in loading a new data portion from the information source and displaying the newly loaded data portion in the scroll pane of the info-source pane instead of the previously displayed text.

For example, the tilting motion around the x-axis lowering the top of the input device and rising the bottom of the input device results in navigating along a second navigation path 1690-1692, thereby selecting a data portion of a higher rank according to a sorting criterion.

For example, if the sorting criterion is the time of having received a newsletter item, the default data portion may be that newsletter item having been read when opening the application program the last time. Selecting a data portion of a higher rank may comprise selecting a newsletter item having a more recent timestamp for display in the corresponding info-source pane.

A tilting motion around the x-axis lowering the bottom of the input device and rising the top of the input device results in navigating along the second navigation path in the opposite direction, thereby selecting a data portion of a low rank according to the sorting criterion. For example, by applying such a tilting motion, the user may select a newsletter item having assigned an older date than the newsletter item currently displayed in the corresponding info-source pane. The selected newsletter item will automatically replace the currently displayed newsletter item.

According to some embodiments, the plurality of information sources and corresponding info-source panes display their respective data portions in sync or out of sync. If they are in sync, and if a user has selected data portion $DB_{13}$ for display in the scroll pane of the candidate info-source pane 1682 of information source B, then info-source pane 1681 of information source A will display the text of the data portion $DA_{13}$ and info-source pane 1683 of information source C will display the text of the data portion $DC_{13}$. If the display of the data portions of the various information sources is out of sync, the tilting movement around the x-axis will only affect the text displayed in the scroll pane of the info-source pane being the candidate GUI element.

In case in step 1910 the acceleration sensing unit 2052 detects a first shaking motion having been executed on the device, the data portion currently displayed in the highlighted info-source pane would be selected and further processed. Said further processing may comprise displaying the scroll pane of the current information pain in a full-screen size. The further processing operation may also comprise displaying a further GUI element in the view, said further GUI element (for example, a pop-up window) comprising meta-data on the data portion currently displayed. Said meta-data may be, for example, information on the author of a data portion, its validity, or the like. Said shaking motion may also be used to 'reset' the content of all scroll panes or to reset at least the content of the scroll pane of the currently highlighted info-source pane. 'Resetting' the content of a scroll pane means that the respective default data portion is displayed in said scroll pane.

FIG. 22 depicts a first and 3 second navigation paths used for navigating between different information sources and data portions as described previously for FIG. 21. Each information source corresponds to a node arranged along the first navigation path 1689. Each data portion of a particular information source corresponds to a node arranged along a second navigation path 1690-1692. Thus, the second navigation path 1690 corresponds to the data portions $DA_1, \ldots, DA_{100}$ of information source A, the second navigation path 1691 corresponds to the data portions $DB_1, \ldots, DB_{100}$ of information source B and the second navigation path 1692 corresponds to the data portions $DC_1, \ldots, DC_{100}$ of information source C.

FIG. 23 illustrates the resizing of a KPI time series chart by means of a pinch gesture. In step 202, the input device 1500 displays a first view 1650 on the multi-touch screen, the first view comprising a plurality of first GUI elements together constituting a line chart. The line chart comprises a curve 1604 representing a time series being indicative of the development of a particular KPI value over the time. The time is indicated in an x-axis of the chart. The y-axis of the line chart corresponds to a KPI value of a particular person or department at a particular moment in time. The line chart comprises a plurality of guidelines 1605-1611 being separate from each other by a first distance. When receiving, in step 2004, signal data being indicative of a gesture applied by a user via the multi-touch screen on the GUI elements constituting the line chart, the line chart is rescaled. Said gesture is a pinch gesture of two fingers moving relative to each other.

In case the signal data indicates that the two fingers 1601 move away from each other, the view is updated and the user zooms into the line chart, thereby increasing the distance between each guideline proportionally to the relative movements of said two fingers. While executing the pinch gesture, at predefined time intervals time intervals signal data packages are received and the diagram is continuously updated in dependence on the received signal data packages. Thus, a continuous monitoring of the pinch gesture is made possible.

Figure 23A:
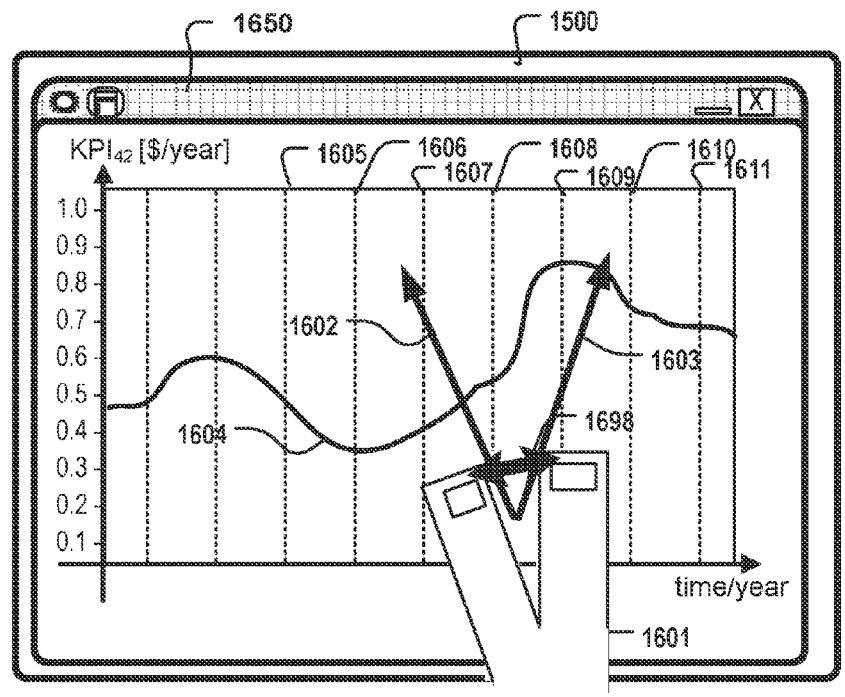
FIG. 23 illustrates the resizing of a KPI time series chart by means of a pinch gesture.
Figure 23B:
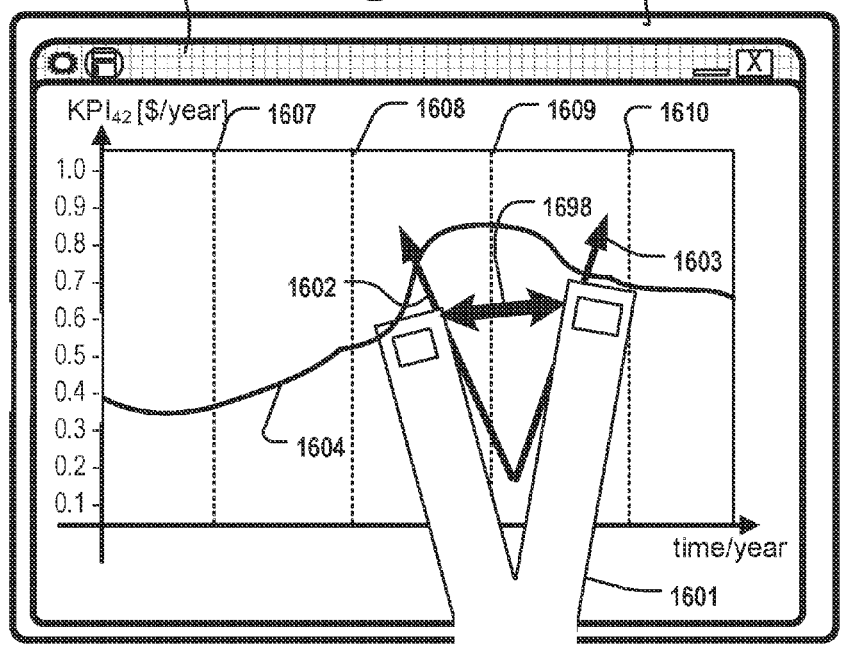

Rescaling of the guidelines when zooming into the line chart is advantageous, because the user intuitively and dynamically receives visual feedback on the degree of zooming. The result of zooming into the line chart of FIG. 23a is depicted in FIG. 23b.

The pinch gesture depicted in FIG. 23 and in FIG. 24 results in a change in the distance 1698 of the two fingers relative to each other. The pinch gesture may be executed, for example, by executing a V-shaped gesture according to which the two fingers slide along the legs 1602, 1603 of said V as depicted in FIG. 23. Likewise, the pinch gesture may have the form of any other gesture resulting in the change in the distance 1698 between the two fingers. Depending on the sliding direction, said two fingers will move apart from each other or will approach one another.

According to embodiments, the x- as well as the y-axis components are both recognized. The dynamically determined growth or decline of the distance of the x-coordinates of the two sliding fingers on the screen correlates with the re-scaling factor used for rescaling the x-axis of the line chart. The dynamically determined growth or decline of the distance of the y-coordinates of the two sliding fingers correlates with the re-scaling factor used for rescaling the y-axis of the line chart. A corresponding embodiment also exists for the embodiment depicted in FIG. 24 enabling a user to trigger the aggregation and disaggregation of KPI values and their dynamical display on a geographic map.

Figure 24A:
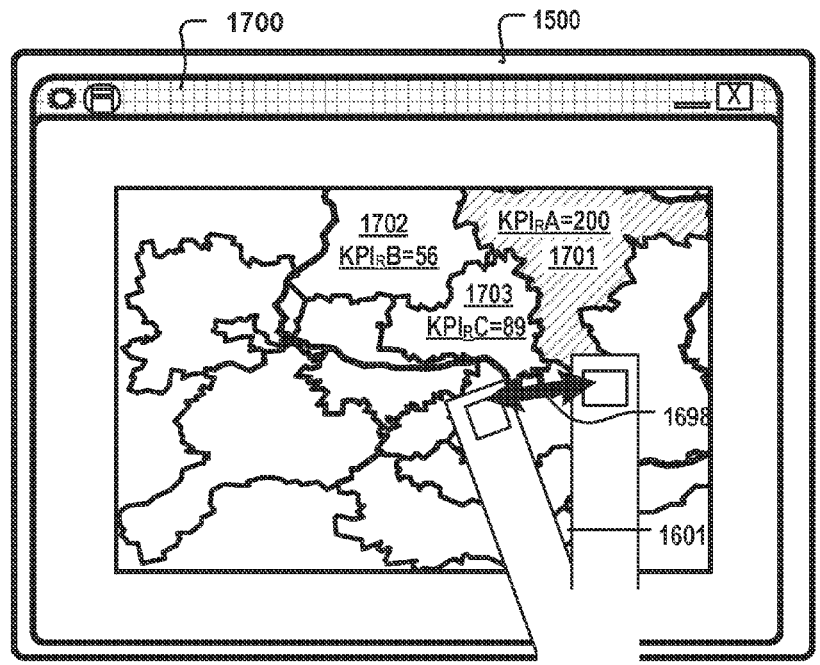
FIG. 24 illustrates the triggering of executing a drill down analysis of KPI values by applying a pinch gesture on a geographical map.

FIG. 24 illustrates the triggering of executing a drill down analysis of KPI values by applying a pinch gesture on a geographical map. The input device 1500 depicted in FIG. 24a displays a view 1700 comprising a geographic map having multiple subregions 1701-1703. Geographical subregion 1702 comprises an aggregated KPI value $KPI_R B=56$, geographical subregion 1703 comprises an aggregated KPI value $KPI_R C=89$ and geographical subregion 1701 comprises an aggregated KPI value $KPI_R A=200$. Said aggregated KPI values may have been aggregated based on a region graph as explained previously. A user executing with his fingers 1601 a pinch gesture on the geographic map is empowered to zoom into the geographic map, thereby at the same time executing a drill down analysis along the region graph. The drill down analysis results in the calculation of one or more aggregated KPI values for the sub-regions of the geographical region a user has zoomed into. For example, according to FIG. 24a, the user applies a pinch gesture and zooms into geographic subregion 1701. As a result, when updating the view in dependence on the result of the processing operation in step 2008, said subregion 1701 displays three aggregated KPI values $KPI_R A_1=100$, $KPI_R A_1=40$, $KPI_R A_1=60$, each of said three aggregated KPI values having been calculated for sub-sub regions of subregion 1701.

Figure 24B:
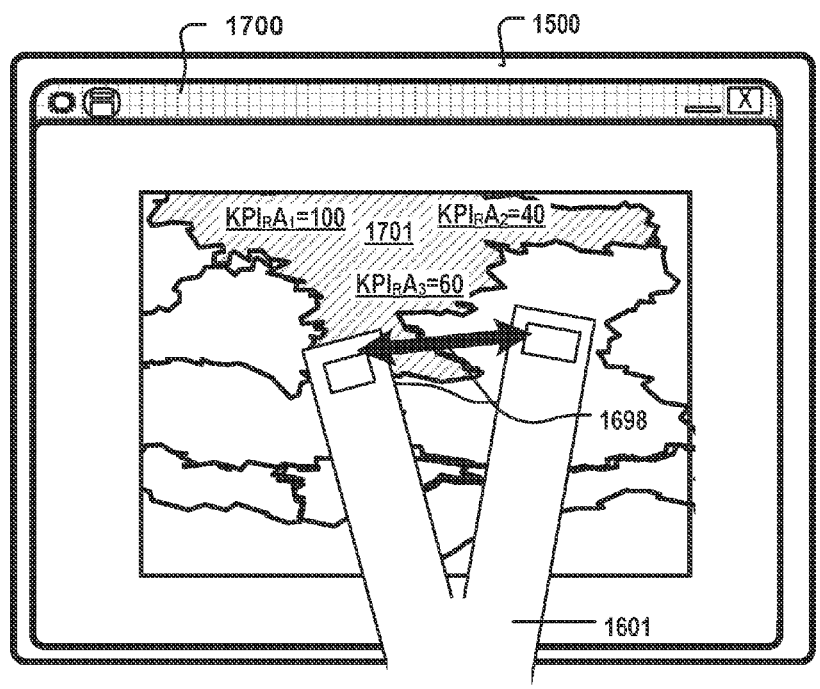

Accordingly, a user applying a pinch gesture on the geographic map displayed in FIG. 24b in which the distance between the two fingers decreases zooms out of said geographic map. When zooming out of the geographic map, an aggregation operation is executed on a higher hierarchical level of a region graph (drill up).

The depicted embodiment is particularly advantageous, because aggregating KPI values on different hierarchical levels of a graph, e.g. a region graph, can be triggered and executed in parallel with an optically perceivable zooming action. The zooming action is particularly intuitive because it is accompanied by a dynamically changing number of aggregated KPI values said aggregated KPI values showing different data values on different zooming levels.

FIG. 25 illustrates a series of screenshots depicting possible drag-and-drop paths on a first view and providing a preview of a second view. Input device 1500 displays a window 1800 comprising a first view 1809. The first few comprises a plurality of GUI elements 1801-1808. One of said GUI elements 1801 is selected. Said GUI elements could represent, for example, an organization node within an organization graph. Said GUI element 1801 may comprise one or more data values which should be further processed. Said further processing is to be executed via a second view. Users not familiar with an application program often do not know how to reach a particular view starting from a current view. The features described in the following may enable also a user unfamiliar with an application program to intuitively learn how to use said program.

Figure 25A:
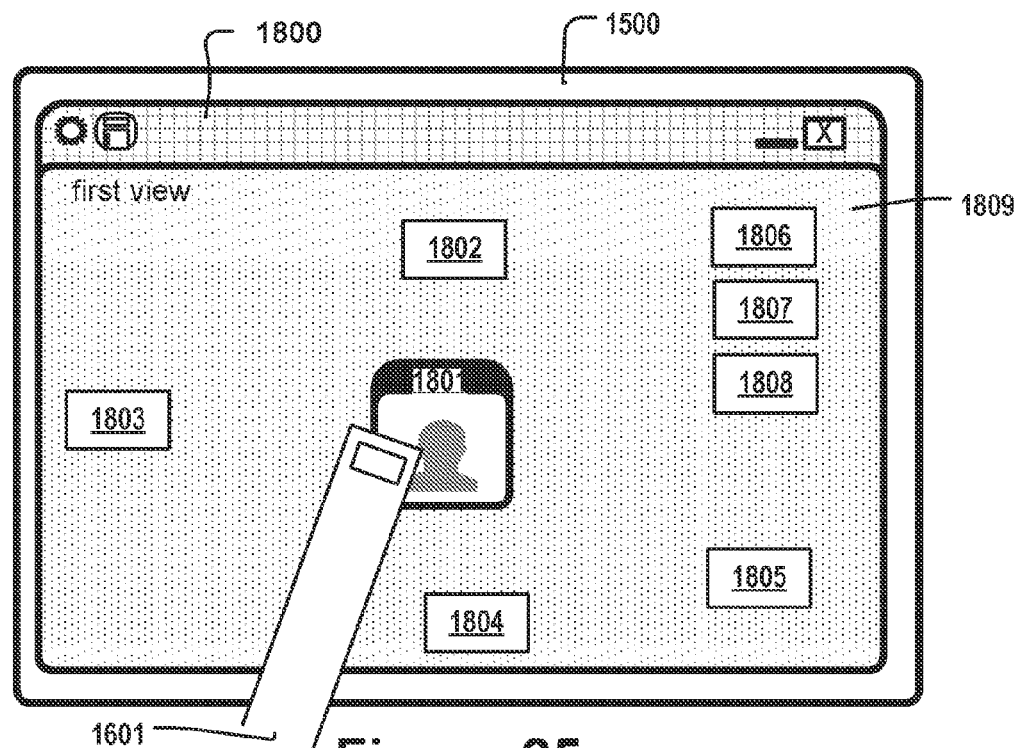
FIG. 25 illustrates a series of screenshots depicting possible drag-and-drop paths on a first view and providing a preview of a second view.
Figure 25B:
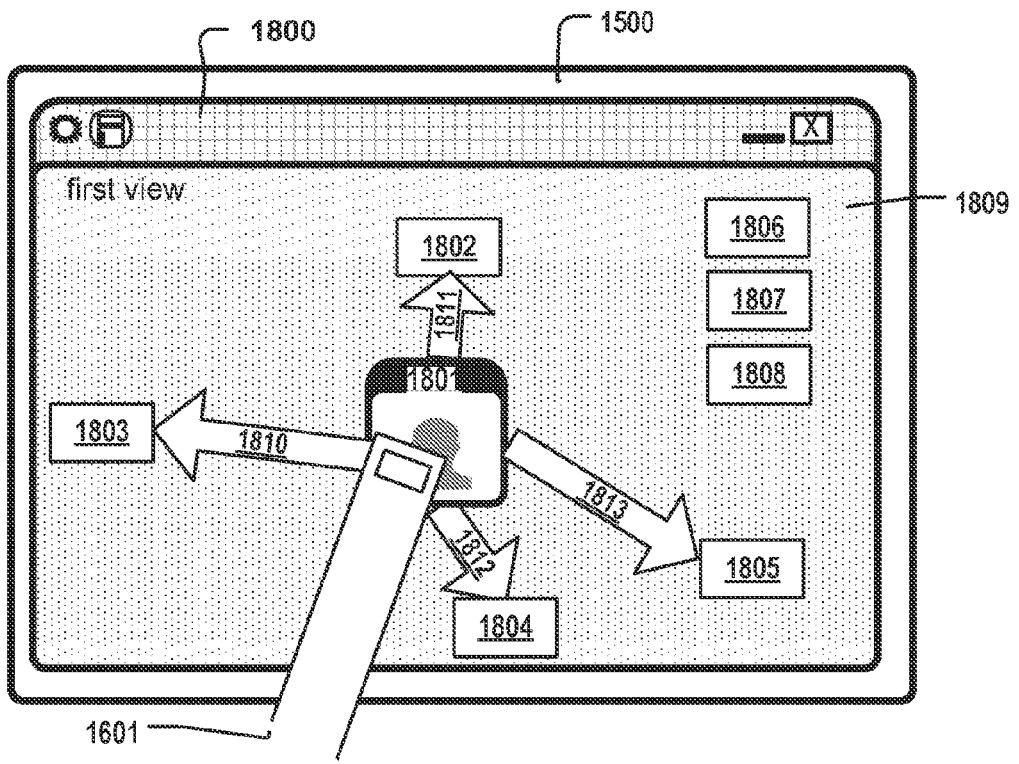

Upon a user touching said one first GUI element by one of his fingers for at least a first time period, the application program determines which of the GUI elements displayed in the first view may be used as a drag-and-drop target for displaying another view upon a drop action of said first GUI element 8101 onto said target GUI element. Touching the first GUI element is recognized as first gesture, dragging and dropping said GUI element to a target GUI element is recognized as a second gesture. For each of the determined target GUI elements 1802-1805, a pointer GUI element 1814-1816 being indicative of a path from the selected first GUI element 1801 to said target GUI element is displayed. Said four pointer GUI elements are depicted in FIG. 25b. The GUI elements 1806-1808 cannot act as target GUI elements. Therefore, no corresponding pointer GUI element for GUI elements 1806-1808 are determined and displayed in FIG. 25b upon selection of the first GUI element 1801. Thus, a user being unfamiliar with an application program intuitively recognizes which drag-and-drop targets and corresponding processing operations are available for a particular GUI element 1801 within a particular view 1809.

Figure 25C:
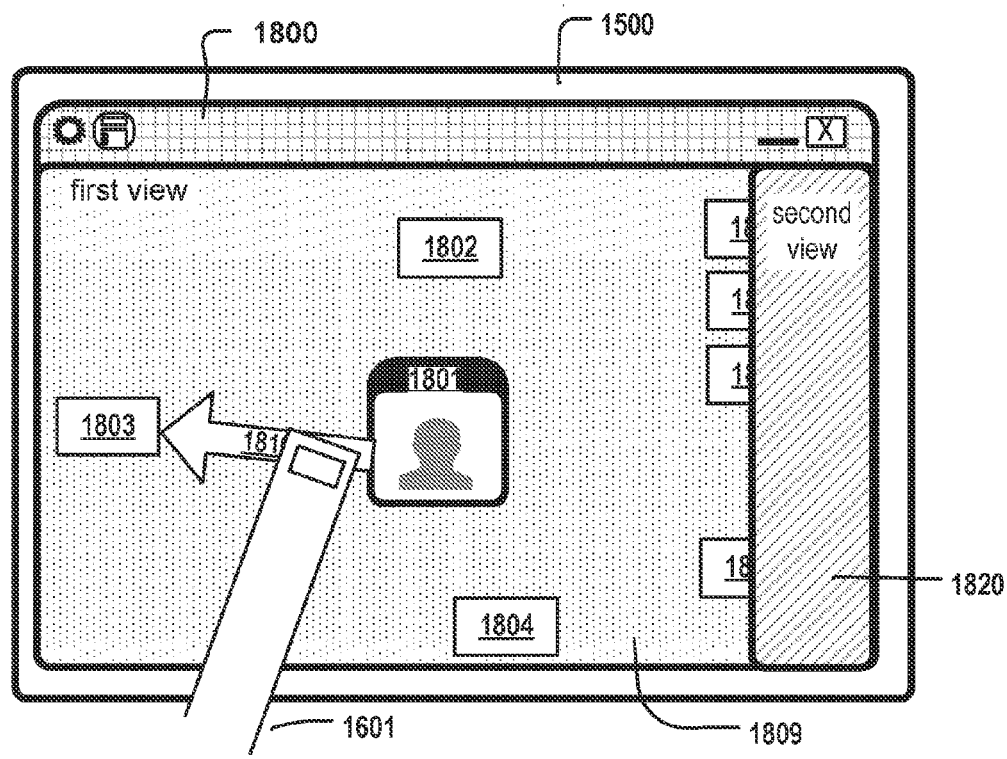
Figure 25D:
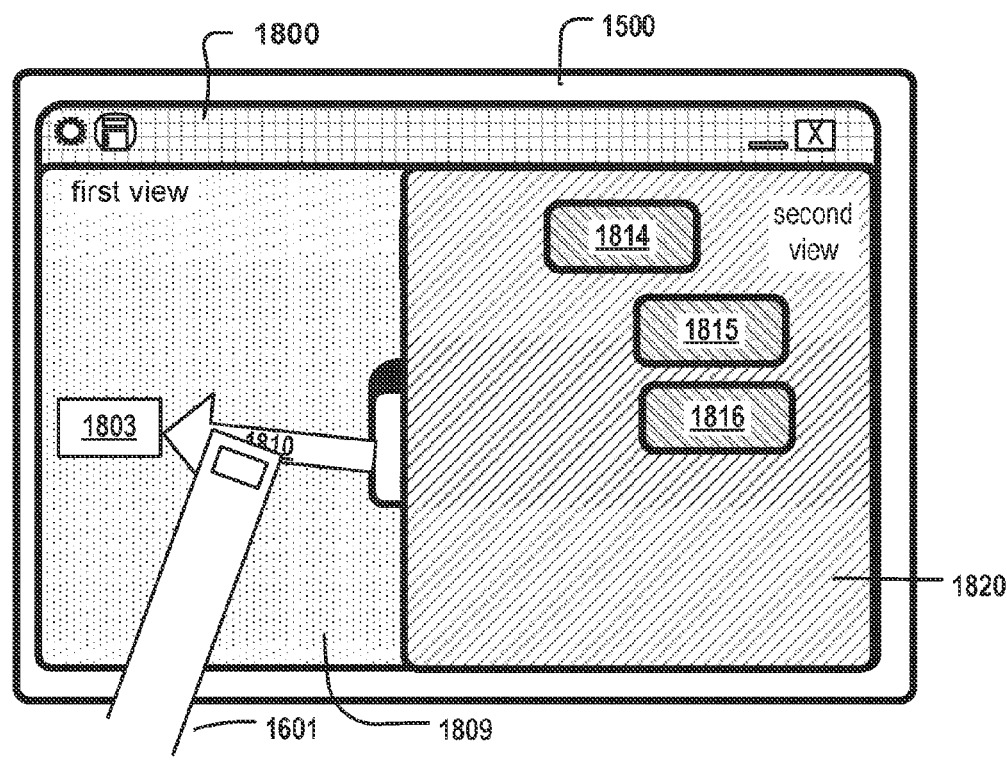
Figure 25E:
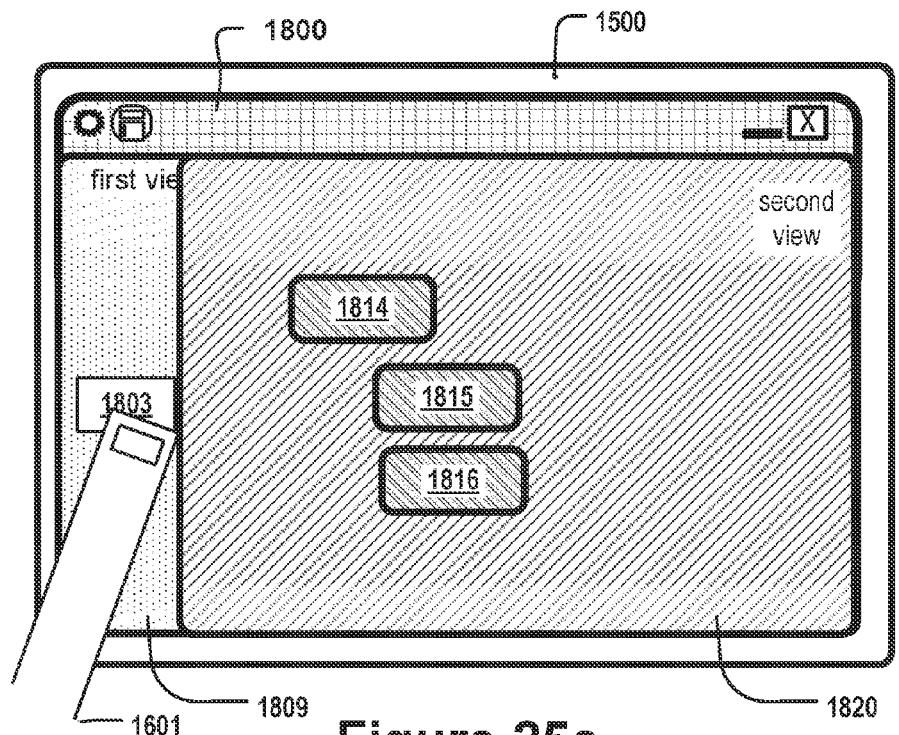

According to FIG. 25c, the user may have decided to choose GUI element 1803 as target. As soon as the user starts dragging the selected first GUI element 1801 along the path indicated by the pointer GUI element 1810, a second view 1820 appears. The appearing second view is determined automatically by the application program in dependence of the target GUI element chosen by the user. A plurality of second views may exist, each view corresponding to a different application context and/or processing operation to be executed on data represented by the first GUI element. A user choosing a particular target GUI element thus determines which kind of second view and corresponding application context should be displayed and which further processing operation should be executed.

Figure 25F:
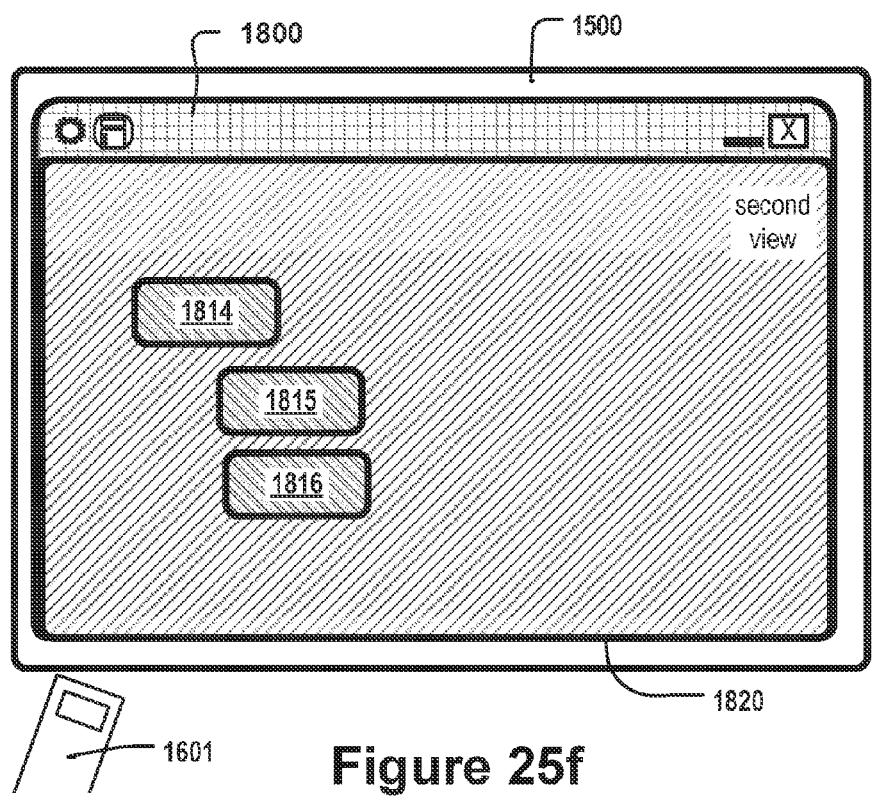

When executing the dragging operation by means of the finger of the user, the portion of the displayed parts of the second view 1820 proportionally correlates with the portion (i.e., the ratio of the area of the second view covering the first view in relation to the area of the first view covered) of the path between the first GUI element 1801 and the target GUI element 1803 already covered when executing the dragging gesture. This is indicated in FIGS. 25c-25f. When the user removes this finger 1601 from the touch screen when having reached the target GUI element 1803, the selected first GUI element 1801 is dropped onto the target GUI element 1803. As a consequence, upon a refresh of the GUI, the second view represented by the target GUI element 1803 as depicted in FIG. 25f covers the first view completely. According to other embodiments (not shown), the selected first GUI element 1801 may represent one or more KPIs. By dragging and dropping said KPI on a target GUI element, e.g. onto a GUI element representing a particular organization node of an organization graph, retrieval of said selected KPIs for the organization node of the target GUI may be triggered. Said retrieval may be executed, for example, via a plurality of web services providing access to a database on a remote server 165. According to another embodiment, a GUI element representing an organization node is dragged & dropped onto a GUI element representing a KPI.

Figure 26A:
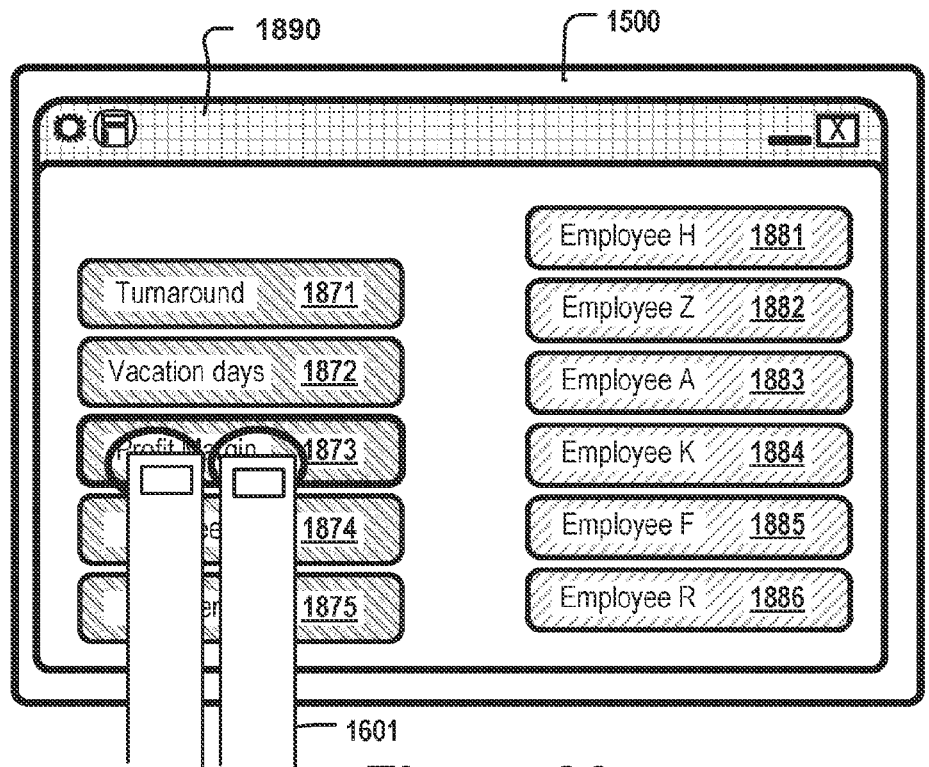
FIG. 26 illustrates the application of a two finger gesture for triggering the execution of a sorting operation.

FIG. 26 depicts an input device 1500 displaying via its multitouch screen a first view 1890 allowing a user to sort a set of data objects in dependence on a selected KPI. A plurality of first GUI elements 1871-1875 respectively represents one of a plurality of KPIs. GUI element 1871 represents KPI "turnaround". GUI element 1872 represents KPI "vacation days". GUI element 1873 represents KPI "profit margin". GUI element 1874 represents KPI "trainees", i.e., the number of trainees an employee is responsible for. GUI element 1875 represents KPI "sold items". A user may select any of said GUI elements 1871-1875 by touching said element by two of his fingers as shown in FIG. 26a.

Figure 26B:
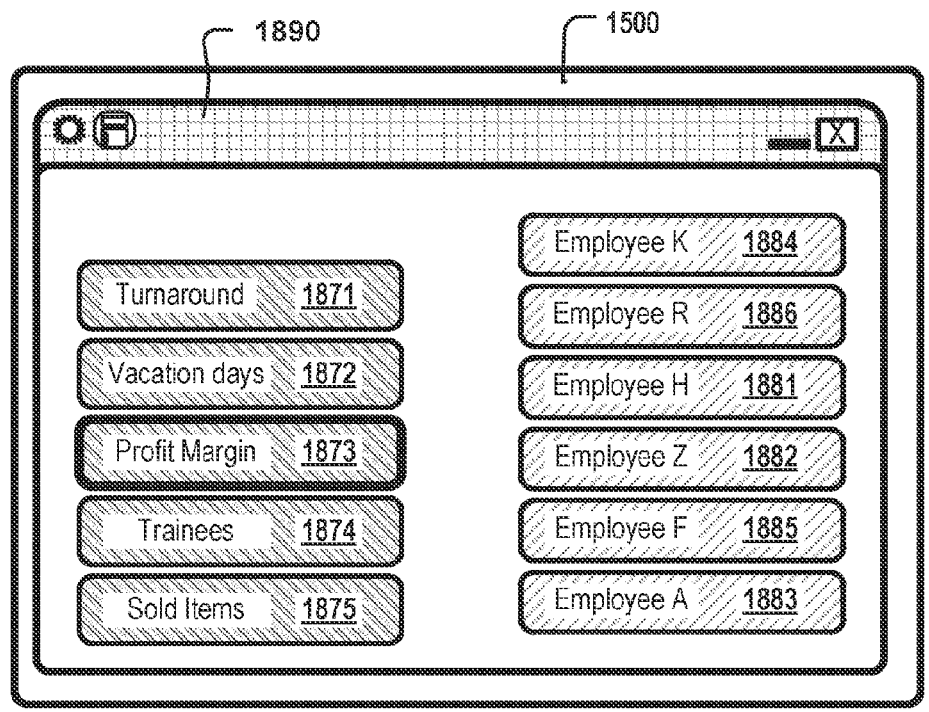

When a signal is received in step 2004 that a two finger gesture is applied on one of said first GUI elements, in step 2006 the sorting of data objects in dependence on the selected KPI is executed. As a consequence, the KPI represented by the selected GUI element is used as sorting criterion. In this case, the KPI "profit margin" is used as sorting criterion. The selection of said KPI as sorting criterion triggers a sorting process of a plurality of data objects. Each of said data objects is represented by a second GUI element 1881-1886. For example, the sorted data objects may be organization nodes of an organization graph, in particular employees. Each data object representing an employee may comprise a KPI value of said employee for each or for at least some of the KPIs available. Upon selection of one of that KPIs as sorting criterion, the data objects representing the employees are sorted according to said selected KPI. For example, upon having selected the KPI "profit margin", all employees and corresponding GUI elements 1881-1886 are sorted in dependence on the profit margin value assigned to each particular employee data object. Then, upon having updated the first few in step 2008, a list of the second GUI elements 1881-1886 is displayed on the first few the list is sorted in accordance with the sorting order of the sorted data objects. This is shown in FIG. 26b. According to the depicted embodiment, the unsorted second GUI elements 1881-1886 are displayed to gather with the first GUI elements 1871-1875 together in the first view before selecting the sorting criterion and executing the sorting process (see FIG. 26a). According to other embodiments (not shown), the second GUI elements are not visible before a KPI was selected as sorting criterion. In this case, the second GUI elements are displayed in the first view only after having executed the sorting step.

Figure 28:
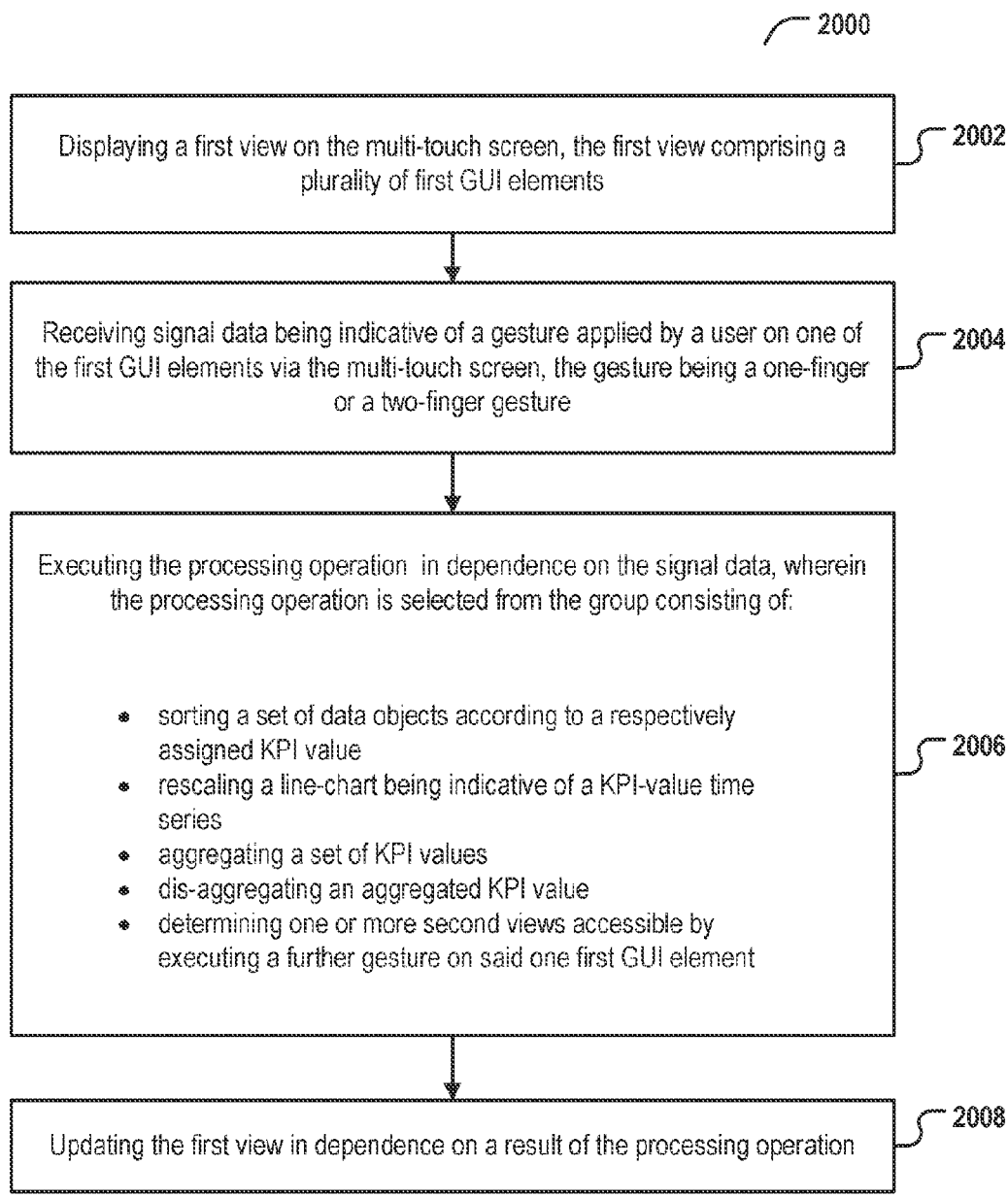
FIG. 28 is a flowchart of a method for specifying a processing operation by means of a multi-touch input device.

FIG. 28 is a flowchart of a method for selecting a data set from a plurality of data sets by means of a multi-touch input device. In step 1902, a view is displayed by the multitouch screen of the input device 1500, the view comprising a plurality of GUI elements 1501-1505, 1551-1555, 1601-1603. One of the GUI elements of the view is used as current GUI element 1501, 1555. In step 1904, a motion sensing unit of the input device detects one or more first tilting motions. In step 1906, at least one candidate GUI element is determined in dependence on the axis and direction of the one or more first tilting motions, in dependence on the current GUI element and in dependence on the topology of the graph. The at least one determined candidate GUI element is highlighted in step 1908. In step 1910 the acceleration sensing unit detects a first shaking motion. In step 1911, upon the detection of the first shaking motion, the data set represented by the highlighted GUI element is automatically selected.

FIG. 28 depicts a flowchart for executing a processing operation for specifying a processing operation by means of a multi-touch input device. In step 2002, a first view is displayed on a multi-touch screen of a mobile multi-touch input device. The first few comprises a plurality of first GUI elements. In step 204, signal data is received. The signal data is indicative of a gesture applied by a user on one of the first GUI elements via the multitouch screen. Said gesture can be a one finger gesture or a two finger gesture. In step 2006, a processing operation for displaying at least one KPI value is executed. Said processing step is executed in dependence on the signal data, wherein the processing operation is one of: sorting a set of data objects in dependence on a selected KPI values rescaling a line chart being indicative of a KPI-value time series, aggregating a set of KPI values, disaggregating an aggregated KPI value or determining one or more second views being accessible by executing a further gesture on said one first GUI element. Finally, in step 2008, the first view is updated in dependence on the result of the processing operation. For example, the updated view may comprise the result of the processing operation.

LIST OF REFERENCE NUMERALS

100 computer system
102 key performance indicator (KPI) database
104 benchmarking database
106 software tools
108 backend data processing means
110 extractor component
112 database
114 frontend data processing means
116 chart
118 list
120 digital map
122 events
124 information channel
126 box
128 security access module
130 enterprise resource planning (ERP) system
132 computer system
150 client device
151 non-volatile storage medium
152 persistent database/said database
153 encryption/decryption module
154 processor
155 certificate
156 organization view
157 region view
158 top/low view
159 in-memory database/first database
160 third table
161 application program
162 network interface
163 second table
164 first table
165 server
166 first web service interface
167 second web service interface
168 third web service interface
169 zth web service interface
170 server database/second database
171 first table
172 second table
173 third table
174 organization graph
175 region graph
176 data aggregation module
177 processor 180 storage medium
181 learning module
182 event view
183 info channel view
300 organization graph
500 region graph
701 user
702 volatile memory
800-809 steps
1500 input device
1550 view
1501-1505 GUI elements
1508 view
1506 pop-up window
1551-1555 GUI elements
1558 rotatable circle
1559 image
1560 indication of possible rotation directions
1561 pop-up window
1570 tilting motion around the y-axis
1571 tilting motion
1600 view
1601 finger(s)
1602-1603 arrows indicating finger movement on screen
1604 KPI development curve
1605-1611 guidelines
1650 view comprising line chart
1681-1683 info-source panes
1684 scroll bar
1685 scroll pane
1686-1688 GUI element
1689 first navigation path
1690-1692 second navigation paths
1698 finger distance
1700 view comprising geographic map
1800 window comprising a first view
1801 selected first GUI element
1802-1808 first GUI elements
1802-1805 target GUI elements
1810-1813 pointer GUI elements
1814-1816 second GUI elements
1820 second view
1871-1875 GUI elements representing a KPI
1881-1886 GUI elements representing a data object
1890 view
1902-1911 steps
2002-2008 steps
2051 motion sensing unit
2052 acceleration sensing unit
2053 multitouch screen
2054 processor
2055 storage medium

The invention claimed is:

1. A method for providing a plurality of aggregated Key Performance Indicator values (KPI-values) of a plurality of different KPIs to one or more views of a GUI of a client processing device, the method comprising:
providing the client processing device, the client processing device being a mobile, hand-held electronic appliance, the client processing device comprising:
a touch-screen for displaying the one or more views,
an application program,
wherein the client processing device is adapted to receive log-in data of a user, and
a first database,
providing a server processing device, the server processing device being operatively coupled to a second database, wherein the first database and the second database respectively comprise an organization graph, each organization node of the organization graph having assigned one or more KPI values, the server processing device comprising:
a plurality of web-service interfaces being accessible by the application program, each interface being operable to receive and process a request for one or more KPIs being particular to said interface, each interface being operable to return an aggregated KPI value read from the second database, wherein the first and the second database respectively comprise a first table for storing O-aggregated KPI-values, each O-aggregated KPI value being calculated for one of the organization nodes and one of the KPIs by aggregating KPI values of said one KPI being respectively assigned to said one organization node or to any of its direct or indirect child nodes,
receiving the log-in data of the user by the application program,
identifying one organization node of the organization graph as the organization node representing the logged-in user and using said identified node as current organization node,
A) determining one or more first KPIs for the current organization node;
B) accessing, by the application program, the first table of the first database for retrieving O-aggregated KPI values for one or more first KPIs for the current organization node,
C) in case the O-aggregated KPI values could not be retrieved from the first database, determining from the plurality of web service interfaces one or more first web-service interfaces being operable to receive and process a request for the first KPIs,
D) querying, by the application program, the determined first web service interfaces via a network for receiving the O-aggregated KPI values of the first KPIs,
E) storing, by the application program, the O-aggregated KPI values received from the second database in the first table of the first database,
F) displaying, by the application program, the O-aggregated KPI values retrieved from the first database or received from the second database in an organization view, the organization view displaying the current organization node and its direct child organization nodes, the organization view enabling the user to navigate within the organization graph, whereby a selection of one of the displayed organization nodes triggers there-execution of the steps A-F, wherein the selected organization node is used as the current organization node
wherein the content of the first table of the first database is automatically filled by the application program with O-aggregated KPI values by submitting a plurality of requests to the first web service interfaces until for each KPI and for each organization node being the organization node representing the logged-in user or being one of the direct or indirect child nodes of said organization node the corresponding O-aggregated KPI value is received from the second database and is stored to the first table of the first database.

2. The method of claim 1,
whereby the first and the second database further respectively comprise a region graph, the region graph comprising region nodes, each region node representing a geographic region, each region node being stored in association with one or more of the organization nodes, whereby the first and the second databases respectively comprise a second table for storing R-aggregated KPI-values, each R-aggregated KPI value being calculated for a unique combination of one of the region nodes and one of the KPIs by aggregating KPI values of said one KPI being assigned to any of a set of organization nodes, said set comprising said one organization node and its direct and indirect child organization nodes, the organization nodes of said set being stored in association with said one region node, whereby according to the structure of the second table each table row represents a unique combination of a region node and an organization node, each of the KPIs being represented by one column of the second table, whereby each cell specified by a particular row and a particular KPI-representing column is used for storing an R-aggregated KPI-value calculated for the KPI of said cells' row and for the region node and the organization node of said cell's column, the method further comprising:
- displaying a region view on the GUI, wherein at least some region GUI elements of the region view respectively represent one of the region nodes,
- receiving a signal being indicative of one of the region GUI elements selected by the user,
- identifying one region node of the region graph as being represented by the selected region GUI element and using the identified region node as current region node,
- G) determining one or more second KPIs for the current region node,
- H) accessing, by the application program, the second table of the first database for retrieving R-aggregated KPI values for one or more second KPIs for the current region node,
- I) in case the R-aggregated KPI values could not be retrieved, determining from the plurality of web service interfaces one or more second web-service, interfaces being operable to receive and process a request for the second KPIs,
- J) querying, by the application program, the determined second web service interfaces via a network for receiving the R-aggregated KPI values of the second KPIs,
- K) storing, by the application program, the R-aggregated KPI values received from the second database in the second table of the first database,
- L) displaying, by the application program, the R-aggregated KPI values retrieved from the first database or received from the second database, in the region view of the GUI, the region view displaying at least one region GUI element representing the current region node, the region view enabling the user to navigate within the region graph, whereby a selection of one of the displayed region nodes triggers the re-execution of the steps G-K, whereby the selected region node is used as the current region node.

3. The method of claim 2,
wherein the second table of the first database is automatically filled by the application program with R-aggregated KPI values by submitting a plurality of requests to the second web service interfaces until for each combination of a region node and an organization node, said organization node being the organization node representing the logged in user or any of its direct or indirect child nodes, all R-aggregated KPI values stored in the second database are received and are stored to the second table of the first database.

4. The method of claim 2, whereby the application program is operable to automatically and dynamically switch between using the second database for retrieving the O- and/or R-aggregated KPI values to be displayed,
- wherein the first database is used by the application program by default, wherein in case the first database is outdated, the application program switches to the second database and updates the first database in parallel,
- wherein in case no network connection to the server is available when starting or executing the update of the first database, the application program does not start the updating process and automatically uses the first database or uses those parts of the first database having already been received during the update process before the network connection was terminated.

5. The method of claim 2, whereby the requested O- and/or R-aggregated KPI values returned by the requested web service interfaces are returned in the form of BLOBs.

6. The method of claim 2,
whereby the first and the second database further respectively comprise a third table, whereby according to the structure of the third table:
- each row represents a unique combination of a particular organization node and a particular KPI,
- each of a plurality of T -columns respectively represents a top rank position, and
- each of a plurality of L-columns respectively represent a low rank position, whereby the T-aggregated KPI values and the L-aggregated KPI values stored in the cells of the third table are calculated for each unique combination of one of the KPIs and one of the organization nodes by:
- using all organization nodes being direct child nodes of said one organization node as current organization nodes,
- for each of said current organization nodes, and for said one KPI, calculating an O-aggregated KPI value,
- sorting said O-aggregated KPI values in descending order for generating a sorted list of the top O-aggregated KPI values, Page 6 of 17 U.S. application Ser. No. 13/202, 455
- storing at least some of said sorted O-aggregated KPI values at the top positions of said sorted list as T -aggregated KPI values into a corresponding number of cells, whereby each T-aggregated KPI value is stored into a cell whose column represents a top rank position being identical to the position of said T-aggregated KPI value within said sorted list; and
- storing at least some of said sorted O-aggregated KPI values at the lowest positions of said sorted list as L-aggregated KPI values into a corresponding number of cells, whereby each L-aggregated KPI value is stored into a cell whose column represents a low rank position being identical to the position of said L-aggregated KPI value within said sorted list;

the method further comprising:
- displaying a top/low view, wherein one or more T/L GUI elements of the top/low view respectively represent one of the KPIs,
- receiving a signal being indicative of one of the T/L-GUI elements having been selected by the user;
- determining one or more third KPIs;
- accessing, by the application program, the third table of the first database for retrieving T- and/or L-aggregated KPI values for each of said third KPIs,
- in case the T- and/or L-aggregated KPI values could not be retrieved, determining from the plurality of web service interfaces one or more third web-service interfaces being operable to receive and process a request for the third KPIs, querying, by the application program, the determined third web service interfaces via the network for receiving the T- and/or L-aggregated KPI values of the third KPIs, storing, by the application program, the T- and/or L-aggregated KPI values received from the second database in the third table of the first database, displaying, by the application program, the T- and/or L-aggregated KPI values retrieved from the first database or received from the second database in the top/low view of the GUI.

7. The method of claim 6, wherein the aggregated data values are calculated by a data aggregation module running on the server processing device, wherein the structure of the first, second and third table of the first database respectively is identical to or is a sub-structure of the structure of the first, second and third table of the second database, and wherein preferentially at least some organization nodes in the first and/or second database are stored in association with a compressed image of a user represented by said organization node, the image compression being executed by said data aggregation module.

8. The method of claim 6,
wherein the second table of the first database is automatically filled by the application program with R-aggregated KPI values by submitting a plurality of requests to the second web service interfaces until for each combination of a region node and an organization node, said organization node being the organization node representing the logged in user or any of its direct or indirect child nodes, all R-aggregated KPI values stored in the second database are received and are stored to the second table of the first database, and/or wherein the third table of the first database is automatically filled by the application program by submitting one or more requests to the third web service interfaces for receiving, for all combinations of one of the KPIs with one of the organization nodes, said one organization node being the organization node representing the logged in user or any of said node's direct or indirect child nodes, all T-aggregated KPI values and all L-aggregated values contained in the second database, the received L- and T-aggregated data values being stored to the third table of the first database.

9. The method of claim 8, wherein the first database and the third database, is emptied upon each termination of the application program.

10. The method of claim 6, wherein the first database is an in-memory database, and wherein the first database is automatically kept up-to-date by executing the following steps:

M) determining, by the application program, whether the first database is empty or is outdated, N) in case the first database is outdated, the application program automatically deletes the aggregated KPI values stored in the first database, thereby creating an empty database, O) in case it was determined in M) that the first database is empty or in case the database was emptied in step N), operating the application program in update mode, wherein in the update mode the step of accessing the first database for retrieving O-, R-, L- and/or T-aggregated KPI values is skipped, and wherein only the second database is accessed via the plurality of web services for retrieving the O-, R-, L- and/or T- aggregated KPI values for display, wherein in the update mode the application program automatically, as a background process, submits one or more update requests to the plurality of web-services until the first database is updated, and wherein the update-mode is terminated as soon as the first database is updated.

11. The method of claim 6, whereby the application program is operable to automatically and dynamically switch between using the second database for retrieving the O-, R-, L- and/or T- aggregated KPI values to be displayed, wherein the first database is used by the application program by default, wherein in case the first database is outdated, the application program switches to the second database and updates the first database in parallel, wherein in case no network connection to the server is available when starting or executing the update of the first database, the application program does not start the updating process and automatically uses the first database or uses those parts of the first database having already been received during the update process before the network connection was terminated.

12. The method of claim 6,
wherein the O- and R-aggregated KPI values are pre-calculated by the server processing device for all organization nodes of the organization graph, the pre-calculated O- and R-aggregated KPI values being stored in the second database, wherein the L- and/or T-aggregated KPI values are pre-calculated by the server processing device for all organization nodes belonging to the n top hierarchical levels of the organization graph, n being an integer larger 0 and smaller than 5, the pre-calculated L- and/or T-aggregated KPI values being stored in the second database, wherein all other L- and/or T-aggregated KPI values are calculated by the server processing device upon having received a request via one of the web service interfaces, said calculated L- and/or T-aggregated KPI values being stored in the second database, and wherein the client processing device does not calculate any of the O-, R-, L- and/or T-aggregated KPI values but rather receives each of said values from the first or second database.

13. The method of claim 6, whereby the requested O-, R-, L- and/or T-aggregated KPI values returned by the requested web service interfaces are returned in the form of BLOBs.

14. The method of claim 1, wherein the first database is an in-memory database, and wherein the first database is automatically kept up-to-date by executing the following steps:

M) determining, by the application program, whether the first database is empty or is outdated, N) in case the first database is outdated, the application program automatically deletes the aggregated KPI values stored in the first database, thereby creating an empty database, O) in case it was determined in M) that the first database is empty or in case the database was emptied in step N), operating the application program in update mode, wherein in the update mode the step of accessing the first database for retrieving O-aggregated KPI values is skipped, and wherein only the second database is accessed via the plurality of web services for retrieving the O-aggregated KPI values for display, wherein in the update mode the application program automatically, as a background process, submits one or more update requests to the plurality of web-services until the first database is updated, and wherein the update-mode is terminated as soon as the first database is updated.

15. The method of claim 1, wherein the first database is an in-memory database, and wherein the first database is automatically kept up-to-date by executing the following steps:

M) determining, by the application program, whether the first database is empty or is outdated, N) in case the first database is outdated, the application program automatically deletes the aggregated KPI values stored in the first database, thereby creating an empty database, O) in case it was determined in M) that the first database is empty or in case the database was emptied in step N), operating the application program in update mode,
wherein in the update mode the step of accessing the first database for retrieving O- and/or R-aggregated KPI values is skipped, and wherein only the second database is accessed via the plurality of web services for retrieving the O-and/or R-aggregated KPI values for display,
wherein in the update mode the application program automatically, as a background process, submits one or more update requests to the plurality of web-services until the first database is updated, and
wherein the update-mode is terminated as soon as the first database is updated.

16. The method of claim 1,
wherein the first database is an in-memory database,
wherein the client processing device comprises a computer-readable, non-volatile storage medium,
wherein a third database is persistently stored by the application program in said non-volatile storage medium, the third database being an encrypted copy of the first database, the encryption being executed by the application program,
wherein the first database is not encrypted,
wherein the application program, upon program start, creates the first database by reading the persistent first database from the non-volatile storage medium, decrypting the content of the third database, initializing the first database in the memory and filling the first database with the decrypted content of the third database.

17. The method of claim 1, wherein the first database and, if present, also the third database, is emptied upon each termination of the application program.

18. The method of claim 1, whereby the application program is operable to automatically and dynamically switch between using the second database for retrieving the O-aggregated KPI values to be displayed,
wherein the first database is used by the application program by default,
wherein in case the first database is outdated, the application program switches to the second database and updates the first database in parallel,
wherein in case no network connection to the server is available when starting or executing the update of the first database, the application program does not start the updating process and automatically uses the first database or uses those parts of the first database having already been received during the update process before the network connection was terminated.

19. The method of claim 1, whereby the requested O-aggregated KPI values returned by the requested web service interfaces are returned in the form of a binary large objects (BLOBs).

20. The method of claim 1, wherein the application program comprises a learning module, the method further comprising the step of:

logging, by the learning module, identifiers of the one or more first, second and/or third web service interfaces used over a time period,
calculating, by the learning module applying a learning algorithm on the logged web service interface identifiers, for each of the web service interfaces a score value, said score value being indicative of the probability that the logged-in user submits a web service request for an aggregated KPI value to any of said first, second and/or third web service interfaces,
automatically submitting, upon a log-in operation of the user, by the application program, one or more prefetching web service requests in dependence of the calculated score value.

21. The method of claim 20, wherein a higher usage probability of a web service interface is indicated by a higher score value, wherein the order of the first, second and third web service interfaces used for updating the first database depends on the score value of each respective web service, whereby the higher the score value, the earlier the web service interface is requested during the update process.

22. A non-transitory computer-readable storage medium, the storage medium comprising computer-interpretable instructions which, when executed by a processor, cause the processor to execute the steps of claim 1.

23. A computing system for providing a plurality of aggregated KPI-values of a plurality of KPIs, from a server processing device to one or more views of a GUI of at least one client processing device, comprising:

the client processing device, the client processing device being a mobile, hand-held electronic appliance, the client processing device comprising:
a touch-screen for displaying the one or more views, an application program,
wherein the client processing device is adapted to receive log-in data of a user, and
a first database, the first database comprising a first table for storing O-aggregated KPI-values, each O-aggregated KPI value being calculated for one organization node of an organization graph and for one of the KPIs by aggregating KPI values of said one KPI being respectively assigned to said one organization node or to any of its direct or indirect child nodes,
wherein the client processing device is adapted to receive the log-in data of the user by the application program,
wherein the client processing device is adapted to identify one organization node of the organization graph as the organization node representing the logged-in user and using said identified node as current organization node,
the server processing device, the server processing device being operatively coupled to a second database, wherein the second database comprises a copy of said organization graph, the server processing device comprising:
a plurality of web-service interfaces being accessible by the application program, each interface being operable to receive and process a request for one or more of the plurality of KPIs being particular to said interface, each interface being operable to return an aggregated KPI value read from the second database, wherein the second database comprises a further first table for storing O-aggregated KPI-values, each O-aggregated KPI value being calculated for one of the organization nodes and one of the KPIs by aggregating KPI values of said one KPI being assigned to said one organization node or to any of its direct or indirect child nodes, wherein the application program is operable to execute the steps of:

A) determining one or more first KPIs for the current organization node;
B) accessing the first table of the first database for retrieving O-aggregated KPI values for one or more first KPIs for the current organization node,
C) in case the O-aggregated KPI values could not be retrieved from the first database, determining from the plurality of web service interfaces one or more first web-service interfaces being operable to receive and process a request for the first KPIs,
D) querying the determined first web service interfaces via a network for receiving the O-aggregated KPI values of the first KPIs,
E) storing the O-aggregated KPI values received from the second database in the first table of the first database,
F) displaying the O-aggregated KPI values retrieved from the first database or received from the second database in an organization view, the organization view displaying the current organization node and its direct child organization nodes, the organization view enabling the user to navigate within the organization graph, whereby a selection of one of the displayed organization nodes triggers there-execution of the steps A-F, wherein the selected organization node is used as the current organization node wherein the content of the first table of the first database is automatically filled by the application program with O-aggregated KPI values by submitting a plurality of requests to the first web service interfaces until for each KPI and for each organization node being the organization node representing the logged-in user or being one of the direct or indirect child nodes of said organization node the corresponding O-aggregated KPI value is received from the second database and is stored to the first table of the first database.

* * * * *